April 3, 1956 D. SANTINI ET AL 2,740,496

ELEVATOR SYSTEMS

Filed March 17, 1953 13 Sheets-Sheet 1

WITNESSES:

E. A. McBlakey

Leon J. Taza

INVENTORS
Danilo Santini, Phillip C. Keiper
and John Suozzo.
BY
C. L. Freedman
ATTORNEY April 3, 1956 D. SANTINI ET AL 2,740,496

ELEVATOR SYSTEMS

Filed March 17, 1953 13 Sheets-Sheet 2

WITNESSES:

*E. A. McCloskey.*

*Leon J. Taga*

INVENTORS
Danilo Santini, Phillip C. Keiper
and John Suozzo.
BY *C. L. Freedman*
ATTORNEY April 3, 1956 D. SANTINI ET AL 2,740,496

ELEVATOR SYSTEMS

Filed March 17, 1953 13 Sheets-Sheet 3

WITNESSES:

E. A. McCloskey.

Leon J. Taza

INVENTORS

Danilo Santini, Phillip C. Keiper and John Suozzo.

BY C. L. Freedman

ATTORNEY

ELEVATOR SYSTEMS

Filed March 17, 1953 13 Sheets-Sheet 4

INVENTORS
Danilo Santini, Phillip C. Keiper
and John Suozzo.
BY C. L. Freedman
ATTORNEY

ELEVATOR SYSTEMS

INVENTORS
Danilo Santini, Phillip C. Keiper
and John Suozzo.
BY C. L. Freedman
ATTORNEY April 3, 1956 D. SANTINI ET AL 2,740,496

ELEVATOR SYSTEMS

Filed March 17, 1953 13 Sheets-Sheet 6

WITNESSES:

E. A. McCloskey.

Leon J. Laza

INVENTORS

Danilo Santini, Phillip C. Keiper and John Suozzo.

BY C. L. Freedman

ATTORNEY

WITNESSES:
E. A. McClaskey.
Leon J. Jaza

INVENTORS
Danilo Santini, Phillip C. Keiper
and John Suozzo.
BY C. L. Freedman
ATTORNEY April 3, 1956 D. SANTINI ET AL 2,740,496

ELEVATOR SYSTEMS

Filed March 17, 1953 13 Sheets-Sheet 8

WITNESSES:
E. A. McCloskey.
Leon J. Jaza

INVENTORS
Danilo Santini, Phillip C. Keiper
and John Suozzo.
BY C. L. Freedman
ATTORNEY April 3, 1956 D. SANTINI ET AL 2,740,496

ELEVATOR SYSTEMS

Filed March 17, 1953 13 Sheets-Sheet 9

WITNESSES:

E. A. McCloskey.

Leon J. Taza

INVENTORS

Danilo Santini, Phillip C. Keiper and John Suozzo.

BY C. L. Freedman

ATTORNEY

April 3, 1956 D. SANTINI ET AL 2,740,496

ELEVATOR SYSTEMS

Filed March 17, 1953 13 Sheets-Sheet 10

WITNESSES:
E. A. McCloskey
Leon J. Jaza

INVENTORS
Danilo Santini, Phillip C. Keiper
and John Suozzo.
BY C. L. Freedman
ATTORNEY

ELEVATOR SYSTEMS

WITNESSES:
E. A. McCloskey.
Leon J. Laza

INVENTORS
Danilo Santini, Phillip C. Keiper
and John Suozzo.
BY C. L. Freedman
ATTORNEY

ELEVATOR SYSTEMS

Filed March 17, 1953 13 Sheets-Sheet 12

WITNESSES:

E. A. McCloskey.

Leon J. Taja

INVENTORS
Danilo Santini, Phillip C. Keiper
and John Suozzo.
BY C. L. Freedman
ATTORNEY WITNESSES:
E. A. McCloskey.
Leon J. Laza INVENTORS
Danilo Santini, Phillip C. Keiper
and John Suozzo.
BY C. L. Freedman
ATTORNEY United States Patent Office 2,740,496

Patented Apr. 3, 1956

2,740,496

ELEVATOR SYSTEMS

Danilo Santini, Tenafly, Phillip C. Keiper, Shrewsbury, and John Suozzo, Paramus, N. J., assignors to Westinghouse Electric Corporation, East Pittsburgh, Pa., a corporation of Pennsylvania Application March 17, 1953, Serial No. 342,822

71 Claims. (Cl. 187—29)

This invention relates to elevator systems and it has particular relation to the elevator systems wherein a plurality of elevator cars are arranged in a structure to operate as a bank.

The problem of providing an efficient elevator system for a structure is complicated by the frequent variations in traffic demand or traffic pattern which are encountered. Although such variations or patterns differ for different structures, it will be helpful to consider the variations for a typical office building.

On each business day, a period is encountered during which a frequent demand for elevator service is encountered. This demand may be divided into three types of demand. Immediately before the start of the business day and usually towards the end of the lunch period a heavy demand for up travel from the lower-terminal floor is encountered. This may be referred to as an "up-peak."

Immediately after the close of the business day and usually at the start of the lunch hour, a heavy demand for travel towards the lower terminal floor is encountered. This demand for service predominantly in the down direction may be referred to a a "down peak."

During the remainder of the business day, a demand for elevator service which is predominantly equal in the two directions of travel is generally encountered. The period of this demand for substantially equal service in the two directions may be referred to as an "off peak."

Following the close of the business day, a period is encountered during which the demand for elevator service is infrequent or occasional. For example, such a period occurs during the night in most office buildings and similar infrequent demand for elevator service is encountered on holidays. Such periods may be termed "off-hour periods."

Furthermore, the traffic demands during each of the foregoing periods need not be uniform. For example, during the off-hour periods, the entry and departure of service personnel, such as charwomen, may introduce intervals of increased demand for elevator service.

The demand for elevator service further is complicated by the requirement that service be provided for an additional floor or floors located beyond one of the terminal floors. Thus, in office buildings, it is often the practice to provide one or more basement floors which require elevator service.

As will be pointed out below, the traffic picture may be ascertained by reference to various traffic demands or traffic conditions. Examples are given for such demands or conditions, such as calls for elevator service registered by the call means, loading of elevator cars, elevator car stopping, direct functions or rate functions.

An elevator system may be designed for attendant operation or for automatic operation. In attendant operation, an attendant located in each of the elevator cars is available for supervising the loading of his elevator car, the unloading of the elevator car and the dispatch of the elevator car from a floor. Since the doors controlling the passage between his elevator car and the various floors served by the elevator car are under the supervision of the elevator car attendant, the doors may be designed to operate at relatively high speed. In automatic operation, an attendant is not available for supervising the operation of each of the elevator cars. For this reason, it may be desirable to reduce the speed and kinetic energy of the doors associated with each of the elevator cars.

Although provision may be made to safeguard passengers of either automatic or attendant-operated elevator cars, such safety provisions are of particular importance in automatic elevator systems. Such safety provisions may include a safety edge or obstruction detector on each of the doors for the purpose of stopping the door before a passenger can be injured thereby.

Although aspects of the invention may be incorporated in elevator systems employing either a single elevator car or a number of elevator cars arranged in a bank, and although aspects of the invention may be incorporated in elevator systems arranged either for automatic operation or attendant operation, the entire invention may be considered adequately by reference to a bank of elevator cars arranged for automatic operation. For this reason, the following discussion will be directed primarily to such an elevator system.

In a bank of elevator cars arranged for automatic operations, the elevator cars may operate between two terminal floors which consist generally of an upper-terminal floor and a lower or street terminal floor. A plurality of intermediate floors are located between the two terminal floors. In addition, one or more of the elevator cars may be arranged to travel beyond one of the terminal floors to serve an additional floor, such as a basement floor.

Each of the elevator cars generally has a motor for moving the elevator car relative to the associated building structure. In a preferred embodiment of the invention, the motor is energized from the generator of an individual motor-generator set.

In order to provide for registration of calls for elevator service, suitable call-registering means is provided. Such call-registering means may include first call-registering means, including an operating member located at each of the floors from which elevator service is desired in a first direction, such as the up direction. In addition, the call-registering means may include second call-registering means including an operating member located at each of the floors from which elevator service is desired in a second direction, such as the down direction. Finally, third call-registering means may be provided for the purpose of registering calls for floors desired by the load within the elevator car. Such third call-registering means may include an operating member within the elevator car for each floor to which a passenger in the elevator car may desire to be transported.

To assist in directing prospective passengers to appropriate elevator cars, suitable floor signals, such as floor lanterns, may be provided for the elevator system. Thus, an up-floor lantern may be provided at each floor for each of the elevator cars which may move in an up direction from such floors. In a similar manner, a down floor lantern may be provided for each of the elevator cars at each of the floors from which the associated elevator car may move in a down direction.

To assist in controlling the spacing of the elevator cars, a dispatcher may be employed for controlling the departure of the elevator cars from each of the terminal floors. Although the dispatcher may be responsive to the number or location of registered calls for elevator service, in a preferred embodiment of the invention the dispatcher includes means for dispatching successive elevator cars from each of the terminal floors at suitable intervals. The dispatcher may be of the rotational type but preferably a nonrotational dispatcher is employed.

The dispatcher for one of the terminal floors may select each of the elevator cars which is to be dispatched from such floor. The dispatcher further may condition the elevator car to be loaded. In an attendant-operated elevator car, the selection and instructions to load may be conveyed to a car attendant by operation of a suitable signal, such as a lamp. However, in an automatic elevator system the selection and instructions to load preferably are conveyed by opening the doors of the elevator car which is to be loaded and additionally illuminating a lantern to indicate that such elevator car is to be loaded for movement in a predetermined direction.

Upon the expiration of the loading period, the dispatcher may start the elevator car. In an attendant-operated system, instructions to start the elevator car may be conveyed to a car attendant by operation of a suitable signal, such as a lamp. However, in the automatic elevator system herein considered, the doors of the elevator car are closed upon the expiration of the loading interval. Upon closing, the doors initiate the starting of the elevator car.

If no elevator car is available at one of the terminal floors, such as the upper-terminal floor, at the time the dispatcher normally would start an elevator car from such floor, an up-traveling elevator car may be conditioned to stop and reverse at the last floor reached by the elevator car for which a call for service is registered which may be answered by such elevator car.

In the automatic elevator system, the doors of each of the elevator cars are opened at each of the intermediate floors whenever the elevator car stops at an intermediate floor. The doors remain open for a suitable time and then automatically reclose. Upon reclosure, the elevator car automatically starts in a suitable direction from the floor at which it stopped.

The operation of the elevator car doors at the terminal floors may be somewhat different. If the elevator car arrives at a terminal floor without passengers, its doors may remain closed until it is selected as the next car to leave the terminal floor. If the elevator car reaches the terminal floor with passengers to be discharged at such floor, the doors of the elevator car may be opened and, upon expiration of a suitable interval, reclosed until the car is selected as the next car to leave the terminal floor.

If the elevator system is arranged for supervision by a starter attendant located at the lower terminal floor, provision may be made to permit the starter attendant to hold open the doors of any elevator cars selected to leave the lower terminal floor. Such means may be operated by a button located at a starter station positioned at the lower terminal floor adjacent the elevator cars.

Suitable signals are provided for warning passengers that the doors are about to close or that the doors are closing. For example, a buzzer may be provided for each of the elevator cars which is designed to produce a soft buzzing sound shortly before the doors of the elevator car start to close. The buzzing sound continues for a predetermined time which may be adjustable. Preferably, the buzzer does not sound during the opening of the doors. If the doors of an elevator car are prevented from reclosing, a suitable signal, such as that produced by an intermittent buzzer, will be produced after the lapse of a suitable interval. Thereafter, the doors start to close, and even though an obstruction is encountered, continue to close at a reduced speed.

Each door of an elevator car is provided with suitable means for preventing the door from striking an object in the reclosing path with an excessive impact. For example, a safety edge may be provided on each of the doors. If the safety edge is operated during the first portion of the reclosing path of the door, the door is fully reopened and thereafter starts to reclose. If the safety edge encounters an obstruction during the final portion of the closing travel of the door, the door is only partly reopened and thereafter starts to reclose. As previously pointed out, if the door of an elevator car is prevented from reclosing for a substantial period of time, provision is made for positively reclosing the door at reduced speed, if necessary.

To care for the traffic demand variations or the different traffic patterns encountered by the elevator system, different types or modes of operation are provided each designed to cope with a specific traffic demand variation or pattern. The elevator system is transferred from one mode of operation to another mode of operation automatically.

The transfer between modes of operation may be effected on a time basis. This may be suitable for an elevator system serving a building occupied by a single company having employes who follow regular patterns during each business day. In such a case, a time clock may control the system to operate in a mode providing suitable up-peak, off-peak, down-peak and off-hours operation during definite time intervals of each day.

Preferably, the transfer between modes of operation is in response to the traffic demand itself. To illustrate this type of transfer, suitable operation of the system for various traffic patterns and suitable transfers between modes of operation will be outlined.

It will be assumed first that no demand for elevator service exists. Such absence of demand may occur during off-hours periods, such as nights, in office buildings. Under such circumstances, the elevator cars park at predetermined stations. Preferably, all elevator cars park at the lower-terminal floor. If a substantial time has elapsed since the last call for elevator service was answered, the motor generator sets of all of the cars may be stopped. One of the elevator cars parked at the lower terminal floors is selected as the next to leave the terminal floor. The doors of all of the elevator cars may be closed. Alternatively, doors of the selected elevator car alone may be retained in open condition.

When a call for elevator service is registered from one of the floors or if such a call is registered in the selected elevator car, the motor-generator set of the selected elevator car is started and the elevator car is dispatched to answer the registered call. The registered call also may be effective for energizing any other required equipment.

If the selected elevator car is placed in operation, it proceeds to the farthest floor for which a call is registered while the elevator car is set for travel in the up direction which may be answered by such car. In the event that the upper dispatcher is conditioned to start an elevator car promptly when available, the selected car reverses at such farthest floor and returns to the lower-terminal floor. If the upper dispatcher is not conditioned to start an elevator car promptly when available, the selected elevator car proceeds to the upper-terminal floor to be dispatched in a normal manner by the dispatcher for such upper-terminal floor.

If calls for elevator service continue to be registered while the first selected elevator car is in operation, a successive elevator car starts and operates in the same manner discussed for the first selected elevator car upon the expiration of each dispatching interval of the dispatcher for the lower-terminal floor. Thus, on receipt of an infrequent call for elevator service, a selected elevator car may proceed to the farthest floor for which a call is registered which may be answered by such elevator car and may reverse at such farthest floor to return to the lower terminal floor. In response to a moderate increase in the demand for elevator service, two or more of the elevator cars may be placed in operation and may proceed to the upper-terminal floor to be dispatched in a normal manner by the dispatcher for the upper terminal floor. Consequently, for moderate demands for elevator service, the elevator cars may operate on through trips between the terminal floors and may be dispatched at timed intervals from each of the terminal floors.

If an elevator car arrives at the parking floor with no call for elevator service registered by the system and with all other elevator cars parked with their motor-generator sets shut down, the selection of the next elevator car to be dispatched is transferred to the arriving elevator car. Upon the expiration of a suitable interval without further calls for elevator service, the motor-generator set of the arriving car stops.

The next operation of the elevator system to be considered will be that in which a substantial demand for elevator service in the up direction exists. To serve this traffic demand, the elevator system is transferred automatically to a mode of operation which may be designated "up-peak" operation.

The demand for service in the up direction may be measured in various ways. In a preferred embodiment of the invention, the service demand in the up direction is determined by a measurement of the rate of loading of elevator cars set for up travel at the lower terminal floor. When this rate of loading exceeds a predetermined value, the system is automatically transferred to up peak operation.

For up-peak operation, the elevator cars are placed in service successively as discussed for off-hours operation or the cars may be already in off-peak operation at the time the up-peak occurs. For the up-peak, travel of the elevator cars in the up direction is expedited. If desired, the floors may be divided into groups or zones each having certain of the elevator cars assigned thereto. Thus, certain of the elevator cars may be assigned to accept passengers from the lower-terminal floor for a low zone of floors, whereas the remainder of the elevator cars may be assigned to accept passengers for a higher zone of floors.

In one embodiment of the invention, all of the elevator cars are conditioned to accept passengers from the lower-terminal floor for all of the floors served by the elevator cars. Each of the elevator cars is assigned to travel to the farthest floor for which a call is registered while the elevator car is set for up travel which may be answered by the elevator car, and to reverse at such floor for return to the lower terminal floor. When the elevator system is first conditioned for such operation, any elevator car at the upper-terminal floor may be started immediately.

The elevator system may include further measures for expediting travel in the up direction. For example, certain or all of the elevator cars may be conditioned to disregard calls for down elevator service registered from floors.

Upon termination of the substantial demand for elevator service in the up direction, the elevator sysem may return automatically to off-peak or off-hours operation.

When a substantial demand for elevator service in the down direction is registered, the elevator system may be transferred automatically to a mode of operation termed "down-peak" operation wherein service in the down direction is expedited. Such a service demand may be measured in various ways. In a preferred embodiment of the invention, such a service demand is considered to exist when the number of registered calls for down service exceed a certain number or quota, when an elevator car traveling in the down direction is loaded, when the elevator system is not heavily loaded in the up direction and when no elevator car traveling in the up direction has a predetermined load. When once conditioned to provide down-peak operation, the elevator system may continue to provide such operation until a suitable change in the service demand occurs. For example, when the service demand drops below a predetermined number of calls for down service, the elevator system may be returned to off-peak operation.

When conditioned for down-peak operation, the elevator system may expedite service in the down direction in any suitable manner. In a preferred embodiment of the invention, during the down-peak operation the floors are divided into a low-zone group and a high-zone group.

Certain of the elevator cars termed low-zone elevator cars are assigned to provide special elevator service for the low zone of floors and the remainder of the elevator cars termed high-zone elevator cars are assigned to provide special service for the high zone of floors or, in some cases, similar service for all of the floors. All of the elevator cars may accept registered car calls for all of the floors served by the elevator cars. However, for some installations, it may be preferable to prevent the elevator cars assigned to the low zone from answering registered car calls for floors of the high zone or all of the floors. Under such circumstances, the floor lanterns for the low-zone cars at the lower terminal floor may be extinguished throughout the down peak operation. If desired, the floor lanterns for the high-zone elevator cars at the lower terminal floor may be illuminated throughout the down-peak operation.

Should the elevator system be placed on down-peak operation while a low-zone elevator car is in the high zone of floors, the low-zone elevator car may operate for the remainder of its trip as a high-zone elevator car.

During down-peak operation, the low-zone cars may be conditioned to ignore registered up floor calls. However, if a low-zone elevator car stops at a floor in response to a registered car call, it may be conditioned to cancel any registered up floor call for such floor.

Each of the elevator cars may be conditioned when traveling up to reverse at the farthest floor in its zone for which a call is registered which may be answered by such elevator car.

Further improvement in the efficiency of the elevator system may be effected by conditioning any elevator car loaded at the lower terminal floor to reverse at the farthest floor for which a call is registered while the elevator car is set for up travel which may be answered by such elevator car.

If the system includes one or more basement floors, one or more of the elevator cars may be assignable to answer calls registered for such floors. If such an elevator car arrives at the lower-terminal floor while traveling down, and a call for a basement floor is registered by the car-call registering means or by the basement floor-call registering means, the elevator car is conditioned to proceed to the basement floor and is removed from control by the dispatcher for the lower terminal floor until the elevator car returns to the terminal floor.

Each floor lantern which is illuminated preferably is conditioned to be extinguished when the associated elevator car is conditioned to leave the floor at which the lantern is illuminated. Even though the doors of the elevator car are reopened or held open, the lantern remains extinguished to discourage prospective passengers from entering the elevator car.

It is, therefore, a first object of the invention to provide an improved bank of elevator cars.

It is a second object to provide an improved bank of elevator cars having automatic transfer between a mode of operation wherein elevator car operation stops in the absence of a call for elevator service and a second mode of operation.

It is a third object of the invention to provide an improved bank of elevator cars having automatic transfer between a first mode of operation for periods of infrequent demand for elevator service and a second mode of operation for periods of greater demand for elevator service.

It is a fourth object of the invention to provide an improved bank of elevator cars having automatic transfer between a first mode of operation for periods of infrequent demand for elevator service, a second mode of operation for periods wherein a substantial demand for elevator service in the up direction exists, and a third mode of operation wherein a substantial demand for elevator service in the down direction exists.

It is a fifth object of the invention to provide an improved bank of elevator cars having automatic transfer between a first mode of operation for periods wherein infrequent demand for elevator service is encountered, a second mode of operation for periods wherein substantially heavier demand for elevator service in two directions of travel are present, a third mode of operation for periods wherein substantial travel in the up direction is demanded, and a fourth mode of operation for periods wherein a substantial demand for travel in the down direction is present.

It is a sixth object of the invention to provide an improved elevator system wherein elevator cars are parked during absence of demand for elevator service, elevator cars start successively as demand for elevator service continues, and elevator cars reaching terminal floors during continuous demand for elevator service are dispatched under control of dispatching means.

It is a seventh object of the invention to provide an improved elevator system of the type set forth in any of the preceding objects wherein a non-rotational dispatcher is incorporated.

It is an eighth object of the invention to provide an elevator system as set forth in any of the preceding objects wherein energized equipment is automatically deenergized when not required for operation of the system.

It is a ninth object of the invention to provide an improved elevator system wherein elevator cars provide expedited service in one direction of travel in response to an increase in demand for elevator service in such direction.

It is a tenth object of the invention to provide an improved elevator system having different modes of operation and having floor signals having a different control for each of said modes of operation.

It is an eleventh object of the invention to provide an elevator system having elevator cars normally dispatched from terminal floors wherein an elevator car approaching a terminal floor with a call registered for a floor beyond such terminal floor which may be answered by such elevator car is removed from control by the dispatcher from such terminal floor and proceeds to answer such call.

It is a twelfth object of the invention to provide an improved elevator system wherein doors of an elevator car are opened to different extents.

It is a thirteenth object of the invention to provide an improved elevator system wherein doors of an elevator car, if reopened before full closure thereof, are opened to an extent dependent on a position of such doors at the start of the reopening operation.

It is a fourteenth object of the invention to provide an improved bank of elevator cars having a dispatcher for automatically starting selected elevator cars from a terminal floor and having a control operable from a predetermined station for holding open the doors of any elevator cars selected to leave such terminal floor.

It is a fifteenth object of the invention to provide an improved elevator system having signals for advising passengers or prospective passengers of the elevator cars of impending changes in the condition of the elevator system.

Other objects of the invention will be apparent from the following description, taken in conjunction with the accompanying drawings, wherein:

Figs. 3A to 8A are key representations of electromagnetic relays and switches employed in the circuits of Fig. 3. If Figs. 3A to 8A are paced in horizontal alignment, respectively, with Figs. 3 to 8, it will be found that corresponding coils and contacts of the two sets of figures are in horizontal alignment.

Figure 1:
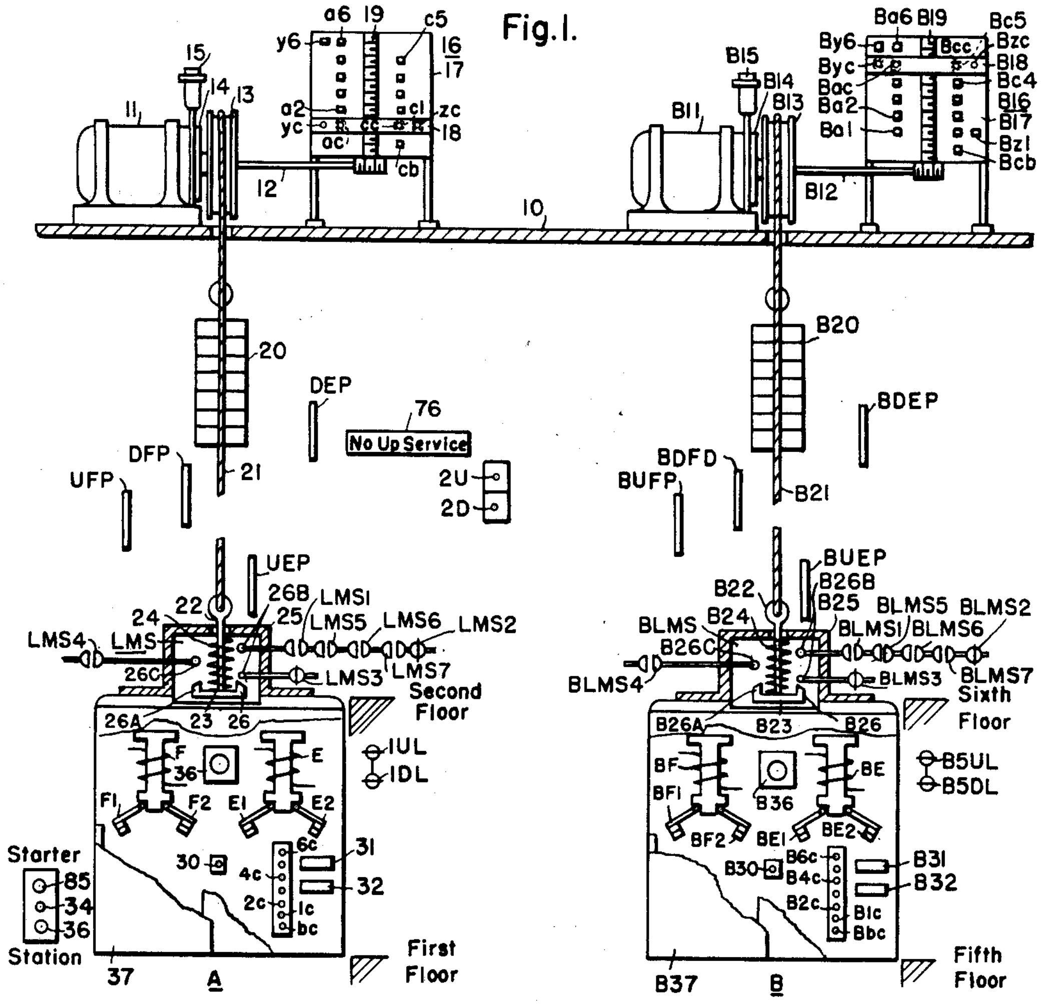
Figure 1 is a view in elevation with parts broken away of an elevator system in which the invention may be incorporated.

As previously pointed out, aspects of the invention may be incorporated in elevator systems having any desired number of elevator cars, arranged either for attendant operation or for automatic operation and the elevator systems may be arranged to serve any desired number of floors. However, the invention may be described adequately with reference to an elevator system having four elevator cars serving a building structure having seven floors, one of which is a basement floor, and arranged for fully automatic operation. For this reason, the illustration and description of the invention will be directed particularly to such a system.

The four elevator cars of the system are designated by the reference characters A, B, C and D. It will be assumed that the elevator cars A and C may be assigned under certain conditions as low-zone cars to provide preferred service for a low-zone group of floors which include the floors 2, 3 and 4. Since the circuits for these two cars are similar, the circuits for the elevator car A are illustrated in substantial detail. It will be understood that the control circuits for the elevator car C are similar to those illustrated for the elevator car A. For this reason most of the control circuits for the elevator car C are omitted from the illustration.

It is assumed that, under certain conditions of operation, the elevator cars B and D may be assigned as high-zone cars to provide service for a high zone of floors, including floors 5 and 6. Since the circuits for the cars B and D are essentially similar, circuits are shown in substantial detail for only the car B. Insofar as is practicable, circuits and components for the elevator car A are illustrated on the left side of Figs. 1, 3, 4, 5 and 6, and circuits for the elevator car B on the right side of such figures.

The equipment and control circuits for the elevator cars A, B, C and D include many similar components. For this reason, components for the cars B, C and D, which are similar to the components associated with the elevator car A, are identified by the reference characters employed for the elevator car A preceded respectively by the prefixes B, C and D to indicate that the components are associated respectively with the elevator cars B, C and D. For example, the elevator cars A, B, C and D each have associated therewith, respectively, the lower terminal start relays SL, BSL, CSL and DSL. For this reference character, the prefixes B, C and D indicate that the relays are associated respectively with the elevator cars B, C and D.

The electromagnetic switches and relays employed in the control circuits may have numerous contacts. For this reason, each of the sets of contacts of a relay or switch is identified by the reference character employed for the relay or switch, followed by a numeral or suffix indicating the specific set of contacts. For example, the reference characters SL1 and SL3 indicate, respectively, the first and third sets of contacts for the lower terminal start relay SL.

Two types of contacts are employed for the switches and relays. One type may be referred to as back or break contacts. Such contacts are closed when the associated switch or relay is deenergized and dropped out. The contacts are opened when the associated switch or relay is energized and picked up.

The second type of contacts may be referred to as front or make contacts. Such contacts are open when the associated switch or relay is deenergized and dropped out. The contacts are closed when the associated relay is energized and picked up.

For reference purposes, the following lists of apparatus specific to elevator car A and apparatus common to all of the elevator cars are set forth:

*Apparatus for elevator car A*

ZZ—Generator voltage relay
V—Speed relay
U—Up switch
M—Running relay
D—Down switch
G—Holding relay
E—Inductor slowdown relay
F—Inductor stopping relay
W—Up-direction relay
X—Down-direction relay
70T—Noninterference relay
Z—Door-safety relay
*b*CR and 1CR to 6CR—Car-call registering relays
T—Car-call stopping relay
S—Floor or corridor-call stopping relay
Y—Auxiliary load relay
LW—Load relay
78U—High-call relay
78—No-call relay
78P—Low-zone high-call relay
R—Door-control relay
LC—Door-close relay
OP—Door-open relay
H—Car-call detecting relay
TT—Upper-terminal relay
NT—Upper-terminal next relay
ST—Upper-terminal start relay
LT—Lower-terminal relay
NL—Lower-terminal next relay
SL—Lower-terminal start relay
MG—Motor-generator starting switch

*Apparatus common to all cars*

*b*UR and 1UR to 5UR—Up-corridor-call registering relays
1DR to 6DR—Down-corridor-call registering relays
HCM—High-call reversal relay
HD—Common-door-hold relay
QL—Loaded-car quota relay
Q—Down-corridor-call quota relay
DP—Down-peak relay
K—Time-period relay
N—Reset relay
HT—Heavy-traffic relay
QA—Stop-quota relay
KT—Reset stop relay
1SD—Upper-interval-holding relay
1SU—Lower-interval-holding relay
NS—Transfer relay
MGT—Timing relay In order to present the invention in an orderly manner, the apparatus and control circuits for each of the Figures 3 to 8 will be discussed separately. Thereafter, a number of typical operations of the entire system will be considered.

Since many similar components are employed in the apparatus and control circuits for the cars A, B, C and D, the description of the apparatus and controlled circuits will be directed primarily to those associated with the elevator car A. With the notation employed, similar components employed for the other elevator cars readily may be traced. If different components are employed for certain of the elevator cars, these different components will be discussed as required.

*Figure 1*

Figure 1 illustrates the association of the elevator cars A and B with the building or structure served by the elevator system. The elevator car A is assumed to be stopped at the first floor of the building, whereas the elevator car B is assumed to be stopped at the fifth floor of the building.

It will be noted that the building is provided with a penthouse having a floor 10 on which certain apparatus of the elevator system is mounted. Thus, for the elevator car A, an electric motor 11 is provided having a shaft 12 on which is mounted a traction sheave 13 and a brake drum 14. A brake 15 of the spring-applied magnetically-released type commonly employed for elevator systems cooperates with the brake drum 14 to stop or permit rotation of the motor 11.

The shaft 12 also is coupled to a floor selector 16. This floor selector has a panel 17 on which is mounted rows of contact segments corresponding to the various floors serving the elevator car. For example, the panel 17 contains a row of contact segments *a*1 to *a*6 which cooperate with a brush *ac* mounted on a carriage 18. The carriage is reciprocated by means of a screw 19 which is mounted for rotation on the panel 17. This screw is coupled to the shaft 12 of the motor through suitable gearing for the purpose of moving the carriage 18 relative to the panel 17 in accordance with movement of the elevator car A relative to the building which it serves, but at a reduced rate of travel. The contact segments *a*1 to *a*6 are associated with control circuits, respectively, for the first to sixth floors and are engaged successively by the brush *ac* as the elevator car proceeds from the lower terminal or first floor to the upper terminal or sixth floor. The panel 17 also has a contact segment *y*6 positioned to be engaged by a brush *yc* mounted on the carriage 18 when the elevator car A is at the upper terminal floor. As a further example, the panel 17 has a row of contact segments *cb* for the basement floor and *c*1 to *c*5, respectively, for the first to fifth floors which are engaged by a brush *cc* mounted on a carriage 18 as the elevator car A moves from the basement floor to the fifth floor. A contact segment B*z*1 is shown on the floor selector B16 for the elevator car B which is engaged by a brush B*zc* when the elevator car B is at the lower terminal or first floor. It will be understood that a similar contact segment and a similar brush are provided for the floor selector 16. Additional contact segments and brushes also are provided but are not illustrated in Fig. 1. The arrangement of these contact segments and brushes will be understood from the above discussion. It will be understood that the floor selector duplicates in miniature the movements of the elevator car and the floor selector is employed in a conventional manner for the purpose of controlling the connections of circuits as the elevator car moves in its hoistway.

The elevator car A is connected to a counter-weight 20 through one or more flexible ropes or cables 21 which pass over the sheave 13. Each rope 21 is connected to the elevator car A through a pin 22 which has a flange or head 23. A compression spring 24 is located between the flange or head 23 and a bracket 25 which is secured to the elevator car. Consequently, the compression of the spring 24 is a measure of the load carried by the elevator car.

For certain control purposes, to be discussed below, it is desirable to provide a device which is responsive to the load carried by the elevator car. Such a device is represented in Fig. 1 by a load-measuring switch LMS having cam followers 26B and 26C which are actuated by cams 26 and 26A secured to the flange or head 23. Consequently, when sufficient load, which may be full load, enters the elevator car to bring the cam 26 into engagement with the cam follower 26B, the switch is operated to open or close certain contacts LMS1, LMS2, LMS5, LMS6, and LMS7. Contacts LMS3 are normally closed and are open if one or more passengers are in the car. In addition auxiliary load-measuring contacts LMS4 are operated by the cam 26A for a smaller value of load in the elevator car.

The elevator car A carries an inductor slowdown relay E and an inductor stopping relay F which are employed in the slow down and stopping of the elevator car. Such inductor relays may be of a conventional type. For example, the inductor relay E has two break contacts E1 and E2. These contacts remain closed after the coil of the inductor relay is energized until the relay during the movement of the elevator car comes into horizontal alignment with an inductor plate UEP or DEP mounted in the hoistway within which the elevator car A operates. A separate inductor plate UEP is positioned to come into horizontal alignment with the inductor relay E in advance of each of the floors at which the elevator car is to stop during up travel. A separate inductor plate DEP is positioned to come into alignment with the inductor relay E in advance of each of the floors at which the elevator car A is to stop during down travel thereof.

If the coil of the inductor relay E is energized, such energization alone is insufficient to pick up either of the contacts E1 or E2. However, if the inductor relay E, while its coil is energized, reaches one of the inductor plates UEP, a magnetic circuit is completed which results in opening of the break contacts E1. Thereafter the break contacts may remain open until the coil E is deenergized, even though the inductor relay passes the inductor plate.

In a similar manner, if the coil of the inductor relay E is energized and the inductor relay reaches one of the inductor plates DEP during down travel of the elevator car, the break contacts E2 open and remain open until the coil is deenergized.

The inductor stopping relay F cooperates in a similar manner with the inductor plates UFP and DFP. It will be understood that a separate inductor plate UFP is positioned to be reached by the inductor relay F slightly in advance of each of the floors at which the elevator car A, while set for up traveling, is to stop. A separate inductor plate DFP is positioned to be reached by the inductor stopping relay F slightly in advance of each floor at which the elevator car A may stop while it is set for down travel.

The elevator car A also contains a car station provided with a plurality of car-call push buttons which may be operated to register calls for floors desired by passengers within the elevator car. For example, the push button *bc* may be operated to register a call for the basement floor. In a similar way, the push buttons 1*c* to 6*c* may be operated to register calls for the first to sixth floors.

The elevator car A may contain a push button 30 which may be operated to retain the doors of the elevator car in open condition.

Provision may be made for conveying information concerning the elevator system to passengers or prospective passengers. Thus, the elevator car A may contain a sign 31 which when operated informs passengers within the elevator car that the elevator car will leave soon. A second sign 32 may be provided to inform passengers, when operated, that another elevator car will leave first.

For each of the elevator cars, signals, such as floor lanterns, may be located at the various floors to indicate the direction at which the elevator car will leave each floor at which it is stopped. For example, the elevator car A has at the first floor an up floor lantern 1UL and a down floor lantern 1DL.

In order to permit prospective passengers located at the various floors to register calls for elevator service, suitable push-button stations are located at the floors. Each of the push-buttons for registering a call for up service is identified by the reference character U preceded by a prefix denoting the floor at which the push button is associated. In an analogous manner, each of the push-buttons associated with a floor from which a down call may be registered is identified by the reference character D preceded by a prefix denoting the specific floor with which the push-button is associated. Thus the floor push-button station for the second floor includes an up-floor push-button 2U and a down-floor push-button 2D.

In addition, certain information may be conveyed to prospective passengers at the floors. For example, at certain of the floor stations signs 76 may be provided which, when operated, inform prospective passengers that no up service is being provided from such floors.

At the lower terminal floor, a starter station is provided from which certain control operations may be performed. For example, at the starter station, a push button 34 may be provided which when operated holds open the doors of any of the elevator cars selected to leave the lower terminal floor.

Each of the elevator cars may be provided with suitable doors for controlling the passage between each of the elevator cars and the associated floors. The doors may be of any desired type, such as center-opening doors, side-opening doors, single-speed doors and two-speed doors. For present purposes, it will be assumed that the elevator car A has a side-opening single-speed door 37.

In many cases, it will be desirable to provide an intercommunication system for permitting two-way conversation between each of the elevator cars and the starter station. Such a system is illustrated in Fig. 1 by speakers 36 which may serve not only as speakers but as microphones. One of these is located at the starter station and one in each of the elevator cars. It will be understood that suitable equipment is provided for permitting two-way conversation between the starter station and each of the elevator cars.

Figure 2:
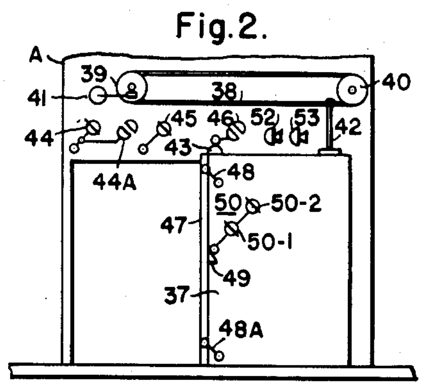
Fig. 2 is a view in elevation with parts broken away of an elevator car suitable for the system of Fig. 1.

*Figure 2*

Fig. 2 shows in somewhat greater detail a suitable door structure for the elevator car A. A suitable door operator may be employed for opening and closing the door 37. In the embodiment of Fig. 2, the door operator includes an endless belt 38 which is mounted for movement about spaced sheaves 39 and 40. One of the sheaves may be coupled to a motor 41 for rotation to open and close the door.

It will be noted that the door 37 has a link 42 connecting the door to one bight of the belt 38. Consequently, movement of the belt about the associated sheaves operates to open and close the doors 37.

Movement of the door 37 is utilized to operate certain mechanical switches. To this end, a cam 43 is secured to the door for the purpose of engaging cam followers of mechanical switches 44, 44A, 45 and 46. The switches 44, 45 and 46 are biased to their closed positions whereas the switch 44A is biased to open position. The cam 43 engages the cam follower for the switches 44 and 44A as the door 37 reaches its closed position for the purpose of operating the switches 44 and 44A. The switch 44 serves as a limit switch. The cam 43 engages the cam follower of the switch 46 for the purpose of opening the switch as the door reaches its fully opened position and the switch 46, therefore, serves as a limit switch. The third switch 45 has its cam follower engaged by the cam 43 as the door in opening reaches an intermediate position. This switch is employed for permitting a limited opening of the door under certain conditions of operation. The switch 44A is closed as the door reaches its fully-closed position.

The door 37 preferably is provided with a device for detecting the presence of an obstruction in the closing path of the elevator car door. For example, the door 37 may be provided with a safety edge 47 which is connected to the door by means of two parallel links 48 and 48A each having a first end pivotally connected to the safety edge and a second end pivotally connected to the door. By inspection of Fig. 2, it will be observed that the weight of the safety edge normally maintains the safety edge extended slightly from the door 37. During the reclosing movement of the door 37, if the safety edge engages an obstruction, the edge is moved relative to the door 37 through a path determined by the links 48 and 48A. This movement of the safety edge operates through a cam 49 secured to the safety edge to open a normally-closed mechanical switch 50. If the obstruction is removed, the safety edge returns to the position illustrated and the switch 50 is reclosed.

If desired, the safety-edge may be rendered ineffective when the door is fully open. For example, when the door is fully open the safety edge may be located against a stop which prevents movement of the safety edge, or the safety edge may be concealed in a well between the elevator car and the hoistway wall when the door is fully open. When the door starts to close the safety edge immediately becomes effective.

Information concerning movement of the door may be conveyed to passengers and prospective passengers by suitable signalling devices, such as buzzers 52 and 53.

Figure 3:
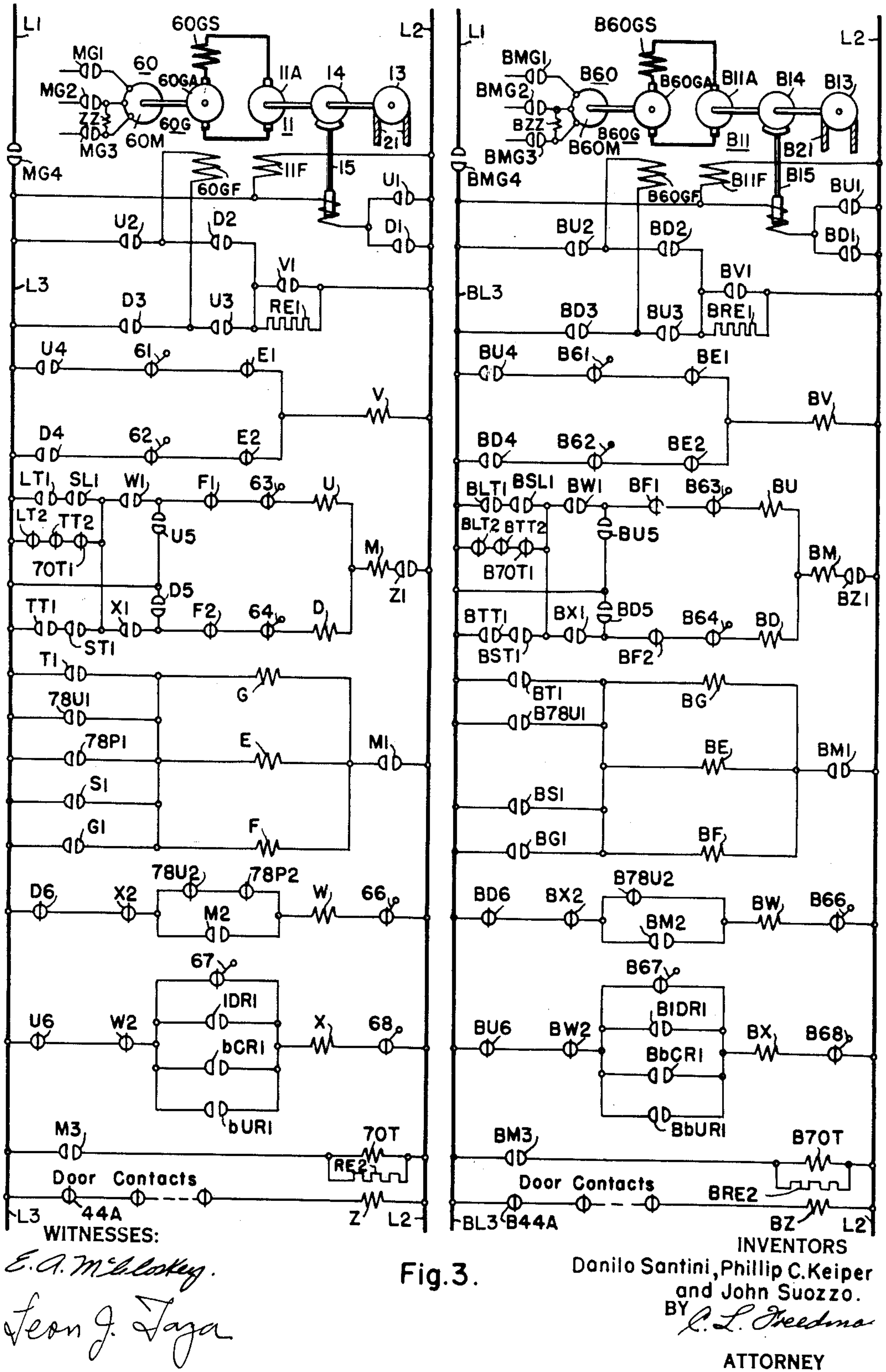
Figs. 3 to 8 are schematic views in straight line form showing control circuits suitable for the elevator system of Fig. 1.
Figure 3A:
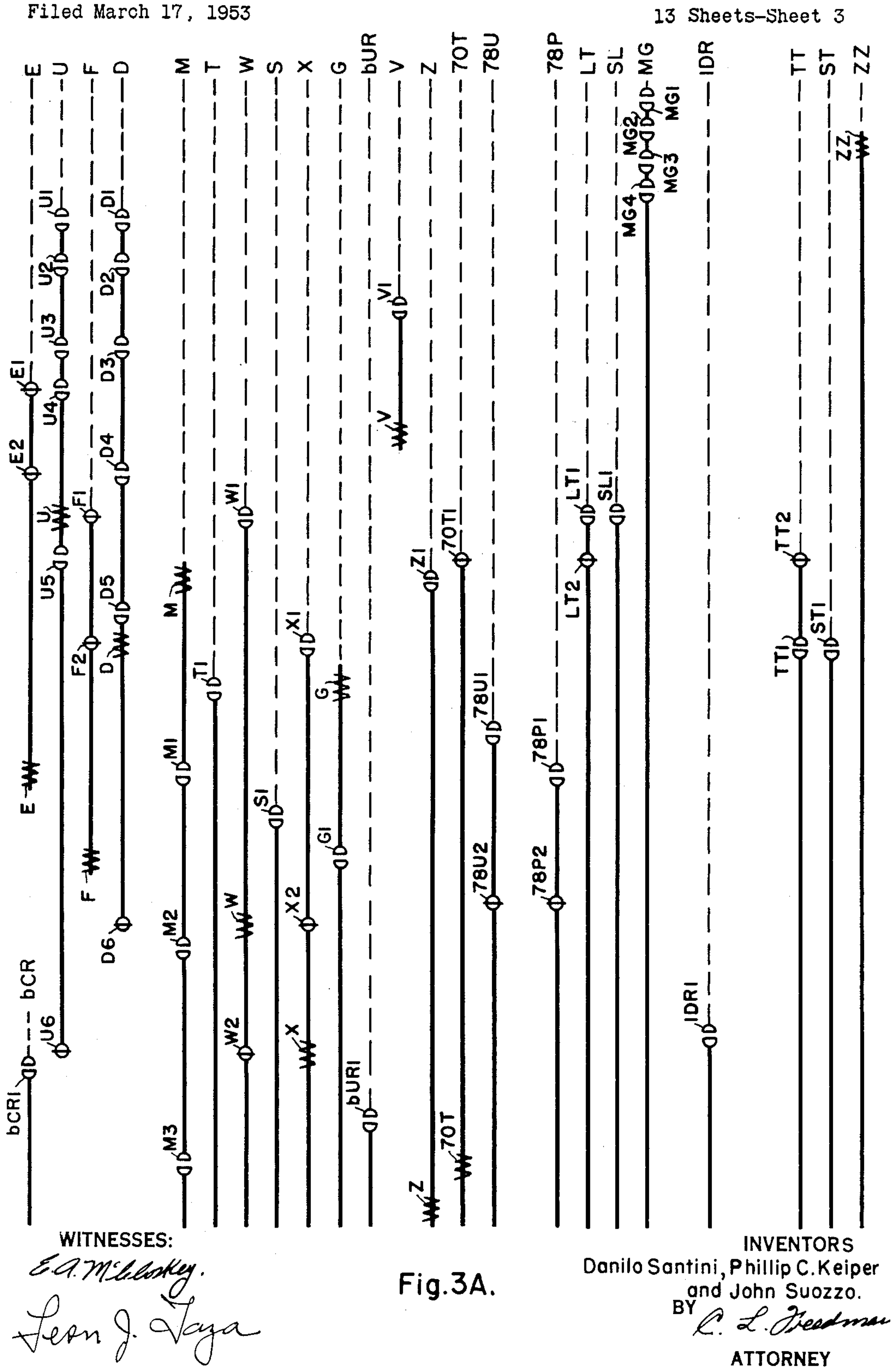

*Figure 3*

In Fig. 3, control circuits are illustrated for the motor 11, the brake 15, speed relay V, up switch U, running relay M, down switch D, holding relay G, inductor relays E and F, up-direction relay W, down-direction relay X, non-interference relay 70T and door-safety relay Z.

Energy for the control circuits is derived from a suitable direct-current source represented by buses L1 and L2. Certain of the control circuits for the elevator car A are connected for energization between the bus L2 and the bus L3 which is connected to the bus L1 only when make contacts MG4 of a motor-generator starting switch MG are closed to indicate that a motor-generator set 60 is energized.

The motor-generator set 60 includes a direct-current generator 60G having an armature 60GA connected to the armature 11A of the motor 11 to form a loop circuit which may include a series field winding 60GS for the generator. The armature of the direct-current generator 60G is rotated at a constant rate in any suitable manner as by means of a three-phase induction motor 60M which is connected to a suitable three-phase source of energy through make contacts MG1, MG2 and MG3 of the motor-generator starting switch MG.

A generator voltage relay ZZ is connected across two terminals of the motor 60M and is designed to pick up with a time delay sufficient to permit the motor-generator set to come up to speed after the contacts MG1, MG2 and MG3 close.

By inspection of Fig. 3, it will be observed that the motor 11 is controlled by the well-known variable-voltage system. The motor 11 has a field winding 11F connected across the buses L2 and L3.

It will be recalled that the brake 15 is of the conventional spring-applied electromagnetically-released type. In order to release the brake, the coil of the brake is connected across the buses L3 and L2 through make contacts U1 of the up-switch U or make contacts D1 of the down-switch D.

The direction of movement and the speed of the elevator car are determined by the energization of a separately-excited field winding 60GF provided for the generator 60G. This field winding may be connected through a resistor RE1 and contacts of a reversing switch across the buses L2 and L3. The reversing switch may comprise make contacts D2 and D3 of the down-switch D which are closed when the elevator car is conditioned for travel in the down direction. The reversing switch is completed by make contacts U2 and U3 of the up switch U, which are closed when the elevator car is conditioned for travel in the up direction. For full speed operation, the make contacts V1 of the speed relay V are closed to shunt the resistor RE1.

When the elevator car is conditioned for up travel, the speed relay V is connected across the buses L2 and L3 through the break contacts E1 of the inductor slowdown relay E, the make contacts U4 of the cup switch U and normally-closed contacts of a limit switch 61. The limit switch is normally biased in closed condition and is cam-operated to open as the elevator car nears its upper limit of travel.

When the elevator car A is conditioned for travel in the down direction, the speed relay V is connected across the buses L3 and L2 through the break contacts E2 of the inductor slowdown relay, the make contacts D4 of the down switch D and the normally-closed contacts 62 of a limit switch. The limit switch 62 normally is biased in closed condition and is cam-operated to open as the elevator car nears its lower limit of travel.

Before the elevator car A can move, the break contacts Z1 of the door safety relay Z must be closed to indicate that all of the doors associated with the elevator car A are in safe condition. Under these circumstances, the running relay M and one of the switches U or D may be energized. If the elevator car A is at the lower-terminal floor conditioned for up travel, the elevator car may be started through the circuit

L1, MG4, L3, LT1, SL1, W1, F1, 63, U, M, Z1, L2

Closure of the make contacts LT1 indicates that the elevator car is at the lower terminal floor. Closure of the make contacts SL1 indicates that the dispatcher for the lower terminal floor is in condition to start the elevator car A. If the car is set for up travel, the make contacts U1 are closed. Under the assumed conditions, the break contacts F1 of the inductor stopping relay are closed and the normally-closed mechanical limit switch 63 permits energization of the desired switch and relay. The limit switch 63 is normally biased in closed position and is cam operated to open as the elevator car nears its upper limit of travel. When the up switch U operates, make contacts U5 close to establish a holding circuit around the contacts LT1, SL1 and W1.

If the elevator car A is at the upper terminal floor, the down switch D and the running relay M may be energized through the circuit

L1, MG4, L3, TT1, ST1, X1, F2, 64, D, M, Z1, L2

Closure of the make contacts TT1 indicates that the car is at the upper terminal floor and closure of the contacts ST1 occurs when the dispatcher for the upper terminal floor is conditioned to start the elevator car A. If the elevator car A is set for down travel, make contacts X1 of the down-direction relay X are closed. Under the assumed conditions, the break contacts F2 of the inductor stopping relay, normally closed contacts of the limit switch 64, and break contacts Z1 of the door-safety relay are all closed. The limit switch 64 is normally biased into closed condition and is cam-operated to open as the elevator car A nears its lower limit of travel.

When the down switch D is energized, it closes its make contacts D5 to establish a holding circuit around the contacts TT1, ST1 and X1.

When the elevator car A is displaced from the upper and lower terminal floors, the contacts LT1 and TT1 are open. Therefore, the running relay M, the up switch U and the down switch D cannot be energized to start the elevator car from the floor at which it is stopped in the manner described previously.

However, by inspection of Fig. 3, it will be noted that the contacts LT1 and SL1, on the one hand, and contacts ST1 and TT1, on the other hand, may be bypassed by the contacts LT2, TT2 and 70T1. The break contacts LT2 and TT2 are closed when the elevator car A is displaced from the terminal floors. The break contacts 70T1 are closed after the elevator car A has remained at a floor for a sufficient time for the elevator car to discharge passengers. Consequently, these contacts control the starting of the elevator car from a floor displaced from the terminal floors.

For the inductor relays E and F and the holding relay G to be energized, the elevator car A must be in running condition (make contacts M1 are closed) and one of four possible conditions must be present. Thus an energizing circuit for the relays will be completed if the make contacts T1 are closed to indicate that a car-call is registered for the next floor to be reached by the elevator car at which the car can stop. The relays also may be energized if the make contacts 78U1 are closed to indicate that the elevator car is approaching the farthest floor in the up direction for which a call is registered which may be answered by the elevator car and at which the elevator car is conditioned to reverse. If the elevator car A is assigned to the low zone during a down-peak operation and is approaching the highest floor in the low zone for which a down-floor call is registered, and if the elevator car is not conditioned to respond to car-calls for floors above such farthest floor, make contacts 78P1 are closed to complete an energizing circuit for the relays G, E and F. Finally, an energizing circuit for the relays may be completed through the coils S1 of the floor- or corridor-call stopping relay. These contacts are closed when the next floor to be reached by the elevator car has a floor call registered therefor for which the elevator car may stop.

When the holding relay G is energized, it closes its make contacts G1 to establish a holding circuit for the relays G, E and F, as long as the make contacts M1 remain closed.

The energizing circuit for the up direction relay W is as follows:

L1, MG4, L3, D6, X2, 78U2, 78P2, W, 66, L2.

If the down switch D is not energized and if the down-direction relay X is not energized, the break contacts D6 and X2 are closed to permit energization of the up-direction relay. Break contacts 78U2 are closed when the elevator car A is not nearing the farthest floor while traveling in the up direction for which a call is registered which may be answered by the elevator car and at which floor the elevator car A is conditioned to reverse. If the elevator car A is operating during a period which is not a down peak, or if it is operating as a low zone car during the down peak and is not nearing the farthest floor in the low zone for which a down floor call is registered at which the elevator car A is to stop and reverse, the break contacts 78P2 are closed.

The limit switch 66 is a mechanical switch which normally is biased into closed position. It is cam operated to open as the elevator car A nears its upper limit of travel.

Inasmuch as the elevator car B is not intended to operate as a low-zone car, no contacts corresponding to the contacts 78P1 and 78P2 are provided for the elevator car B.

When the elevator car A is proceeding in a down direction towards the lower terminal floor, the down-direction relay is energized through the circuit

L1, MG4, L3, U6, W2, 67, X, 68, L2

The break contacts U6 and W2 are closed when the up switch U is deenergized and when the up-direction relay W is deenergized.

The mechanical switches 67 and 68 are normally biased into closed condition. The switch 67 is cam operated to open as the elevator car A reaches the lower terminal floor. The limit switch 66 is cam operated to open as the elevator car reaches the basement floor.

If the elevator car A is to proceed to the basement floor, a shunt must be established around the switch 67. Such a shunt is established in any of three different ways. If a down-floor call is registered at the lower terminal floor, the make contacts 1DR1 are closed to shunt the switch 67. If a car-call is registered in the elevator car A for the basement floor, the make contacts *b*CR1 are closed to shunt the switch 67. If a floor call is registered from the basement floor, the make contacts *b*UR1 are closed to establish a shunt around the switch 67. For each of these three conditions, the elevator car A proceeds to the basement floor before reversing for travel in the up direction.

When the elevator car A stops at a floor and its doors are opened to discharge passengers, sufficient time should elapse before the doors are reclosed to permit discharge or entry of passengers. Such time is permitted by the noninterference relay 70T which has a delayed dropout. The delay in dropout of the relay may be produced in any desired manner and is represented in Fig. 3 by a resistor RE2 which is shunted around the coil of the relay. This relay is deenergized by opening of the make contacts M3 when the car A stops at a floor. Pick up of the relay 70T controls the starting of the elevator car A from any of the floors with the exception of the terminal floors.

As previously pointed out, a door-safety relay Z is provided which must be energized before the elevator car can be started from a floor. This relay is energized through break contacts operated by each of the doors associated with the elevator car doors, including hoistway doors, if employed. The contacts for each of the doors are closed only when the doors are in closed position. Consequently, all of the doors associated with the car A must be closed before the relay Z can be energized to permit departure of the car A.

Figure 4:
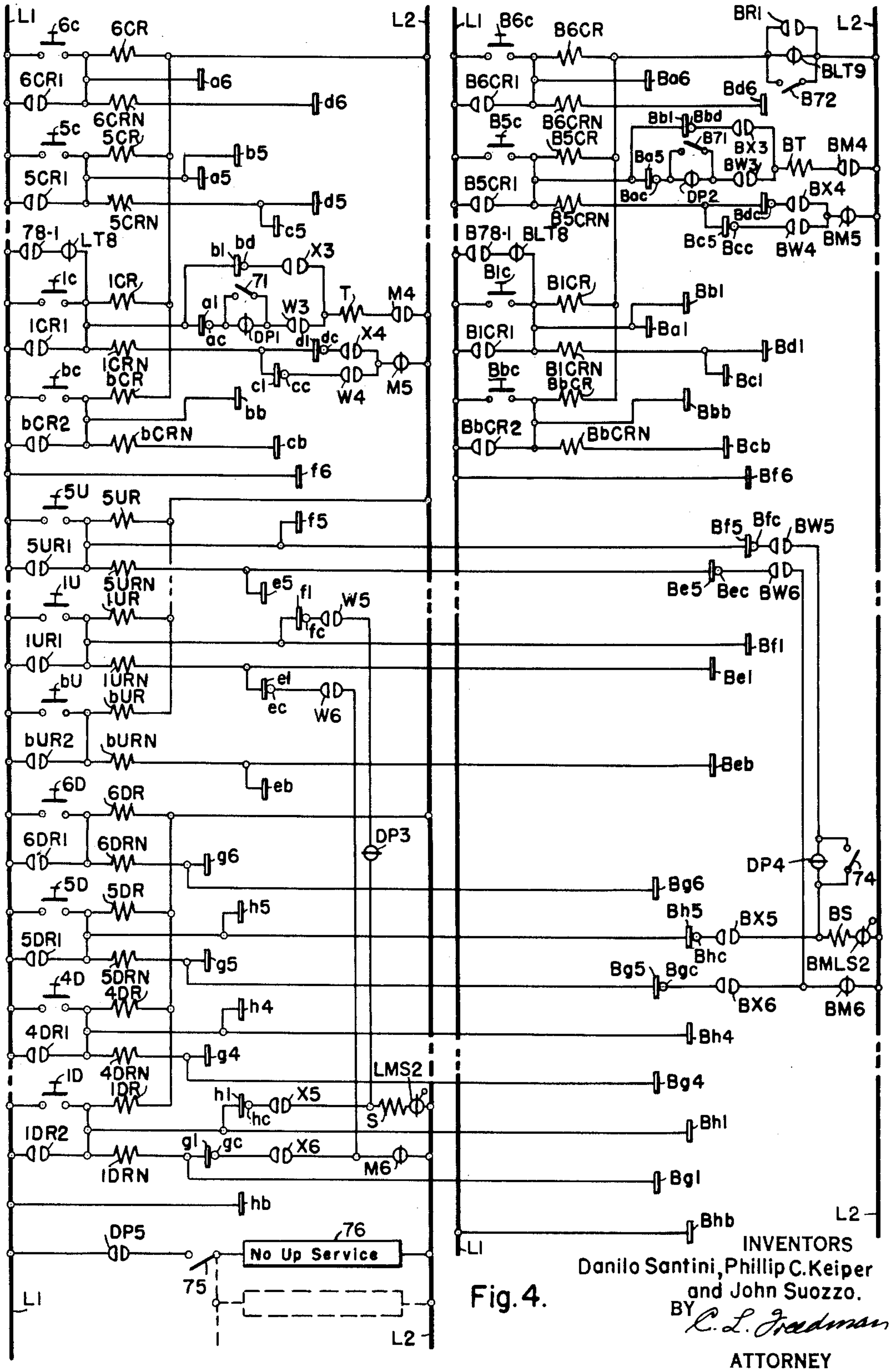
Figure 4A:
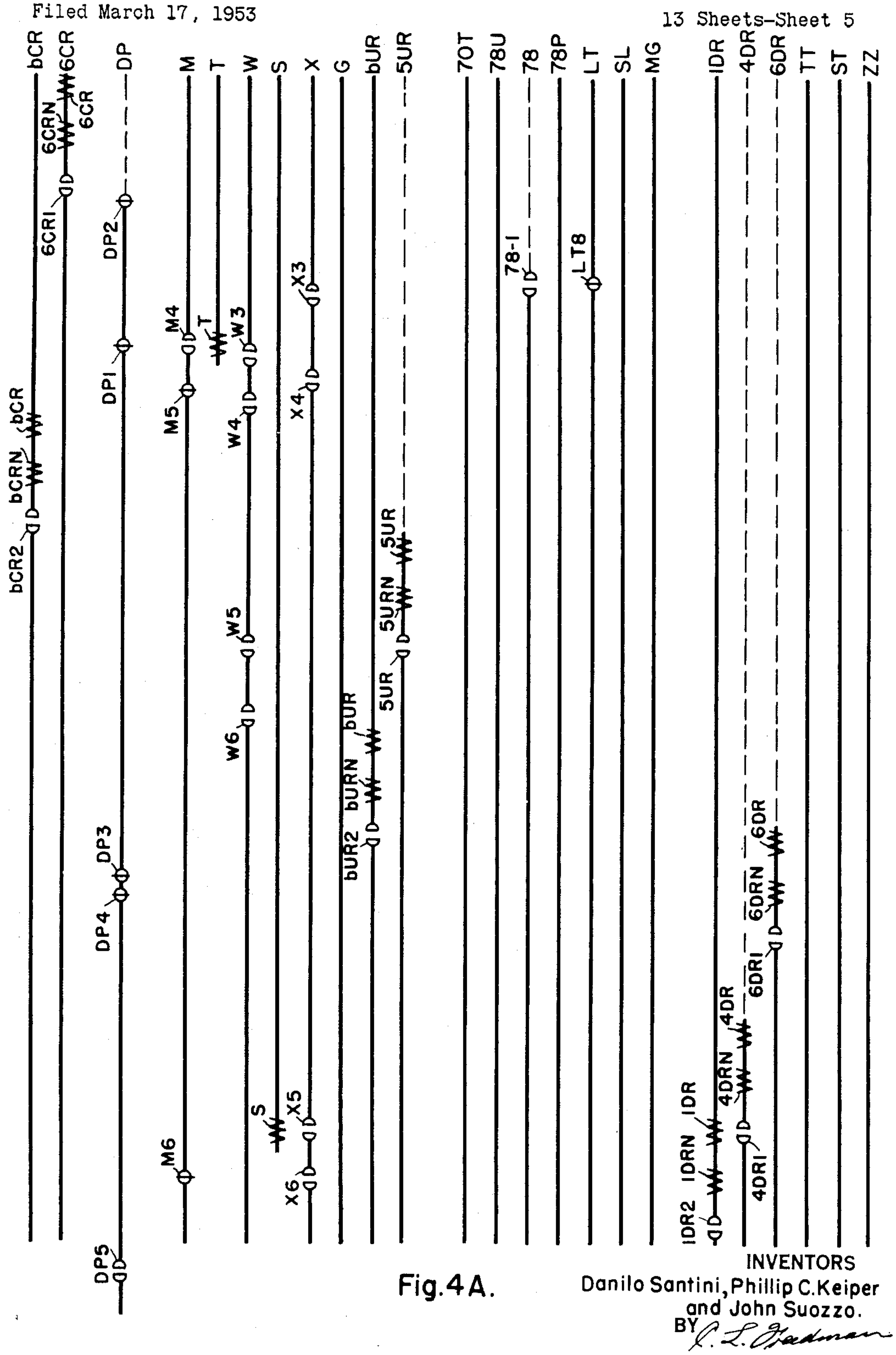

*Figure 4*

Fig. 4 shows the control circuits associated with the car-call registering relays *b*CR and 1CR to 6CR, the up-corridor call registering relays *b*UR and 1UR to 5UR, the down-corridor call registering relays 1DR to 6DR, the car-call stopping relay T and the corridor-call stopping relay S. Because of the similarity of the circuits, only representative circuits are illustrated in Fig. 4. For example, car-call circuits are illustrated for the basement, first, fifth and sixth floors. Up-corridor call circuits are illustrated for the basement, first and fifth floors, and down-corridor call circuits are illustrated for the first, fourth, fifth and sixth floors.

Each of the car-call push buttons *bc* and 1*c* to 6*c* has associated therewith a car-call registering relay *b*CR and 1CR to 6CR, respectively. It will be understood that the car-call push buttons normally are biased to their open positions. Operation of a car-call push button connects the associated relay across the buses L1 and L2. Thus when the car-call push button 5*c* is operated, the car-call registering relay 5CR is connected across the buses L1 and L2 and closes its make contacts 5CR1 to establish a holding circuit around the car-call push button 5*c*. The car-call push buttons control the connection of a plurality of contact segments to the bus L1. Thus four rows of contact segments *a*1 to *a*6, *bb* and *b*1 to *b*5, *cb* and *c*1 to *c*5, and *d*1 to *d*6 are arranged in rows on the panel of the floor selector 16 of Fig. 1. The arrangement of the contact segments will be understood from the discussion of Fig. 1, wherein the mounting of the contact segments *a*1 to *a*6 was discussed. The *b* row of contact segments has a brush *bd* associated therewith to engage the contact segments in accordance with movement of the associated elevator car A. The contact segments *d*1 to *d*6 have a brush *dc* associated therewith to engage the contact segments in accordance with movement of the elevator car A.

The contact segments *a*1 to *a*6 control the stopping of the elevator car A with respect to car calls during up travel of the elevator car. The contact segments *bb* and *b*1 to *b*5 control the stopping of the elevator car A in response to car calls during down travel of the car A. The contact segments *cb* and *c*1 to *c*5 are employed for canceling car calls which are answered during down travel of the elevator car A. The contact segments *d*1 to *d*6 are employed to cancel car calls answered during up travel of this elevator car A. Each of the car-call registering relays has a canceling coil associated therewith identified by the same reference character followed by the suffix N. For example, the car-call registering relay 5CR for the fifth floor has a canceling coil 5CRN wound on the same core and energized in opposition to the energization of the relay coil. Consequently, when the canceling coil is energized, the relay is reset.

It will be noted that the contact segments *a*5 and *b*5 for the fifth floor are connected to the bus L1 through the make contacts 5CR1. In a similar manner, each contact segment in the *a* and *b* rows is connected through make contacts of its associated car-call registering relays to the bus L1. Since the car does not stop at the upper terminal floor during down travel thereof, a contact segment in the *b* row is not required for the sixth floor. Since the elevator car does not stop at the basement floor during up travel, the contact segment in the *a* row is not required for the basement floor.

The contact segments *c*5 and *d*5 for the fifth floor are connected to the bus L1 through the canceling coil 5CRN and the make contacts 5CR1 of the car-call registering relay 5CR. The contact segments in the *c* and *d* rows associated with the remaining floors are similarly connected through canceling coils and make contacts of their associated car-call registering relays to the bus L1. A contact segment in the *c* row is not required for the sixth floor and a contact segment for the *d* row is not required for the basement floor.

To illustrate the operation of the car-call circuits, let it be assumed that the elevator car A is traveling up with the manual switch 71 closed and that a car-call is registered for the fifth floor by operation of the push button 5*c*. Operation of this push button energizes the car-call registering relay 5CR which closes its contacts 5CR1 to establish a holding circuit around the push button and to connect the contact segments *a*5 to *b*5 to the bus L1.

Inasmuch as the elevator car A is traveling up, the make contacts M4 of the running relay and the make contacts W3 are closed. As the elevator car nears the fifth floor, the brush *ac* engages the contact segment *a*5 to complete the following circuit:

L1, 5CR1, *a*5, *ac*, 71, W3, T, M4, L2

Consequently, the car-call stopping relay T is energized to stop the elevator car at the fifth floor by a sequence which will be discussed below.

As the elevator car A stops at the fifth floor, the brush *cc* engages the contact segment *c*5 to complete the following cancellation circuit:

L1, 5CR1, 5CRN, *c*5, *cc*, W4, M5, L2

It will be noted that this circuit is completed when the running relay M drops out to close its break contacts M5. The energization of the canceling coil 5CRN neutralizes the energization of the coil of the relay 5CR and thus resets the relay. As the elevator car stops, the brush *ac* may pass slightly beyond the associated contact segment.

Under certain conditions to be discussed below, it may be desirable to prevent the response to car calls during up travel of the elevator car A. To this end, a switch 71 is provided which may be opened to render effective break contacts DP1 of a down peak relay. When these contacts are open during up travel of the elevator car, the car-call relay T cannot be energized in response to car calls.

Let it be assumed next that the elevator car A is descending from the sixth floor and is to answer a registered car call for the fifth floor. As the elevator car A approaches the fifth floor, the brush *bd* engages the contact segment *b*5 to complete the following circuit:

L1, 5CR1, *b*5, *bd*, X3, T, M4, L2

The energization of the car-call stopping relay T stops the elevator car A at the fifth floor in a manner which will be discussed below. As the elevator car A stops, the brush *dc* engages the contact segment *d*5 and the break contacts M5 close to complete the following cancellation circuit:

L1, 5CR1, 5CRN, *d*5, *dc*, X4, M5, L2

As the elevator car A stops, the brush *bd* may pass slightly beyond the contact segment *b*5. The response of the elevator car A during down travel to registered car calls for other floors will be understood from the foregoing discussion.

It will be recalled that under certain conditions, it is desirable to park the elevator car A at a certain floor, preferably the lower terminal floor. Consequently, when the elevator car A departs from the lower terminal floor, a call for this parking floor is registered in the event that no other call remains to be answered by the elevator car. By inspection of Fig. 4, it will be observed that when the elevator car A leaves the lower terminal floor, the break contacts LT8 of the lower-terminal relay close. If no calls remain to be answered by the elevator car A, the make contacts 78—1 close to complete a circuit around the push button 1*c*. Consequently, this circuit operates in the same manner as the push button 1*c* to register a car call for the first floor. The elevator car A then returns to the lower terminal floor before parking.

Under certain conditions, it may be desirable to prevent registration of a car call until the elevator car is prepared to leave a terminal floor. For example, let it be assumed that the elevator car B is at the lower terminal floor. By inspection of Fig. 4, it will be noted that if the switch B72 is open, the energization of the car call registering relays is permitted only if one of the sets of contacts BLT9 or BR1 are closed. If the elevator car B is at the lower-terminal floor, the break contacts BLT9 of the lower-terminal relay are open and the car call registering relays cannot be registered therethrough. When the doors of the elevator car B start to close, the make contacts R1 of the door control relay close to permit energization of the car-call registering relays therethrough. At such time, passengers within the elevator car B can register car calls. If desired, certain of the switches, such as the switch 71 and switch B72, can be key-operated switches located at the starter station.

The next portion of Fig. 4 to be considered is that illustrating circuits for registering floor or corridor calls. Because of the similarity of the circuits involved, Fig. 4 illustrates circuits associated with only the basement floor, the first floor and the fifth floor for registering up-floor or corridor calls.

Two rows of contact segments are provided on the floor selector 16 of Fig. 1 for inclusion in circuits for registering up-floor or corridor calls. One of these rows is designated the "*e* row" and will be discussed below. The remaining one of these rows includes the contact segments *f*1 to *f*6 which are associated with circuits for the first to sixth floors, respectively. In Fig. 4, the contact segments *f*1, *f*5, *f*6 are illustrated. It will be understood that similar contact segments for the second, third and fourth floors would be located between the contact segments *f*1 and *f*5. The contact segments are disposed in a row for successive engagement by a brush *fc* which is mounted on the carriage 18 of Fig. 1 for movement relative to the contact segments in accordance with movement of the elevator car relative to the associated floors. The association of the brush *fc* with the contact segments of the *f* row will be understood from the previous discussion of the association of the brush *ac* with the contact of the segments of the *a* row.

It will be recalled that a push button is located at each of the floors below the upper terminal floor for the purpose of registering calls for passengers desiring to travel upwardly. Such push buttons *b*U, 1U and 5U are illustrated in Fig. 4 for the basement, first and fifth floors. Each of these push buttons has associated therewith a floor or corridor call stopping relay. In Fig. 4, the corridor call stopping relay *b*UR, 1UR and 5UR are associated, respectively, with the push buttons *b*U, 1U and 5U. Operation of any of the push buttons connects its associated corridor-call stopping relay across the buses L1 and L2. For example, operation of the push button 5U energizes the corridor-call registering relay 5UR and this relay closes its make contacts 5UR1 to establish a holding circuit around the push button 5U. The closure of the contacts 5UR1 connects the contact segment *f*5 and corresponding contact segments for the remaining elevator cars of the bank (such as the contact segment B*f*5 for the elevator car B) to the bus L1. If under these circumstances, the elevator car A is approaching the fifth floor in the up direction, the brush *fc* engages the contact segment *f*5 to complete the following energizing circuit:

L1, 5UR1, *f*5, *fc*, W5, DP3, S, LMS2, L2

In this circuit, the make contacts W5 are closed for the reason that the elevator car A is set for up travel. The break contacts DP3 are open only while the elevator car is conditioned for down-peak operation and it will be assumed for the present that the system is not on down-peak operation. The load-weighing switch LMS2 is cam operated to open when the elevator car is loaded substantially to its rated capacity to prevent energization therethrough of the corridor-call stopping relay S. When energized, the corridor-call stopping relay S initiates a slowdown and stopping operation of the elevator car A at the fifth floor by a sequence which will be discussed in greater detail below.

As the elevator car A stops at the fifth floor, the contact segment *e*5 is engaged by the brush *ec* to complete the following cancelling circuit:

L1, 5UR1, 5URN, *e*5, *ec*, W6, M6, L2

The cancelling coil 5URN is wound on the same core as the coil of the relay 5UR and the two coils are connected to produce, when energized, magnetomotive forces which act in opposition to each other. Such energization of the canceling coil 5URN consequently results in resetting of the corridor-call registering relay 5UR. It will be understood that a similar cancelling coil is similarly associated with each of the corridor-call registering relays. As the elevator car stops at the fifth floor, the brush *ac* may pass slightly beyond the contact segment *f*5.

Inasmuch as the corridor-call registering circuits for each of the floors intermediate the basement floor and the upper terminal floor are similar to those discussed for the fifth floor, it is believed that further discussion of such circuits at this point is unnecessary.

Inasmuch as the sixth floor is the upper limit of travel for the elevator car A, the contact segment *f*6 is connected directly to the bus L1. No canceling circuit is required for the circuits associated with the contact segment *f*6 and for this reason a contact segment is not provided in the *e* row for the sixth floor.

Inasmuch as the basement floor constitutes the lower limit of travel for the elevator car A, a contact segment in the *f* row is not provided for the basement floor. With this exception, the corridor-call registering circuits for the basement floor are similar to those discussed for the fifth floor.

Under some circumstances, it may be desirable to render ineffective the break contacts DP4 associated with the corridor-call stopping relay BS for the car B. To this end, a manually-operated switch 74 is provided which may be operated to shunt such contacts.

The down-corridor-call registering circuits illustrated in Fig. 4 now will be considered. It will be recalled that such circuits are illustrated for the first, fourth, fifth and sixth floors. These circuits have associated therewith two rows of contact segments which are mounted on the floor selector 16 of Fig. 1. One of these rows, designated as the "*g* row" will be discussed below. The remaining one of the rows of contact segments comprises the contact segment *hb* for the basement floor and contact segments *h*1 to *h*5, respectively, for the first to fifth floors. A brush *hc* operates with these contact segments in a manner which will be clear from the prior consideration of the operation of the brush *ac* and the contact segments in the *a* row.

Contact segments *g*1 to *g*6 also are provided for the first to sixth floors, respectively. These contact segments cooperate with a brush *gc* in a manner which will be clear from the prior discussion of the operation of the brush *ac* and the *a* row of contact segments.

Corridor calls for down service are registered by operation of push buttons 1D to 6D which are located, respectively, at the first to sixth floors. Each of these push buttons when operated connects an associated down-corridor-call registering relay 1DR to 6DR, respectively, across the buses L1 and L2. For example, if the push button 5D is operated, the down-corridor-call registering relay 5DR closes its make contacts 5DR1 to establish a holding circuit around the push button 5D. It will be noted that the contact segment *h*5 and similar contact segments for the remaining cars of the bank (such as the contact segment B*h*5 for the elevator car B) are connected through the contacts 5DR1 to the bus L1. If under such circumstances, the elevator car A is set for down travel and is approaching the fifth floor, the brush *hc* engages the contact segment *h*5 to establish the following circuit:

L1, 5DR1, *h*5, *hc*, X5, S, LMS2, L2

The energization of the corridor-call stopping relay S initiates a slow down and stopping operation of the elevator car A at the fifth floor by a sequence which will be considered in greater detail below.

As the elevator car stops at the fifth floor, the contact segment *gc* engages the contact segment *g*5 to complete the following canceling circuit:

L1, 5DR1, 5DRN, *g*5, *gc*, X6, M6, L2

The canceling coil 5DRN acts in opposition to the coil 5DR to reset the relay 5DR. As the elevator car comes to a stop, the brush *hc* may pass slightly beyond the contact segment *h*5.

The down-corridor-call stopping circuits for the first to sixth floors may be similar to those discussed for the fifth floor. For this reason, further description of such circuits at this time appears unnecessary. Inasmuch as the elevator car A does not stop during down travel at the sixth floor, no contact segment in the *h* row need be provided for the sixth floor.

Inasmuch as the basement floor represents the lower limit of travel for the car A, the contact segment *hb* may be connected directly to the bus L1.

When the elevator system is conditioned to provide down-peak service, it may be desirable to provide suitable information for the system passengers. For example, if the system under such conditions does not provide up service, signs may be operated at each floor to present such information to the system passengers. In Fig. 4, such signs 76 are connected between the buses L1 and L2 through make contacts DP5 and a manually-operated switch 75. If part only of the elevator cars are prevented from providing up service, the signs 76 may be located adjacent such cars at the various floors.

Figure 5:
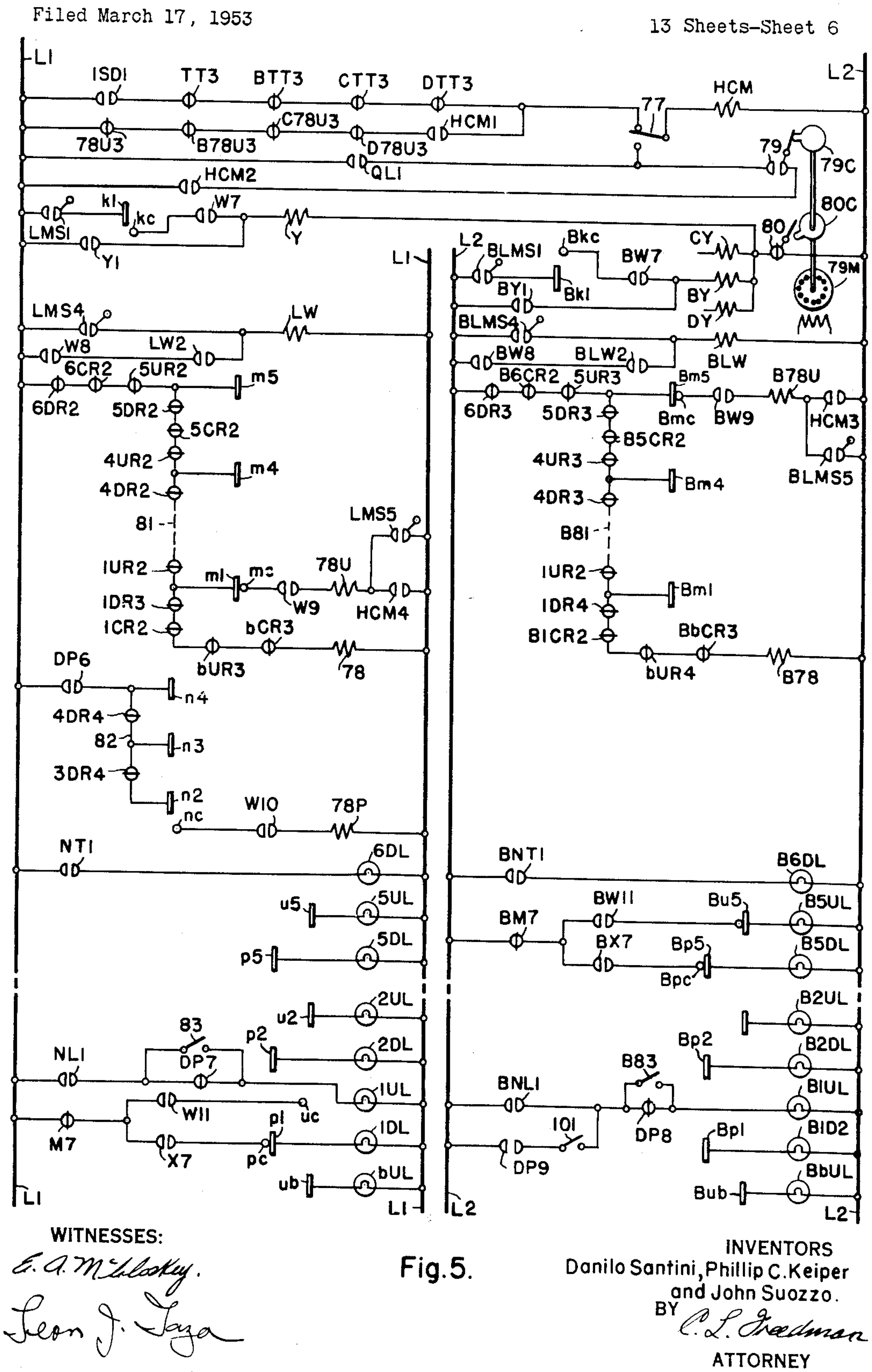
Figure 5A:
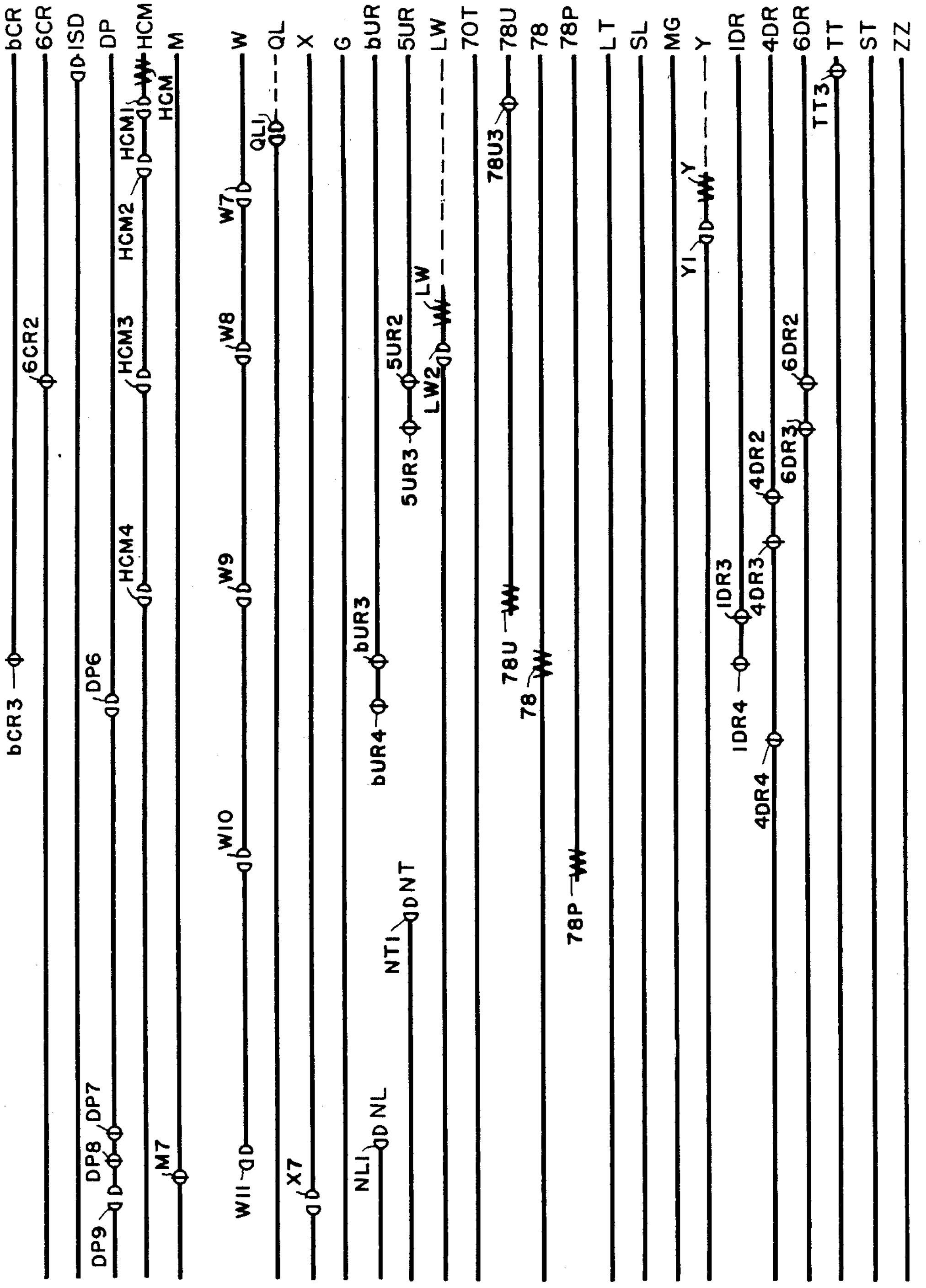

*Figure 5*

Fig. 5 illustrates circuits for the high-call reversal relay HCM, the auxiliary load relay Y, the load relay LW, the high-call relay 78U, the no-call relay 78, the low-zone high-call relay 78P, and circuits for the corridor or floor lanterns.

Under some circumstances, the dispatcher for the upper terminal landing may be in condition to dispatch an elevator car from the upper terminal landing when no elevator car is available to be dispatched. Under such circumstances, it may be desirable to expedite a reversal of an up traveling elevator car. To this end, a manually-operable switch 77 may be operated to the position shown in Fig. 5 to connect the high-call reversal relay HCM across the buses L1 and L2 through the circuit:

L1, 1SD1, TT3, BTT3, CTT3, DTT3, 77, HCM, L2

Closure of the make contacts 1SD1 indicates that the dispatcher for the upper-terminal floor is conditioned to dispatch an elevator car from the upper terminal floor. If no elevator car is available at the upper-terminal landing, the break contacts TT3, BTT3, CTT3 and DTT3 of the upper-terminal relays of the elevator cars A, B, C and D all will be closed to complete an energizing circuit for the high-call reversal relay HCM. Under these circumstances, one of the up traveling elevator cars will reverse at the farthest floor in the direction of travel of the elevator car for which a call is registered which may be answered by such elevator car.

When the relay HCM is energized, it establishes a holding circuit for itself through the contacts 78U3, B78U3, C78U3, D78U3 and HCM1. When one of the elevator cars reverses under the conditions set forth in the preceding paragraph, one of the sets of break contacts 78U3, B78U3, C78U3 and D78U3 for the elevator cars A, B, C and D opens to reset the high-call reversal relay HCM.

In addition, or alternatively, the high-call reversal relay HCM may be energized under other operating conditions. For example, let it be assumed that the manually-operable switch 77 is operated to its lower position as illustrated in Fig. 5, wherein it connects the high-call reversal relay HCM through the make contacts QL1 of the loaded-car quota relay across the buses L1 and L2. Closure of the make contacts QL1 indicates that a substantial demand for service in the up direction exists at the lower terminal floor. For example, the make contacts QL1 close when a predetermined number of elevator cars are fully loaded and travel up from the lower terminal floor within a predetermined time.

When the high-call reversal relay HCM is energized through the make contacts QL1, it establishes a holding circuit through its make contacts HCM2 and normally-closed contacts of a cam-operated switch 79. The switch 79 is repeatedly opened at intervals determined by rotation of a cam 79C which is rotated at a substantially constant speed in any suitable manner, as by an induction motor 79M. Consequently, if the contacts QL1 are open at the same time that the switch 79 is opened by its cam, the holding circuit for the high-call reversal relay HCM is interrupted and this relay resets.

As previously explained, certain operations of the system are dependent on the loads carried by the elevator cars. The load in the elevator car A is measured by the contacts LMS4 of the cam-operated switch LMS, which are normally open, but which close when the load within the elevator car reaches a predetermined value, such as 40% of its rated capacity. Under these circumstances, the contacts LMS4 close to connect the load relay LW across the buses L1 and L2 for energization. When it picks up, the load relay LW establishes a holding circuit for itself through the make contacts LW2 and the make contacts W8.

If the elevator car A is at the lower-terminal floor set for up travel, the make contacts W7 of the up-direction relay W are closed. If the car is loaded to capacity, contacts LMS1 of the cam-operated switch are closed. As the elevator car A leaves the lower-terminal floor, the brush *kc* engages a contact segment *k1* to establish a circuit for the auxiliary load relay Y, which is completed through the normally-closed contacts of a cam-operated switch 80. It will be understood that the contact segment *k1* and the brush *kc* are incorporated in the floor selector of Fig. 1 and the operation of these components will be understood from the previous discussion of the floor selector. The switch 80 is operated to open its contacts at repeated intervals in any suitable manner as by rotation of a cam 80C which is mounted for rotation at a substantially uniform rate by the motor 79M.

When the auxiliary load relay Y is energized, it closes its make contacts Y1 to establish a holding circuit for itself which includes the switch 80. Consequently, the auxiliary load relay remains energized until the switch 80 is opened by its cam 80C. Auxiliary load relays for the remaining cars, such as the auxiliary relays BY and CY illustrated in Fig. 5, are similarly associated with the switch 80. These auxiliary load relays are employed in determining the rate at which loaded cars travel up from the lower-terminal floor.

In order to ascertain whether a call exists which may be answered by an elevator car and in order to ascertain whether a call exists for a floor above the position of an elevator car, a call circuit is provided for each of the elevator cars. For the elevator car A, the call circuit 81 includes a plurality of contacts of the call-registering relays connected in series with each other and in series with the no-call relay 78 across the buses L1 and L2. Inasmuch as break contacts of all call-registering relays which may be answered by the elevator car A are included in the circuit 81, it follows that the no-call relay 78 is energized only if no call is registered on the system which may be answered by the elevator car A.

The call circuit 81 is associated with a row of contact segments *m1* to *m5*, respectively, for the first to fifth floors, which cooperate with the brush *mc*. The contact segments and brush are incorporated in the floor selector 16 of Fig. 1 in a manner which will be clear from the preceding discussion of the floor selector.

Each of the contact segments in the *m* row is connected to the call circuit 81 in such a way that the contacts of all call registering relays requiring travel of the elevator car above the floor represented by a contact segment are located above such contact segment. For example, the contacts 4UR2, 5CR2, and 5DR2 represent call registering relays which require travel of an elevator car above the fourth floor, but not above the fifth floor. Consequently, these contacts are all located in the call circuit 81 between the contact segments *m4* and *m5*. Contact segments *m2* and *m3* are not illustrated in Fig. 5, but it will be understood that they are associated with the call circuit 81 in a similar manner. The locations of the various contacts in the call circuit are illustrated clearly in Fig. 5.

If desired, a contact segment (not shown) in the *m* row may be connected permanently to the bus L1 and may be positioned to engage the brush *mc* when the elevator car A is above the fifth floor and approaching the sixth floor.

The energization of the high-call relay 78U controls the reversal of the elevator car A at a floor below the upper-terminal floor when the elevator car A is traveling up. The energization of the high-call relay 78U requires closure of the make contacts W9 to indicate that the elevator car A is traveling up. In addition, one of the sets of make contacts LMS5 or HCM4 must be closed. As previously explained, the make contacts HCM4 are closed when the bank is conditioned for high-call reversal operation. The cam-operated contacts LMS5 are closed when the elevator car A is loaded substantially to capacity. Under such circumstances, the elevator car A is conditioned to reverse at the farthest floor for which a call is registered which may be answered by the elevator car A. As long as a call is registered which requires travel of the elevator car A above its position, at least one of the sets of contacts in the call circuit 81 above the position of the brush *mc* is open to prevent energization of the high-call relay 78U.

Under certain circumstances, the elevator car A may be conditioned to reverse at the highest floor in a low-zone group of floors for which a down call is registered. Such reversal is controlled by the low-zone high-call relay 78P, which is energized through make contacts W10 of the up-direction relay W, make contacts DP6 of the down peak relay DP and a circuit 82. Inasmuch as the elevator car B is assumed to be a high-zone car, a low-zone high-call relay similar to the relay 78P is not required for the elevator car B.

The low zone of floors is assumed in the present case to include the second, third and fourth floors. These floors are represented by contact segments *n2*, *n3* and *n4* which cooperate with a brush *nc*. The contact segments and the brush are incorporated in the floor selector of Fig. 1. The circuit 82 includes break contacts of the down-corridor-call registering relays which are connected in series. The connections are such that all down-corridor calls requiring movement of the car A above the position of the brush *nc* have down-corridor-call registering relay contacts located above the brush. The relationships of the contact segments and the contacts of the circuit 82 are clearly illustrated in Fig. 5.

As previously explained, floor lanterns may be provided for each of the elevator cars. Each of the up floor lanterns is identified by the reference character UL preceded by a numeral corresponding to the floor at which the lantern is located. Each of the down floor lanterns is identified by the reference character DL preceded by a numeral corresponding to the floor at which the lantern is located. Inasmuch as lanterns for the intermediate floors are operated in a similar way, lanterns are not illustrated in Fig. 5 for the third and fourth floors.

The lanterns are selected in accordance with the position of the elevator car A by means of contact segments *ub* and *u2* to *u5* incorporated in the floor selector 16 of Fig. 1 for the up floor lanterns for the basement and second to fifth floors. A contact segment in the *u* row is not required for the lower terminal floor. A brush *uc* cooperates with these contact segments in a manner which will be understood from the discussion of the floor selector 16 of Fig. 1.

The down-floor lanterns are selected in accordance with the position of the car A through contact segments *p1* to *p5*, respectively, for the first to fifth floors. A brush *pc* cooperates with these contact segments which are incorporated in the floor selector and which operate in a manner which will be clear from the preceding discussion of the floor selector 16 of Fig. 1.

The operation of the floor lanterns for the intermediate floors may be understood by a consideration of the lanterns for the fifth floor. If the elevator car A is traveling up, the make contacts W11 of the up-direction relay W are closed and the break contacts M7 of the running relay M are opened. As the elevator car stops at the fifth floor, the brush *uc* engages the contact segment *u5*. In addition, the break contacts M7 of the running relay close to complete an energizing circuit for the lantern 5UL to indicate that the elevator car will leave the fifth floor in the up direction.

If the elevator car is approaching the fifth floor while traveling down, the make contacts X7 of the down-direction relay X are closed and the break contacts M7 of the running relay M are opened. As the elevator car stops at the fifth floor, the brush *pc* engages the contact segment *p5* and the break contacts M7 close to complete an energizing circuit for the floor lantern 5DL. This indicates that the elevator car A will leave the fifth floor in a down direction.

With the exception of the up lantern for the first floor and the down lantern for the sixth floor, the various lanterns operate in a similar manner which will be understood from the discussion of the operation of the fifth floor lanterns.

When the elevator car A is at the upper terminal floor, it is under the control of a dispatcher. When the elevator car A is selected as the next car to leave the upper terminal floor, the make contacts NT1 of an upper-terminal next relay close to connect the down floor lantern 6DL across the buses.

If the manually-operated switch 83 is closed, the up floor lantern 1UL for the first floor is illuminated when the make contacts NL1 close to indicate that the elevator car A is the next car to leave the lower-terminal floor in the up direction. A similar operation results if the manually-operated switch 83 is opened and if the break contacts DP7 of the down-peak relay DP are closed. However, if the switch 83 and the contacts DP7 are open, the up lantern cannot be illuminated.

Under certain conditions, it may be desirable to maintain the up floor lantern for the first floor for a high-zone car such as the elevator car B continuously illuminated during down-peak operation. Such illumination may be provided by connection of make contacts DP9 around the make contacts BNL1 for the elevator car B.

Figure 6:
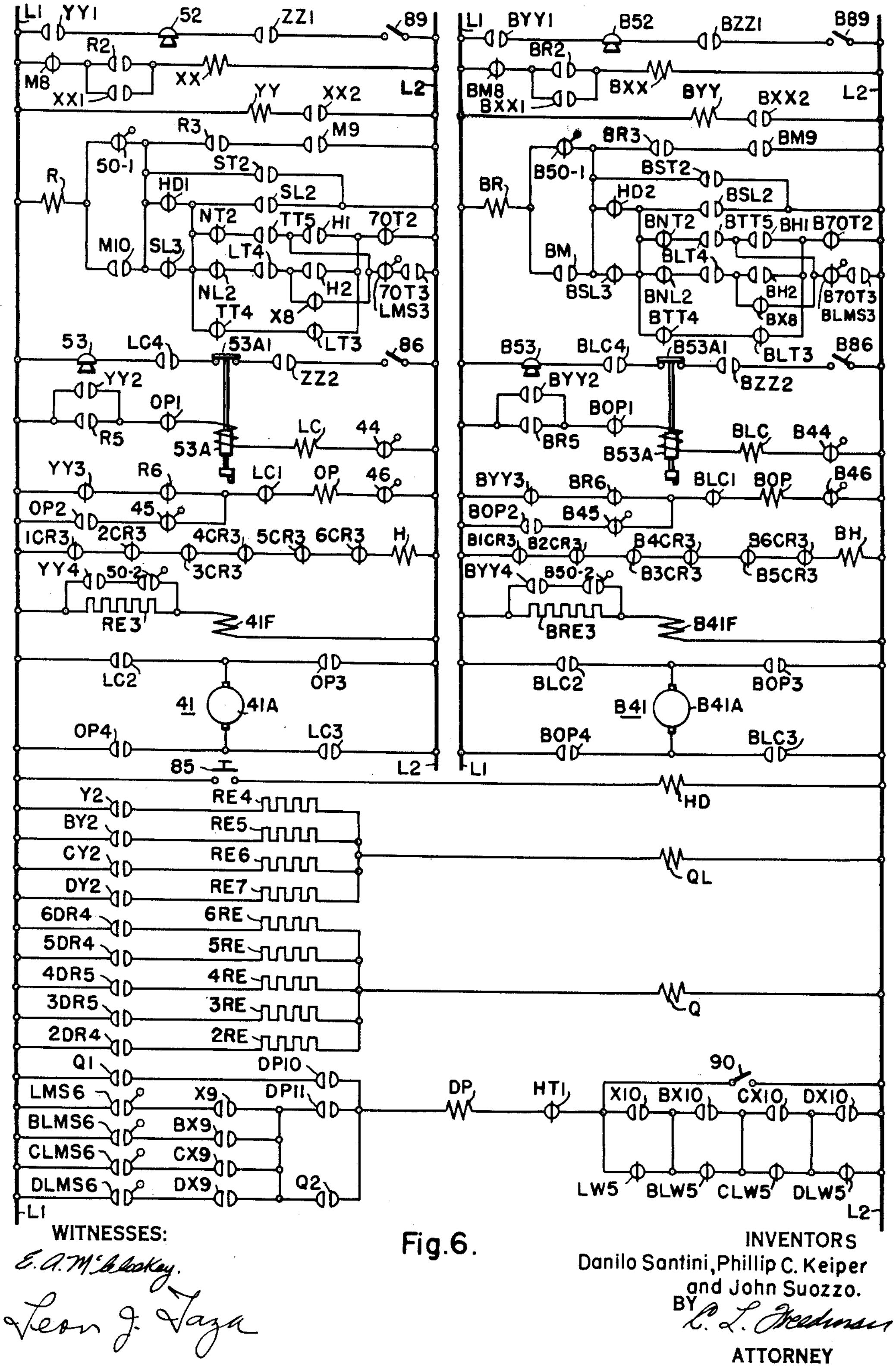
Figure 6A:
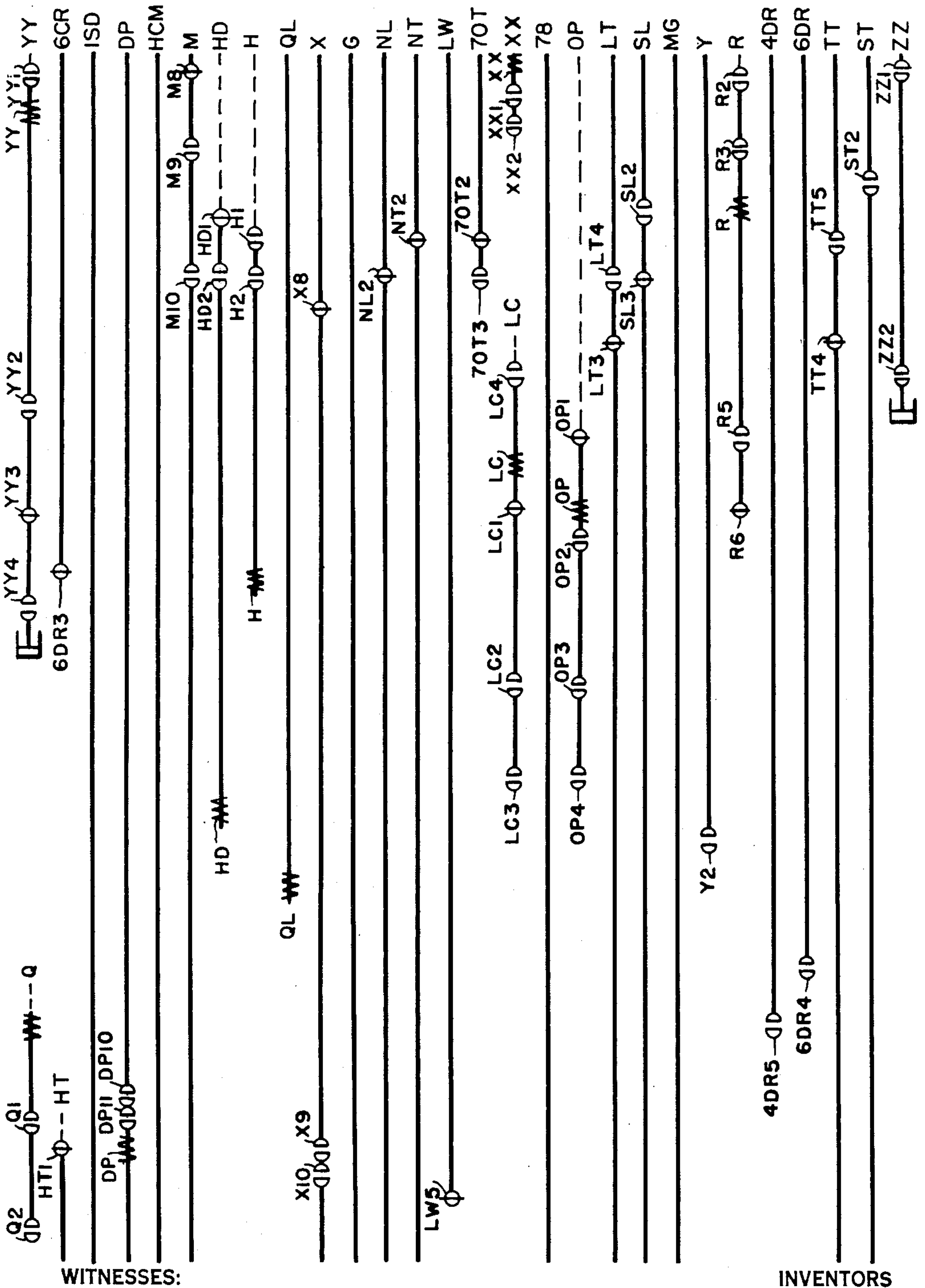

*Figure 6*

In Fig. 6 circuits are illustrated for controlling the doors of the elevator cars and for controlling the energization of the common door-hold relay HD, the loaded-car quota relay QL, the down-corridor-call quota relay Q and the down-peak relay DP.

In order to close the door of the elevator car A, the door control relay R initially is energized. The energization of this relay depends on the location of the elevator car. Inasmuch as it is assumed that the elevator car is stopped at a floor at the time the doors are to be closed, the make contacts M10 of the running relay M are open and the door-control relay R must be energized through the normally-closed contacts 50—1 of the safety-edge switch 50. If the elevator car A is at the lower-terminal floor, if it has been selected as the next elevator car to leave the elevator floor and if it is to be started from the floor, the make contacts SL2 of the lower-terminal start relay SL are closed to establish the following energizing circuit:

L1, R, 50—1, HD1, SL2, L2

Consequently, the relay R may initiate a closing operation of the door.

If the starter at the lower-terminal floor desires to prevent the closure of the door, he may operate a push button 85 to energize the door-hold relay HD. This relay thereupon opens its contacts HD1 to interrupt the energizing circuit for the relay R. It will be noted that the closure of the make contacts SL2 is accompanied by an opening of the break contacts SL3 which interrupts the shunt circuit around the break contacts HD1 of the door-hold relay. As pointed out previously, the relay HD is common to all of the elevator cars.

If the elevator car A is positioned at the upper-terminal floor, is selected as the next car to leave the upper-terminal floor and is to be started, the make contacts ST2 of the upper-terminal start relay close to complete through the closed contacts 50—1 an energizing circuit for the relay R.

When the elevator car A starts, make contacts M9 and M10 close to complete with the make contacts R3 a holding circuit for the door-control relay R.

If the elevator car A is away from the upper and lower terminal floors, the break contacts SL3 of the lower-terminal start relay SL, the break contacts TT4 of the upper-terminal relay and the break contacts LT3 of the lower-terminal relay all are closed and the initial energization of the door-control relay R when the elevator car A is to be started from an intermediate floor is controlled by the break contacts 70T2 of the noninterference relay 70T.

When the elevator car A reaches a terminal floor under circumstances such that the elevator car is not selected as the next car to leave the terminal floor, the door-control relay R is energized after the doors have remained open for a time sufficient to discharge passengers.

The presence of car calls for terminal and intermediate floors is determined by the car-call detecting relay H which is energized only if no call is registered in the elevator car. If the elevator car A approaches the lower-terminal floor with no call registered in the elevator car, the car-call detecting relay H is energized and the make contacts H2 are closed. If the elevator car A is not selected as the next car to leave the terminal floor by the dispatcher, the break contacts NL2 of the lower-terminal next relay are closed. Consequently, upon closure of the break contacts of the noninterference relay 70T2, the door-control relay R is energized through the circuit:

L1, R, 50—1, SL3, NL2, LT4, H2, 70T2, L2 to initiate a reclosing operation of the door.

In a somewhat similar manner, if the elevator car A reaches the upper terminal floor with no car calls registered, the make contacts H1 of the car call detecting relay are closed. If the car is not selected as the next car to leave the terminal, the break contacts NT2 of the upper-terminal next relay are closed. Consequently, when the break contact 70T2 of the noninterference relay 70T reclose, the door-control relay R is energized to reclose the door through the circuit

L1, R, 50—1, SL3, NT2, TT5, H1, 70T2, L2

When the door-control relay R is energized, it closes its make contacts R5 to complete through the break contacts OP1 of the door-open relay OP, the coil of a timing relay 53A and the limit switch 44, an energizing circuit for the door-closing relay LC. This relay closes its make contacts LC2 and LC3 to energize the armature 41A of the motor 41 with proper polarity to close the elevator car door. The field 41F of the motor 41 is connected across the buses L1 and L2 through a resistor RE3. The limit switch 44 opens as the door reaches its fully-closed position.

In order to warn passengers of the impending closure of the door of the elevator car, the door-close relay LC closes make contacts LC4 to complete through make contacts 53A1 of the timing relay 53A, make contacts ZZ2 of the generator-voltage relay, and a switch 86, an energizing circuit for the buzzer 53. If desired, the contacts LC2 and LC3 may be arranged to close slightly later than the contacts LC4 to permit prior sounding of the buzzer.

The buzzer continues to sound during the first portion of the closure of the door for a time determined by the time required for the timing relay 53A to pick up. This time may be adjustable over a range sufficient to permit the buzzer to sound during a part only of the reclosing movement of the door or over the entire reclosing movement.

If the door-close relay LC is deenergized, the door-open relay OP may be energized through the circuit:

L1, YY3, R6, LC1, OP, 46, L2

It will be recalled that the limit switch 46 is biased to its closed condition and opens as the door reaches its fully-open position. This relay OP closes its make contacts OP3 and OP4 to connect the armature 41A of the motor 41 for energization with proper polarity to open the door of the elevator car. It will be noted that the relay OP establishes a self-holding circuit through the make contacts OP2 and the limit switch 45. Under certain conditions, this self-holding circuit permits a partial reopening of the door. For example, let it be assumed that the door has been closed beyond the position determined by the limit switch 45. If the door-control relay R thereafter is energized to open its break contacts R6, the door reopens until the door opens the limit switch 45. The limit switch 45 and the break contacts R6 now are open and the door-open relay OP is deenergized to stop the opening door at an intermediate position. Consequently, if the door is closed beyond a predetermined position, such as a half-closed position, a reopening operation is interrupted when the door reaches the half-closed position.

It is possible that a passenger may hold the door of the elevator car open for an unduly long time. To prevent such interference by the passenger, an auxiliary relay XX is provided which is energized when the door-control relay R picks up to close its make contacts R2. The energizing circuit for the relay XX is completed through break contacts M8 of the running relay. When it picks up, the relay XX closes its make contacts XX1 to establish a holding circuit around the contacts R2. In addition, the relay closes its make contacts XX2 to connect a timing relay YY for energization across the buses L1 and L2. The timing relay YY has a substantial delay in pick up. Should the car start before the relay YY picks up, the break contacts M open to deenergize the relay XX. This relay then opens its contacts XX2 to deenergize the timing relay YY.

If the car fails to start before the timing relay YY picks up, closure of the make contacts YY1 of the timing relay completes an energizing circuit for the buzzer 52. This energizing circuit includes make contacts of the relay ZZ1 and a manually-operated switch 89.

The buzzer 52 may have a distinctive sound for the purpose of advising passengers that the door is being held open for an unduly long period and that it should be released. For example, a distinctive pitch may be selected for the buzzer or an intermittent buzzer may be employed.

Energization and pick up of the relay YY also results in closure of the make contacts YY2 to bypass the make contacts R5 of the door-control relay. Consequently, a circuit for the door-close relay LC may be established even though the door-control relay R remains deenergized. The break contacts YY3 also open at this time to prevent energization of the door-open relay OP through the break contacts R6. Consequently, if the holding circuit for the door-open relay OP is interrupted, the relay thereafter cannot be energized until the break contacts YY3 reclose. Under these circumstances, the door-close relay LC is energized and the door-open relay OP is deenergized for the purpose of positively closing the door.

Finally, the relay YY closes its make contacts YY4 for the purpose of partially completing a shunting circuit for the resistor RE3. The door starts to reclose at full speed. However, if the safety edge encounters an obstruction in the closing path, the switch 50 associated with the safety edge closes its normally-open contacts 50—2 for the purpose of completing with the make contacts YY4 a shunting circuit around the resistor RE3. This results in an increase in the energization of the field winding 41F and a reduction in speed of the motor 41 and of the door operated by the motor. The reduction in speed preferably is accompanied by an increase in torque of the motor for the purpose of forcing the obstruction out of the reclosing path of the doors.

If the elevator car A reaches one of the terminal floors with no passengers to be discharged at such floor and if the elevator car is not selected as the next car to leave the terminal floor, it is desirable that the door of the elevator car remains closed until the elevator car is selected to leave the terminal floor. If such operation is desired, the following components illustrated in Fig. 6 may be included.

As shown in Fig. 6, holding circuits for the door-control relay R are provided. If either of the holding circuits is in holding condition at one of the terminal floors the door is retained in closed condition as the car reaches the floor. One of the circuits is effective at the lower-terminal floor and is as follows:

L1, R, 50—1, SL3, NL2, LT4, X8, LMS3, 70T3, L2

If the elevator car A is selected as the next car to leave the terminal floor, the break contacts NL2 are open to interrupt this holding circuit. If the down-direction relay is energized for the purpose of sending the elevator car to the basement floor, the break contacts X8 are open to interrupt the holding circuit. Closure of the make contacts LT4 of the lower-terminal relay indicates that the elevator car is at the lower terminal floor. The load-measuring switch contacts LMS3 are normally closed and are operated to open if a passenger is in the elevator car. Consequently, if a passenger is within the car, the switch is interrupted to break the holding circuit. The make contacts 70T3 remain closed until the noninterference relay times out.

If the elevator car A reaches the upper-terminal floor, the following holding circuit is provided:

L1, R, 50—1, SL3, NT3, TT5, LMS3, 70T3, L2

In this circuit, the break contacts NT3 remain closed if the elevator car is not selected as the next car to leave the upper-terminal floor. The make contacts TT5 are closed when the elevator car is at the upper terminal floor. The purposes of the contacts LMS3 and 70T3 have been discussed.

The loaded-car quota relay QL is employed for the purpose of indicating the presence of a substantial demand for service in the up direction from the lower-terminal floor. This relay is controlled by make contacts Y2, BY2, CY2 and DY2 of the auxiliary load relays Y, BY, CY and DY which are associated respectively with the elevator cars A, B, C and D. The loaded-car quota relay QL is connected between the buses L1 and L2 through four parallel circuits, each including a separate one of the make contacts of the auxiliary load relays and a separate one of the resistors RE4, RE5, RE6 and RE7. The parameters of the circuit are so selected that a predetermined number of the make contacts in the parallel circuits must be closed before the loaded-car quota relay is energized sufficiently to pick up. For present purposes, it will be assumed that the loaded-car quota relay QL picks up when two or more of the make contacts Y2, BY2, CY2 and DY2 are closed. Consequently, pick up of the loaded car quota relay indicates that two or more of the elevator cars are leaving the lower-terminal floor in the up direction within a predetermined time with full loads.

The down-corridor-call quota relay Q is connected between the buses L1 and L2 through five parallel circuits each including a separate pair of make contacts 2DR4, 3DR5, 4DR5, 5DR4 or 6DR4 of the down-corridor-call registering relays for the second to sixth floors. Each of the parallel arms also includes a separate one of the resistors 2RE to 6RE. The parameters of the circuit are so selected that the down-corridor-call quota relay must be energized through a predetermined number of the parallel arms before it is energized sufficiently to pick up. For present purposes, it will be assumed that the down-corridor-call quota relay Q must be energized though at least three of the parallel arms before the relay is energized sufficiently to pick up.

Energization and pick up of the down-peak relay DP indicates that the traffic demand is such that the system should be placed on down-peak operation. For the initial discussion of this relay, it will be assumed that a manually-operable switch 90 is in its closed condition. By inspection of Fig. 6, it will be observed that the down-peak relay DP can be energized only if the break contacts HT1 of a heavy traffic relay are closed to indicate that the system is not being subjected to a heavy-traffic condition.

Initial energization of the down-peak relay further requires closure of the make contact Q2 of the down-corridor call quota relay which indicates that a quota of down-corridor calls exists in the system.

A further requirement for initial energization of the down-peak relay is that one of the elevator cars must be set for down travel while carrying a full load. For example, if the elevator car A is set for down travel, the make contacts X9 of the down-direction relay X are closed. If the elevator car A is carrying a full load, the cam-operated contacts LMS6 are closed to complete the following energizing circuit:

L2, LMS6, X9, Q2, DP, HT1, 90, L2

When the relay DP picks up, it closes its make contacts DP10 and DP11 to establish holding circuits around a portion of the energizing circuit. Assuming that the break contacts HT1 remain closed and the switch 90 remains closed, the energized down-peak relay DP can be deenergized only if both of the following conditions are present. In the first place, the down-corridor-call quota relay Q must drop out to indicate that the number of registered down corridor calls controlling its energization have dropped below a predetermined number. For present purposes, it will be assumed that when the down-corridor calls drop below two, the down-corridor-call relay Q drops out and opens its make contacts Q1 and Q2. The opening of the make contacts Q1 interrupts the holding circuit of the down-peak relay which is completed through the make contacts DP10. However, the down peak relay still remains energized through the make contacts DP11.

The second condition is that none of the elevator cars is set for down travel while carrying a full load. For example, if the load of the elevator car A decreases, the contacts LMS6 open or if the elevator car A becomes set for travel in the up direction, the make contacts X9 open to interrupt the circuit controlling the initial energization of the down-peak relay. If both of these conditions are present, the down-peak relay is deenergized and drops out.

Next, it will be assumed that the manually-operable switch 90 is operated to its open condition. Under these circumstances, the down-peak relay DP can be energized only if no elevator car set for up travel is carrying more than a predetermined load.

By inspection of Fig. 6, it will be noted that the energizing circuit for the down-peak relay now includes in series make contacts X10, BX10, CX10 and DX10 of the down direction relays for the elevator cars A, B, C and D. Each of these make contacts is shunted by break contacts of the load relay for the associated car. For example, the make contacts X10 are shunted by break contacts LW5 of the load relay for the elevator car A. If the elevator car A is set for up travel, the make contacts X10 are open. If at the same time, the elevator car A is loaded to a predetermined value, the break contacts LW5 of the load relay LW are open and the down-peak relay DP cannot be energized. Consequently, if the manually-operable switch 90 is in its open condition, the down-peak relay DP can be energized only if all of the following conditions are present.

1. The down-corridor call quota relay Q is energized and picked up to indicate that a quota of down corridor calls is present on the system.

2. One of the elevator cars is set for travel in the down direction while carrying a full load.

3. None of the elevator cars is set for travel in the up direction while carrying a predetermined load; that is, the up traffic is light.

Figure 7:
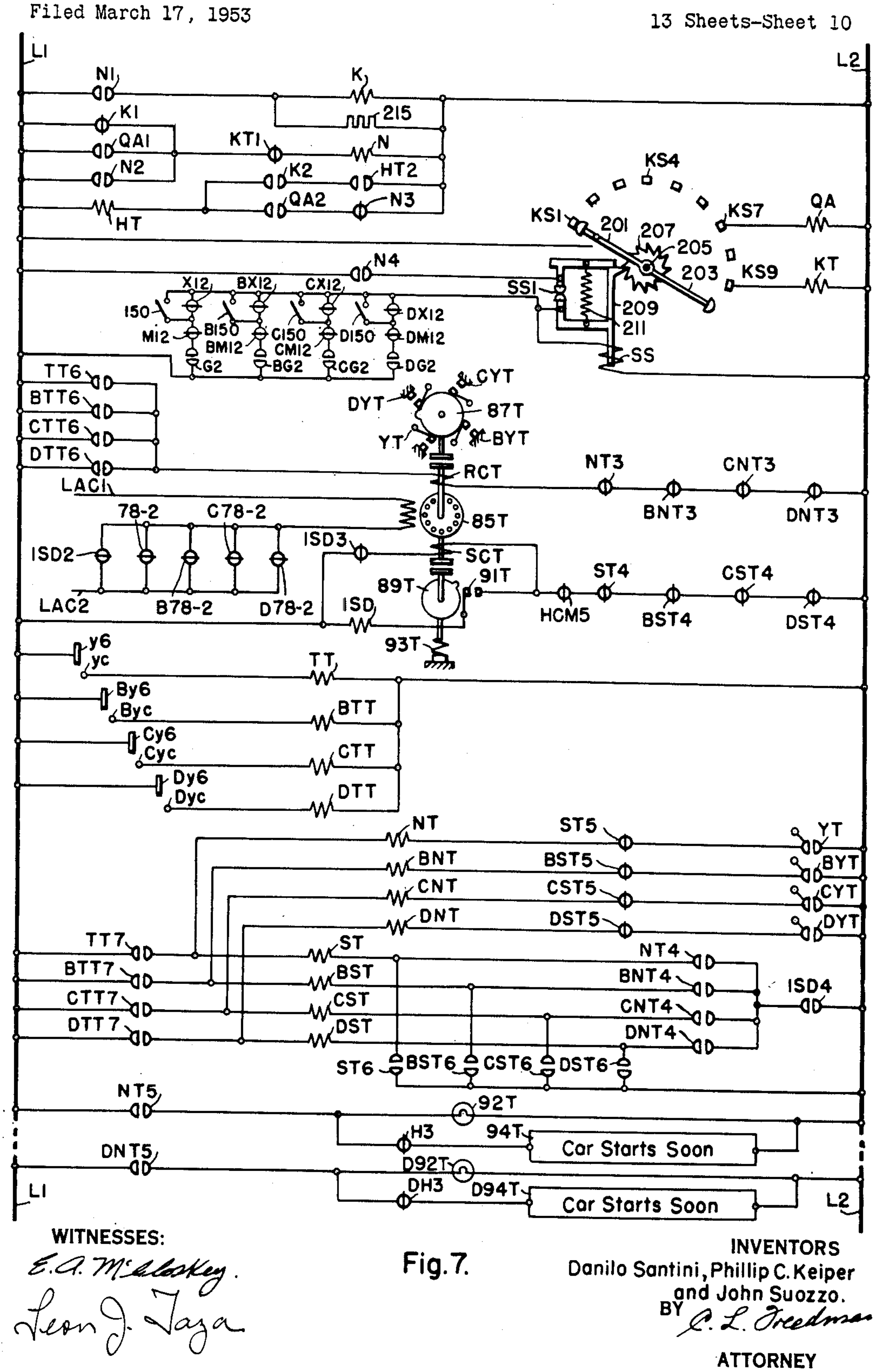
Figure 7A:
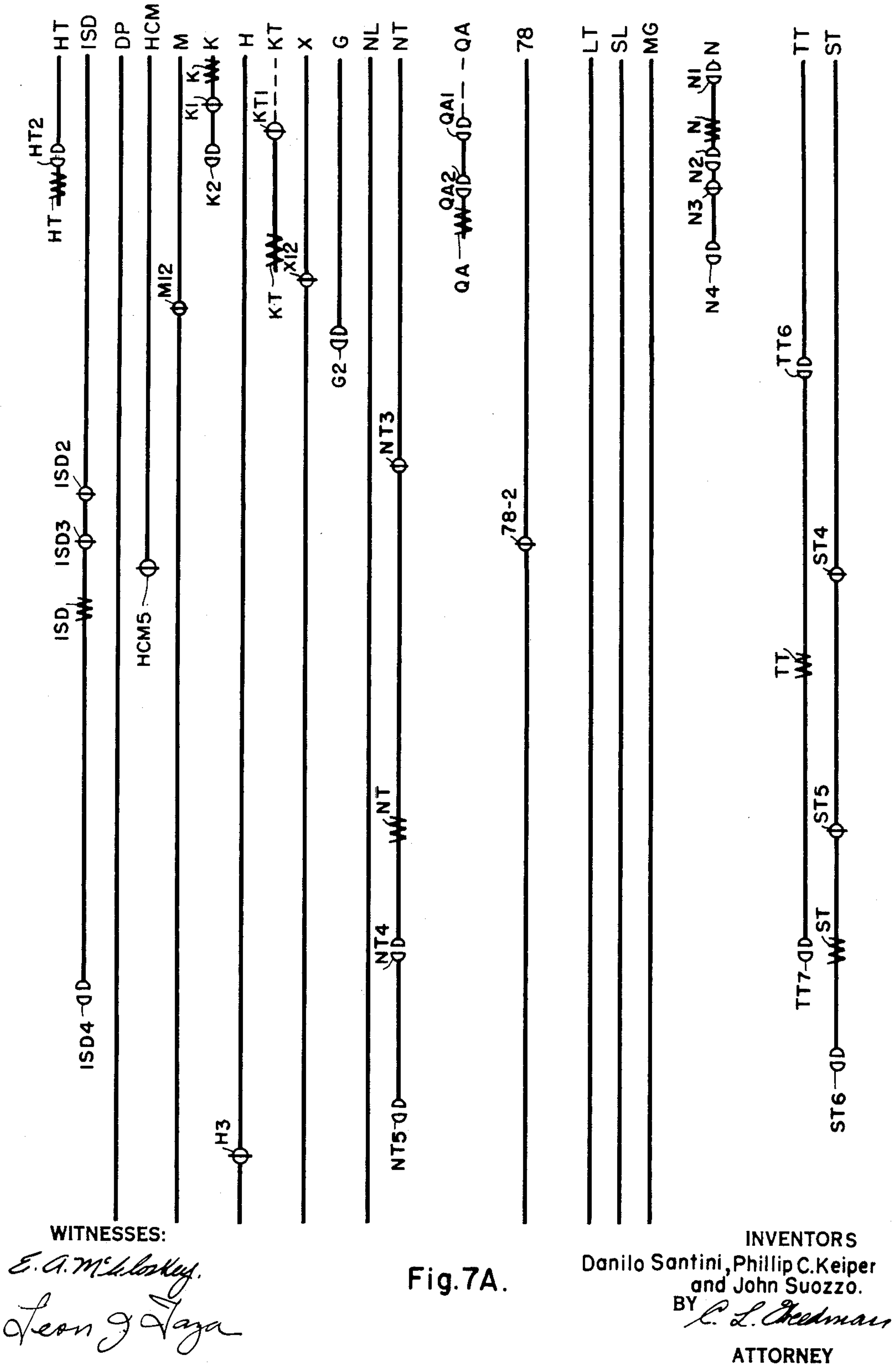

*Figure 7*

In Fig. 7, circuits are shown for controlling the heavy-traffic relay HT and circuits are illustrated for the dispatcher for the upper-terminal floor.

The heavy-traffic relay HT is employed for measuring the intensity of traffic on the elevator system. Such an intensity may be measured by measuring the number of stops made by the elevator cars as determined by the pick-ups of the car-call and corridor-call stopping relays for all of the cars, or as determined by operations of the relays M and G.

The measuring apparatus includes a notching or stepping switch SS which includes a pair of diametrically-opposite contact arms 201 and 203, which are mounted for rotation about an axis 205. Rotation of the contact arms is effected by means of a ratchet wheel 207, which is secured to the arms for rotation about the axis. A pawl 209 is positioned for reciprocation to advance the ratchet wheel 207. When the coil of the stepping switch is energized, the pawl 209 is moved downwardly without rotating the ratchet wheel as a result of the attraction of the coil for a magnetic armature secured to the pawl. At the same time, contacts SS1 associated with the stepping switch are opened. If the coil thereafter is deenergized, a spring 211 pulls the pawl 209 upwardly as viewed in Fig. 7 to advance the ratchet wheel and the contact arms one step. This operation is repeated for each energization and deenergization of the coil of the stepping switch, and such operation of stepping switches is well known.

The coil of the stepping switch SS is energized and deenergized once for each stop of each of the elevator cars which is to be counted. The energizing circuit for the coil is completed through any one of a plurality of circuits, one for each of the elevator cars. Thus the circuit for the elevator car A includes in series make contacts G2 of the inductor holding relay G, break contacts M12 of the running relay and break contacts X12 of the down direction relay X. Thus if the elevator car A is traveling up, contacts X12 are closed. If the elevator car A is to stop at a floor contacts G2 are closed and as the elevator car stops contacts M12 close to complete an energizing circuit for the switch SS. Contacts G2 reopen shortly after the contacts M12 close. The energizing circuits just described for the coil of the stepping switch SS measure the number of stops made by the system during up travel of the elevator cars. If stops for both directions of car travel are to be measured the switch 150 may be closed to shunt the contacts X12.

The contact arms 201 and 203, as they are advanced, successively engage commutator segments KS1 to KS9. Thus, the position of the contact arms indicates the number of stops made by the elevator cars. If it is desired to control apparatus in accordance with a predetermined number of stops, a stop-quota relay QA may be associated with the appropriate commutator segment. In this case, it will be assumed that the stop quota relay is to be energized when either of the contact arms engages the commutator segment KS7 which represents six car stops. In order to facilitate resetting of the stepping switch, a reset stop relay KT is associated with the commutator segment KS9.

The stepping switch SS operates to count the number of car stops made, but it is desired to control apparatus in accordance with the time rate at which the stops are made. To this end, a time-period relay K is provided which is energized through make contacts N1 of a reset relay N. The time-period relay has a substantial time delay in dropout which may be determined, at least in part, by a resistor 215 which is connected across the relay. The stopping switch must operate to energize the stop-quota relay QA within a time interval required for the time-period relay K to drop out if the stop-quota relay QA is to be effective for a control operation.

The heavy-traffic demand HT is energized only if the elevator cars have made a predetermined number of counted stops (make contacts QA1 are closed) and if this number of stops has been made within the time interval measured by the time required for the time-period relay K to drop out (break contacts N3 are closed). When the heavy-traffic relay HT picks up, it completes a holding circuit through its make contacts HT2 and through the make contacts K2 of the time-period relay. Consequently, this holding circuit is interrupted if the time period-relay K is allowed to drop out.

A resetting operation of the stepping switch SS is initiated by energization of the reset relay N through break contacts K1 of the time-period relay K or through make contacts QA1 of the stop-quota relay QA. Such energization can take place only if the break contacts KT1 of the reset stop relay are closed. When energized, the reset relay N establishes a holding circuit through its make contacts N2 which is interrupted when the break contacts KT1 of the reset stop relay open.

The operation of the stepping switch and its associated circuits now may be considered. It will be assumed that the contact arms 201 and 203 are in their reset position, as shown in Fig. 7, and that the make contacts N1 have opened to deenergize the time-period relay K. The time-period relay consequently starts to time out.

During the time required for the relay K to drop out, the contact arms 201 and 203 are advanced one step for each counted car stop made by the elevator cars in service in the elevator system. It will be assumed first that three stops are made by the elevator cars before the time period relay K drops out. Consequently, the contact arm 201 is in engagement with the commutator segment KS4 at the time the time-period relay K drops out.

When the time relay K drops out, it opens its make contact K2 and closes its break contacts K1. If the reavy-traffic relay HT was previously energized and was held energized through its holding circuit, the opening of the contacts K2 deenergizes the heavy-traffic relay.

The closing of the break contacts K1 completes an energizing circuit for the reset relay N through the break contacts KT1 of the reset stop relay. The reset relay N thereupon closes its make contacts N1 to reenergize the time-period relay K. The opening of the break contacts N3 prevents energization of the heavy-traffic relay HT through the make contacts QA2 of the stop quota relay. Closure of the make contacts N2 completes a holding circuit for the reset relay N through the break contacts KT1 of the reset stop relay. Closure of the make contacts N4 completes an energizing circuit for the stepping switch SS through the break contacts SS1. Consequently, the stepping switch repeatedly steps the arms 201 and 203 in a clockwise direction as viewed in Fig. 7.

When the contact arm 201 reaches the commutator segment KS7, an energizing circuit is established for the stop quota relay QA. The resultant closure of the make contacts QA2 has no effect on the system for the reason that the break contacts N3 are open. Closure of the contacts QA1 also is without effect for the reason that the contacts N2 are closed.

In response to continued stepping of the contact arms, the contact arm finally engages the commutator segment KS9 to complete an energizing circuit for the reset stop relay KT. This relay opens its break contacts KT1 to deenergize the reset relay N.

As a result of its deenergization, the reset relay opens its make contacts N1 to initiate a time-measuring operation of the time-period relay K. Consequently, this relay starts to time out. The break contacts N3 reclose but have no effect for the reason that the make contacts QA2 are now open. The make contacts N2 open, but such opening has no immediate effect on the operation of the system. The make contacts N4 open. The spring 211 now advances the contact arms to their reset positions, and the stepping switch now is conditioned to measure again the number of elevator car stops during the period being measured by the time period relay K.

The stepping switch SS may have a slight time delay in each stepping operation to permit pick up of the reset stop relay KT and dropout of the reset relay N after one of the contact arms reaches the commutator segment KS9 before the stepping switch can operate one of the contact arms beyond the commutator segment KS1. Thus the stepping switch may be given a short relay in dropout in a conventional manner.

It will now be assumed that the elevator cars make a total of six counted stops before the time-period relay K times out. When the contact arm 203 reaches the commutator segment KS7, an energizing circuit is established for the stop-quota relay QA. This relay closes its make contacts QA2 to complete an energizing circuit for the heavy-traffic relay HT through the break contacts N3. In addition, the make contacts QA1 close to complete an energizing circuit for the reset relay N through the break contacts KT1.

The heavy-traffic relay also closes its make contacts HT2 to establish a holding circuit which is completed through the make contacts K2 of the time-period relay. Consequently, if the holding circuit is completed, the heavy-traffic relay remains picked up until the time-period relay K is dropped out to open the contacts K2.

It will be recalled that the energization of the stop-quota relay QA also resulted in energization and pickup of the reset relay N. This relay closes its make contacts N1 under the assumed conditions before the time-period relay K has dropped out. The opening of the break contacts N3 has no immediate effect on the operation of the system. The closing of the contacts N2 establishes a holding circuit for the reset relay N, which is completed through the break contacts KT1 of the reset stop relay KT. The make contacts N4 close to reset the stepping switch SS in a manner which will be clear from the foregoing discussion. It will be recalled that when the stepping switch SS is reset, the reset relay N is dropped out and opens its make contacts N1 to initiate a new timing-out period for the time-period relay K.

If the number of counted car stops is sufficient to again energize the stop-quota relay QA before the time-period relay K drops out, the heavy-traffic relay HT remains energized, the stepping switch SS is reset, and the time-period relay is energized and started on another timing-out period. This sequence continues until the number of car stops registered is insufficient to energize the relay QA before the time-period relay K drops out. It will be recalled that the time period relay on dropping out opens its make contacts K2 to deenergize the heavy traffic relay HT.

A heavy-traffic relay and its control are disclosed in the Santini and Suozzo patent application Serial No. 259,066, filed November 30, 1951, and entitled "Elevator Dispatching systems."

The lower part of Fig. 7 illustrates circuits for an upper dispatcher. This dispatcher controls the selection of each elevator car to leave the upper-terminal floor and initiates the starting of such elevator car from the floor.

The selection of the next car to be dispatched from the upper terminal floor is effected by a selecting mechanism which is operated in part by a constant speed motor 85T.

The motor may be of the induction type energized from an alternating-current source represented by conductors LAC1 and LAC2. The energizing circuit is completed through any one of the sets of break contacts 78—2, B78—2, C78—2 and D78—2 which are closed when a call is registered which may be answered respectively by the elevator cars A, B, C and D. It is also energized through break contacts 1SD2 of the upper-interval-holding relay.

This motor 85T is releasably coupled to cam 87T by means of an electromagnetic clutch RCT. When a winding of the clutch RCT is deenergized, the motor 85T is disconnected from the cam 87T. When the winding is energized, the motor is connected to the cam 87T, and it rotates the same for the purpose of selecting the next car to be dispatched from the dispatching floor.

Energization of the electromagnetic clutch RCT is controlled in part by upper-terminal relays TT, BTT, CTT and DTT. For example, when the elevator car A is at or adjacent its upper-terminal floor, the brush *yc* engages the contact segment *y6* to connect the winding of the upper terminal relay TT across the buses L1 and L2. (The brush and contact segment are incorporated in the floor selector of Fig. 1 and operate in a manner which will be understood from the earlier discussion of the floor selector.)

When the upper-terminal relay TT is energized, it closes its make contacts TT6 and TT7. In closing, the contacts TT7 prepare the winding of the next relay NT for subsequent energization.

Closure of the make contacts TT6 completes an energizing circuit for the electromagnetic clutch RCT as follows:

L1, TT6, RCT, NT3, BNT3, CNT3, DNT3, L2

If some car of the bank has already been designated as the next car to leave the dispatching floor, one of the sets of the break contacts NT3, BNT3, CNT3, or DNT3 will be open to prevent energization of the electromagnetic clutch RCT. Assuming, however, that no car has been so designated, the electromagnetic clutch RCT is energized upon arrival of the car A at the upper dispatching floor.

As the cam rotates, it closes successively the switches YT, BYT, CYT and DYT which are biased towards their open conditions. This continues until the cam closes the switch of a car located at or adjacent the dispatching floor. Thus, when the cam closes the switch YT a circuit is selected for the next relay NT as follows:

L1, TT7, NT, ST5, YT, L2

Had any of the other switches BYT, CYT or DYT been closed, the associated next relays BNT, CNT, or DNT would have remained deenergized for the reason that the cars B, C and D are assumed to be away from the upper dispatching floor and the contacts BTT7, CTT7 and DTT7 are open.

When the next relay NT is energized, it closes its make contacts NT4 and NT5 and opens its break contacts NT3. The opening of the break contacts NT3 deenergizes the winding of the electromagnetic clutch RCT and the cam 87T consequently stops rotating. The selecting mechanism can not be operated again until the break contacts NT3 have been reclosed.

In closing, the contacts NT4 prepare upper-terminal start relay ST for subsequent energization.

The closure of make contacts NT5 may be employed for operating suitable signal devices such as a lamp 92T. It should be noted that this selection is affected rapidly. As pointed out in the discussion of Fig. 5, the contacts NL1 are employed in controlling the illumination of the upper-terminal hall lantern for the elevator car A.

The dispatching system also "starts" each of the cars from the dispatching floor after the expiration of a suitable dispatching interval. To this end, the motor 85T is releasably coupled by an electromagnetic clutch SCT to a timer cam 89T through the circuit:

L1, 1ST3, SCT, ST4, BST4, CST4, DST4, L2

When the winding is energized, the cam 89T will rotate away from a starting position to operate a cam-operated switch 91T which is biased towards its open condition. When the electromagnetic clutch coil SCT is deenergized, a spring 93T returns the cam 89T to its starting position. The construction of the motor 85T and the electromagnetic clutches may be similar to that illustrated in the Eames Patent 2,121,587.

Each of the contacts ST4, BST4, CST4 and DST4 opens when its associated car is assigned to start from the dispatching floor. Unless these contacts all are closed, the electromagnetic clutch coil SCT can not be energized and a succeeding interval can not be initiated.

When the timing cam 89T reaches the switch 91T, the switch contacts close to energize the interval relay 1SD through the circuit:

L1, 1SD, 91T, HCM5, ST4, BST4, CST4, DST4, L2

The interval relay 1SD opens its break contacts 1SD3 and closes its make contacts 1SD4. The contacts 1SD3 in opening deenergize the coil of the electromagnetic clutch SCT and the spring 93T promptly restores the timing cam to its starting position.

If a car is adjacent the dispatching floor (contacts TT7, BTT7, CTT7 or DTT7 are closed) and if one of the cars at the dispatching floor has been selected as the next car to be dispatched (contacts NT4, BNT4, CNT4 or DNT4 are closed) a start circuit is established for one of the cars by closure of contacts 1SD4, such as the following circuit for the car A:

L1, TT7, ST, NT4, 1SD4, L2 to energize the upper-terminal start relay ST.

When the start relay ST is energized, it opens its break contacts ST4 and ST5 and closes its make contacts ST6. The opening of the contacts ST4 prevents further energization of the electromagnetic clutch SCT until the car has departed from the dispatching floor. Opening of the contacts ST5 interrupts energization of the next relay NT and permits energization of the clutch RCT to select another elevator car if such other elevator car is available. Closure of contacts ST6 establishes a holding circuit around the contacts NT4 and 1SD4.

As the car A leaves the dispatching floor, the brush *yc* is moved out of engagement with the contact segment *y6*. Consequently, the upper-terminal relay TT is deenergized. Contacts TT6 open to maintain the winding of the electromagnetic clutch RCT deenergized until another car is at or adjacent the upper dispatching floor. Contacts TT7 open to deenergize the start relay ST.

The auxiliary start relay ST on being deenergized closes its contacts ST4 to permit energization of the electromagnetic clutch SCT. Contacts ST5 close to prepare the next relay NT for subsequent energization and contacts ST6 open.

It will be recalled that if a dispatching interval expires with no elevator car present at the upper dispatching floor, the high-call reversal relay HCM (Fig. 5) may be energized. This relay when energized opens its contacts HCM5 (Fig. 7) to prevent energization of the clutch SCT until an up-traveling elevator car reverses at a floor below the upper-terminal floor.

When the passenger enters an elevator car at the upper-terminal floor which has been selected to leave such terminal floor, he may register a call for the floor to which he desires to proceed substantially before the interval for the starting of the elevator car expires. In order to advise the passenger that the car will leave shortly, suitable information may be conveyed to him. This information may be conveyed to him by means of a sign 94T which is mounted in the elevator car. When the passenger registers his call, the break contacts H3 of the car-call detecting relay close to connect the sign 94T in parallel with the lamp 92T. The sign 94T may include a lamp which is illuminated by such connection and which illuminates a suitable legend, such as "Car Starts Soon."

Figure 8:
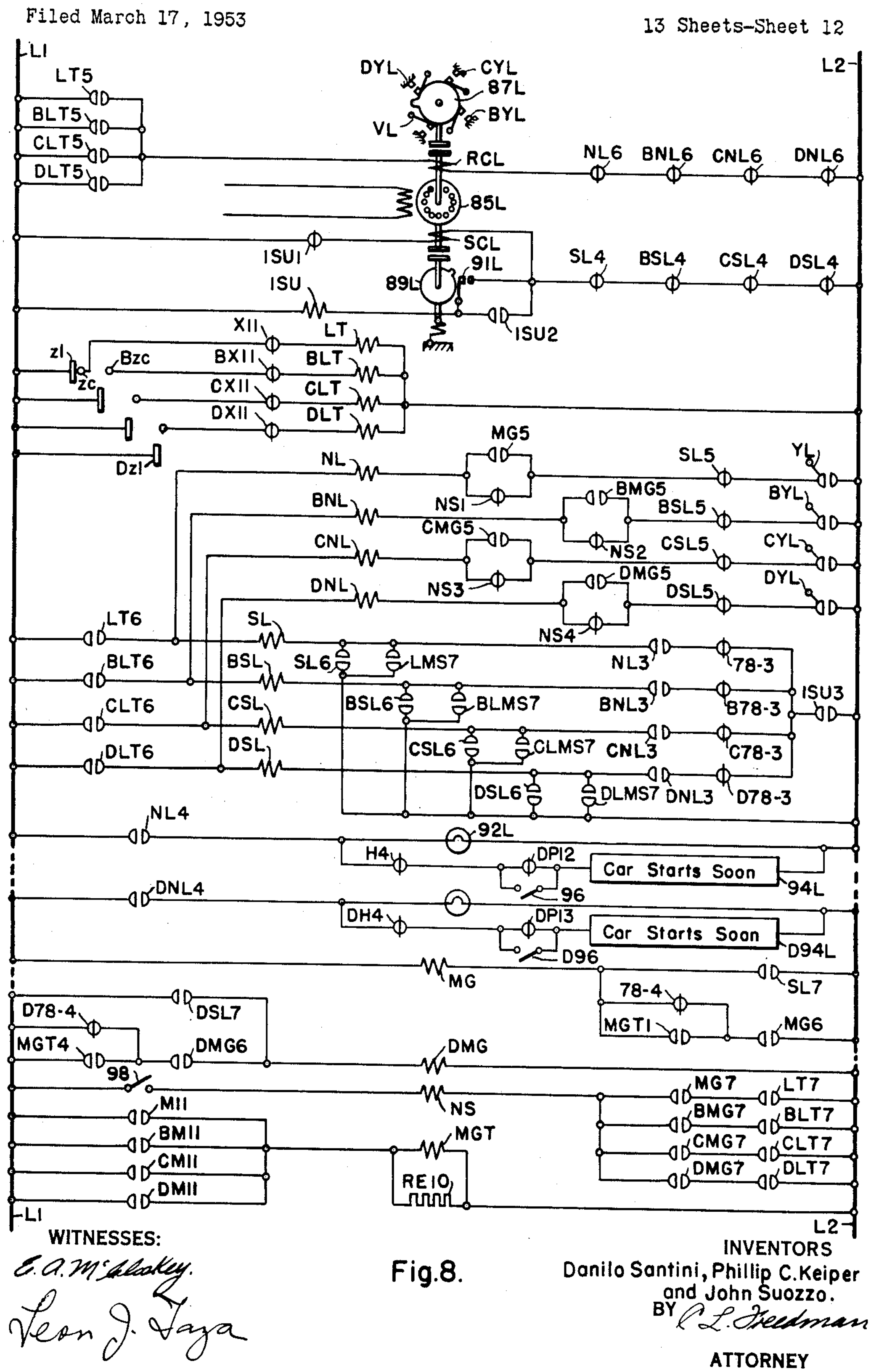
Figure 8A:
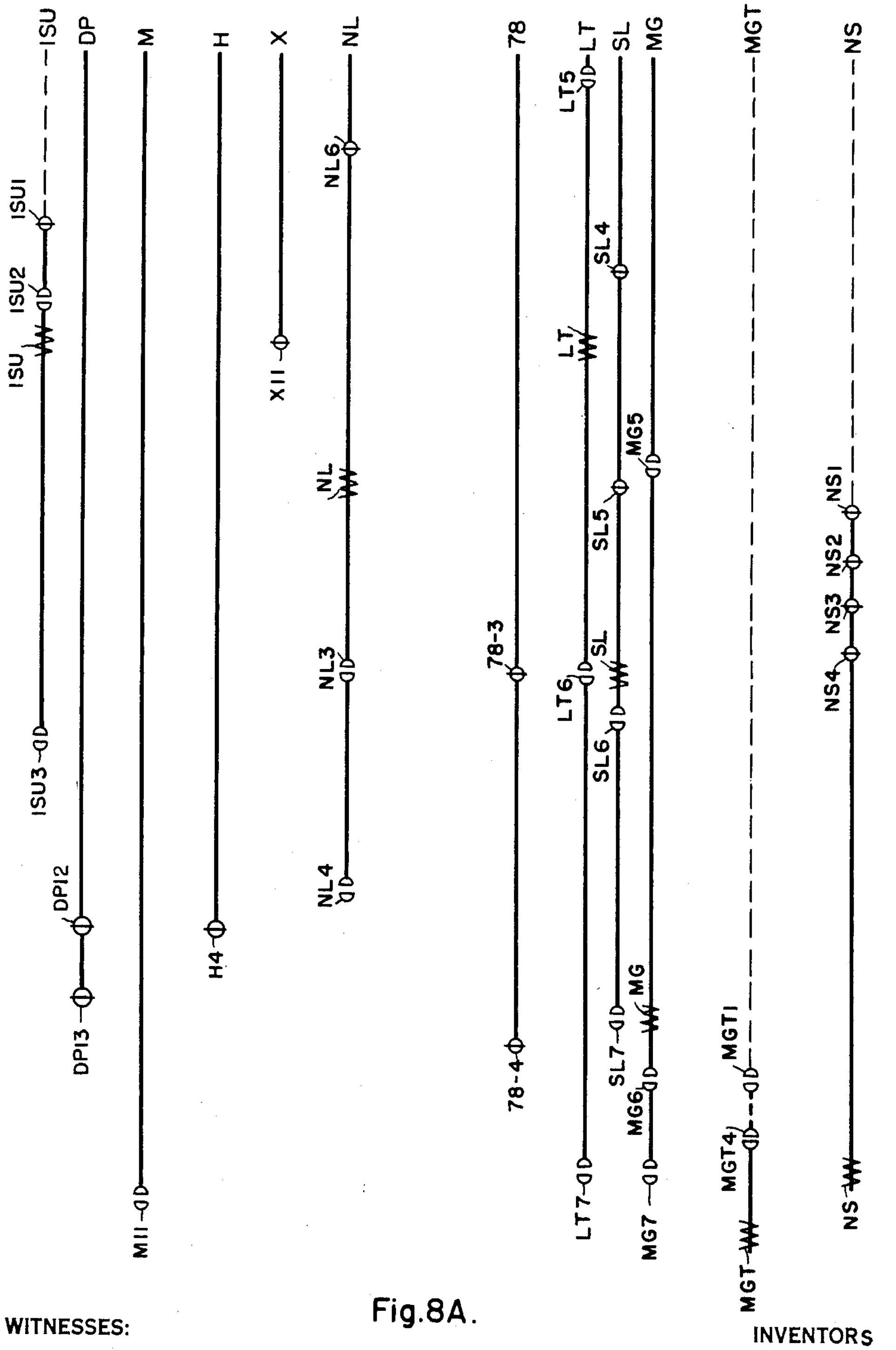

*Figure 8*

In Fig. 8, the dispatcher for the lower-terminal floor is illustrated. Many of the components in the two dispatchers are similar in construction and operation. For this reason, each component of the lower dispatcher which is similar to a component of the upper dispatcher is identified by the same reference character except that the suffix letter T for the upper dispatcher component is replaced by the suffix letter L for designating the lower dispatcher component except for terminal relays and interval-holding relays. Thus, the motor 85T for the upper dispatcher corresponds to the motor 85L for the lower dispatcher and operates in the same manner. For these reasons, it is believed unnecessary to discuss in detail the components of the lower dispatcher which are similar to the components of the upper dispatcher and the discussion on Fig. 8, therefore, will be directed to components which differ from or are additional to the components present in the upper dispatcher.

The lower-terminal relays LT, BLT, CLT and DLT operate in the same manner as the upper-terminal relays, but they are somewhat differently controlled. Each of the lower-terminal relays is energized when its associated car reaches the lower-terminal floor provided the car is not set for down travel. For example, when the brush *zc* reaches the contact segment *z1*, an energizing circuit is completed for the lower-terminal relay LT for the car A if the break contacts X11 are closed to indicate that the car is not proceeding to the basement floor. The brush *zc* and the contact segment *z1* are incorporated in the floor selector 16 of Fig. 1 to engage when the car A is at the lower-terminal or first floor in a manner which will be understood from the foregoing discussion.

The lower-terminal next relays operate in a manner similar to the operation of the upper-terminal next relays, with the exception that to permit energization of each of the next relays for the lower terminal, the motor-generator set for the associated elevator car must be in operation or a transfer relay NS must be deenergized to indicate that no elevator car is available at the lower-terminal floor with its motor-generator set in operation. For example, the lower-terminal next relay NL for the elevator car A includes in its energizing circuit parallel-connected make contacts MG5 of the motor-generator starting switch MG for the elevator car A and break contacts NS1 of the transfer relay for the system. If the motor-generator set for the elevator car A is in operation, the make contacts MG5 are closed to permit energization therethrough of the next relay NL. However, if the contacts MG5 are open, thus indicating that the motor-generator set for the motor car A is shut down, the next relay NL may be energized through the break contacts NS1, which are closed when no elevator car is available at the lower terminal floor with its motor generator set in operation.

The energization of the lower-terminal start relays is similar to that of the upper-terminal start relays with two exceptions. Each of the lower-terminal start relays can be energized only if a call is registered which may be answered by the associated elevator car, or if the associated elevator car is loaded. For example, if a call is registered which may be answered by the elevator car A, the lower-terminal start relay SL may be energized through the following circuit:

L1, LT6, SL, NL3, 78—3, 1SU3, L2

In this circuit, the break contacts 78—3 are closed when a call is registered which may be answered by the elevator car A.

Alternatively, if the elevator car A is fully loaded, the cam-operated contacts LMS7 are closed and the start relay SL may be energized through the circuit:

L1, LT6, SL, LMS7, L2

With these exceptions, the terminal relays operate similarly for the two dispatchers and corresponding components readily may be traced on the two figures 7 and 8.

It will be noted that a sign 94L is provided which corresponds to the sign 94T of Fig. 7. However, if the elevator car is not intended to carry passengers from the lower-terminal floor in the up direction under certain circumstances, such as during down-peak operation, it may be desirable to disconnect the sign 94L. To this end, the energizing circuit for the sign 94L includes break contacts DP12 of the down-peak relay. Consequently, when the system is on down-peak operation, the break contacts DP12 are open to prevent energization of the sign 94L. A manually-operable switch 96 may be provided for shunting the break contacts DP12. Consequently, if the elevator car A is intended to carry passengers from the lower-terminal floor during down-peak operation, the switch 96 may be closed to shunt the break contacts DP12. It will be understood that if the switch 96 is closed, registration of a car-call for one of the floors, such as the third floor, results in closing of the break contacts H4 of the car-call detector relay to connect the sign 94L in parallel with the lamp 92L for energization through the make contacts NL4 of the lower-terminal next relay.

As previously pointed out, the motor-generator starting switches control the starting of the motor-generator sets for the elevator cars and also perform certain switching functions. The operation of these switches will be understood from a discussion of the motor-generator starting switch for the elevator car A.

It will be recalled that the elevator cars park at the lower-terminal floor. Let it be assumed that all of the elevator cars are parked and that their motor-generator sets are shut down. If the elevator car A is selected as the next elevator car to leave the lower-terminal floor, and if its starting relay SL operates to initiate a starting of the elevator car A, the make contacts SL7 close to connect the coil of the motor-generator starting switch MG across the buses L1 and L2. In response to such energization of the motor-generator starting switch, the switch closes its make contacts MG1, MG2 and MG3 (Fig. 3) for the purpose of starting the motor-generator set 60. In addition, the make contacts MG4 (Fig. 3) close to connect certain circuits for energization from the buses L1 and L2. Referring to Fig. 8, it will be noted that the motor-generator set also closes its make contacts MG5. Since the elevator car A is assumed to have been selected to leave the terminal floor, the closure of the make contacts MG5 has no immediate effect on the operation of the system.

The motor-generator starting switch also closes its contacts MG6 to prepare a holding circuit which is completed either through the break contacts 78—4 of the no-call relay or through the make contacts MGT1 of the timing relay MGT. This holding circuit remains closed as long as a call remains registered on the system which may be answered by the elevator car A. Under such conditions, the break contacts 78—4 of the no-call relay 78 remain closed. The holding circuit also remains closed for a predetermined time after all of the elevator cars have parked at the lower terminal floor. During this period, the make contacts MGT1 remain closed.

If an elevator car is parked at the lower terminal floor with its motor-generator set shut down and if this elevator car is selected as the next elevator car to leave the lower-terminal floor in the up direction, it is desirable to transfer the selection of the next elevator car to leave the lower-terminal floor to any elevator car which reaches the lower-terminal floor with its motor-generator set in operation. Such a transfer may eliminate the necessity for starting an additional motor-generator set. It is the purpose of the transfer relay NS to effect such a transfer of the selection.

Assuming that the manually-operable switch 98 is closed, the transfer relay NS is energized through any one of four parallel circuits, each including make contacts of the motor-generator starting switch for a separate one of the elevator cars and make contacts of the lower-terminal relay for the same elevator car.

Let it be assumed that the elevator cars B, C and D all are parked at the lower-terminal floor with their motor-generator sets shut down and that the elevator car B has been selected as the next elevator car to leave the lower-terminal floor. It will be assumed further that the elevator car A now reaches the lower-terminal floor. As the elevator car reaches the lower-terminal floor, its lower-terminal relay LT picks up to close the make contacts LT7. Since the elevator car A is in operation, the motor-generator starting switch MG for the elevator car is energized and the contacts MG7 are closed. Consequently, arrival of the elevator car A at the lower-terminal floor is accompanied by energization of the transfer relay NS. This relay opens its break contacts NS1, NS2, NS3 and NS4. Inasmuch as the motor generator set for the elevator car B is shut down, the make contacts BMG5 of the motor-generator starting switch for the elevator car B are open and the opening of the break contacts NS2 results in deenergization of the lower-terminal next relay BNL for the elevator car B. This means that the elevator car B loses its selection as the next elevator car to leave the lower terminal floor.

Inasmuch as the contacts CMG5, NS3, DMG5 and NS4 are all open, the elevator cars C and D cannot be selected as the next elevator car to leave the lower terminal floor. However, since the make contacts MG5 of the motor-generator starting switch for the elevator car A are closed, the elevator car A may be selected as the next elevator car to leave the lower-terminal floor. Under these conditions, the cam 87L operates in the manner previously discussed for the corresponding cam for the upper dispatcher until the elevator car A is selected to leave the lower-terminal floor.

After all of the elevator cars have parked at the lower-terminal floor for a predetermined time with no further calls registered on the system, it is desirable that all of the motor-generator sets be shut down. This control of the motor generator sets is effected by the timing relay MGT which has a substantial delay in drop out. The delay in drop out of the relay MGT may be provided in any desired way. Such a delay is represented in Fig. 8 by a resistor RE10 which is connected across the coil of the relay. The relay MGT is energized through four make contacts M11, BM11, CM11 and DM11 of the running relays for the four elevator cars, and these contacts are connected in parallel for the purpose of controlling the energization of the timing relay. The delay in drop out of the timing relay MGT preferably is substantially larger than the delay in drop out of the non-interference relay 76T (Fig. 3).

Let it be assumed that the elevator car A reaches the lower-terminal floor and that the elevator cars B, C and D are parked at the lower-terminal floor. When the elevator car A reaches the lower-terminal floor, the make contacts M11 open. Since the make contacts BM11, CM11 and DM11 also are open, the timing relay also starts to time out. If the elevator car A starts before the relay MGT drops out, the contacts M11 reclose to re-energize the timing relay. However, if the elevator car fails to start within the drop-out time of the relay MGT, this relay drops out to open its make contacts MGT1 and similar contacts associated with the elevator cars B, C and D. If no call is registered which may be answered by the elevator car A, the break contacts 78—4 of the no-call relay 78 also are open. Consequently, the holding circuit for the motor-generator starting switch MG is interrupted and this relay drops out to shut down the motor-generator set for the elevator car A.

*Operation 1*

From the drawings illustrating the invention and from the foregoing discussion in which the figures of the drawings are discussed in detail, it is possible to trace the operation of the system in response to various demands for elevator service. However, because of the complexity of the system, it will be helpful at this stage to describe a number of representative operations of the system.

For the first operation to be discussed, it will be assumed that all of the elevator cars are parked at the lower-terminal floor with their motor-generator sets shut down. It will be assumed further that the elevator car A has been selected as the next elevator car to be dispatched from the lower-terminal floor and that no call for elevator service is registered in the system. Under these circumstances, the no-call relay 78, the lower-terminal relay LT, the lower-terminal next relay NL and the car-call-detecting relay H all are energized. Furthermore, the doors of the elevator car A are open and the up lantern 1UL (Fig. 5) is illuminated to indicate that the elevator car A is available for service in the up direction.

At this stage, a passenger enters the elevator car A and operates the push button 5c to register a car-call for the fifth floor. By reference to Fig. 4, it will be noted that the operation of the push button 5c completes an energizing circuit for the car-call registering relay 5CR and this relay closes its make contacts 5CR1 to establish a holding circuit around the push button 5c.

In addition, the energization of the car-call registering relay 5CR results in opening of the break contacts 5CR2 (Fig. 5) to interrupt the energizing circuit for the no-call relay 78 and the relay 78 thereupon drops out. Finally, the car-call registering relay 5CR opens its break contacts 5CR3 (Fig. 6) to deenergize the car-call detecting relay H.

Upon dropping out, the no-call relay 78 opens its make contacts 78—1 (Fig. 4) to prevent energization therethrough of the car-call registering relay 1CR for the first floor. It will be recalled that the contacts 78—1 are employed in setting up a parking call for the first or lower-terminal floor when the elevator car A is displaced from the lower terminal floor with no call remaining to be answered by the elevator car A. The no-call relay also closes its break contacts 78—2 (Fig. 7) to assure completion of an energizing circuit for the motor 85T for the upper-terminal dispatcher. If desired, the motor 85L (Fig. 8) for the lower-terminal dispatcher may be energized in a similar manner, or, alternatively, the motor 85L may be continuously energized. Closure of the break contacts 78—4 of the no-call relay 78 has no immediate effect on the operation of the system. The effect of closure of the break contacts 78—3 will be discussed below.

Ordinarily, the dispatcher interval for the lower-terminal dispatcher would have expired and the lower-interval-holding relay 1SU would be energized at the time of registration of the car call. Assuming that the interval has not expired, it will be understood that the electromagnetic clutch SCL is energized through the circuit:

L1, 1SU1, SCL, SL4, BSL4, CSL4, DSL4, L2.

Consequently, the cam 89L rotates until it operates the cam-operated contacts 91L to complete the following circuit:

L1, 1SU, 91L, SL4, BSL4, CSL4, DSL4, L2.

When energized, the lower-interval-holding relay 1SU opens its break contacts 1SU1 to interrupt the energization of the clutch SCL. Make contacts 1SU2 close to shunt the switch 91L. Make contacts 1SU3 close to prepare the lower-terminal-start relays for subsequent energization, Inasmuch as make contacts LT6 of the lower terminal relay for the elevator car A and make contacts NL3 of the lower-terminal next relay NL for the elevator car A are closed under the assumed conditions, the closure of the break contacts 78—3 and of the make contacts 1SU3 completes the following energizing circuit:

L1, LT6, SL, NL3, 78—3, 1SU3, L2.

Before proceeding with a discussion of the effects of the energization of the lower-terminal start relay SL, it may be well to complete the discussion of the car-call detecting relay which was deenergized as a result of the registration of the car call for the fifth floor. This relay H, upon deenergization, opens its make contacts H1 and H2 (Fig. 6) to prevent energization therethrough of the door-control relay R. Closure of the break contacts H3 (Fig. 7) has no immediate effect on the operation of the system. However, closure of the break contacts H4 (Fig. 8) completes with the closed contacts NL4 of the lower-terminal next relay NL, an energizing circuit for the sign 94L which is illuminated to advise the passenger that the car A will start soon.

The energization and pick-up of the start relay SL results in closure of the make contacts SL1 (Fig. 3) to prepare the up switch U and the running relay M for subsequent energization. Make contacts SL2 (Fig. 6) close to complete the following energizing circuit:

L1, R, 50—1, HD1, SL2, L2.

The door-control relay R now is energized to initiate a closing operation of the car doors. Should a starter attendant be available at the lower terminal floor and should he operate the manually-operable switch 85, the door-hold relay HD would be energized to open its break contacts HD1 and prevent energization of the door-control relay.

It will be understood that the energization of the lower-terminal start relay SL is accompanied by opening of the break contacts SL3 to prevent energization therethrough of the door-control relay R.

Turning now to Fig. 8, it will be noted that opening of the break contacts SL4 prevents energization therethrough of the electromagnetic clutch SCL and interrupts energization of the lower terminal holding relay 1SU.

Opening of the break contacts SL5 interrupts the energization of the lower-terminal next relay NL.

Closure of the make contacts SL6 establishes with the make contacts LT6 a holding circuit for the start relay SL. Finally, closure of the make contacts SL7 completes an energizing circuit for the motor-generator starting switch for the elevator car A.

The deenergization and drop out of the lower-terminal holding relay 1SU results in reclosing of the break contacts 1SU1 and opening of the make contacts 1SU2 and 1SU3 without immediate effect on the operation of the system.

The deenergization and drop out of the lower-terminal next relay NL is accompanied by opening of the make contacts NL1 (Fig. 5) to deenergize the up lantern 1UL for the first or lower terminal floor. Closing of the break contacts NL2 (Fig. 6) and opening of the make contacts NL3 (Fig. 8) have no immediate effect on the operation of the system. Opening of the make contacts NL4 deenergizes the sign 94L. Closure of the break contacts NL6 completes an energizing circuit for the electromagnetic clutch RCL (under the assumed conditions the make contacts LT5, BLT5, CLT5 and DLT5 all are closed). As a result of its energization, the electromagnetic clutch connects the cam 87L for rotation to select one of the other elevator cars at the lower-terminal floors as the next elevator car to leave the lower-terminal floor. This will be assumed to be the elevator car B. Consequently, when the cam 87 closes the switch BYL, the following circuit is established:

L1, BLT6, BNL, NS2, BSL5, BYL, L2

The energization of the next relay BNL results in the selection of the elevator car B as the next car in a manner which will be understood from the discussion of the operation of the elevator car A.

Referring now to the motor-generator starting switch MG, it will be recalled that this switch was energized as a result of the closure of the make contacts SL7.

Upon energization and pick up, the motor-generator starting switch MG closes its make contacts MG1, MG2 and MG3 to connect the motor of the motor-generator set 60 for energization (Fig. 3). The relay ZZ picks up with sufficient delay to assure operation of the motor at substantially rated speed prior to such pickup. The motor-generator starting switch also closes its make contacts MG4 to connect certain circuits for energization from the buses L1 and L2. It will be understood that other circuits, which need not be energized until the motor-generator set is in operation, may be similarly controlled by energization of the motor-generator starting switch.

Referring to Fig. 8, it will be noted that the pickup of the motor-generator starting switch is accompanied by closure of the make contacts MG5. Consequently, as long as the motor-generator starting switch for the motor elevator car A is in operation, the lower-terminal next relay NL may be energized through the make contacts MG5 regardless of the condition of the break contacts NS of the transfer relay NS.

Closure of the make contacts MG6 of the motor-generator starting switch completes with the break contacts 78—4 of the no-call relay a first holding circuit for the motor-generator starting switch MG. A second holding circuit may be established by the make contacts MG6 acting in conjunction with the make contacts MGT1 of a timing relay.

Assuming that the switch 98 is closed, closure of the make contacts MG7 completes with the make contacts LT7 of the lower-terminal relay LT an energizing circuit for the transfer relay NS. This relay opens its break contacts NS1, NS2, NS3 and NS4. Consequently, as long as the transfer switch is energized, a lower-terminal next relay can be energized only if the associated motor-generator starting switch is energized to close one of the sets of contacts MG5, BMG5, CMG5 and DMG5.

If desired break contacts of the lower-terminal start relay SL may be placed in series with the contacts MG7 and LT7, and corresponding contacts may be included in the parallel circuits for the remaining elevator cars. With these added contacts operation of the relay SL would interrupt the aforesaid energizing circuit for the transfer relay NS. For present purposes, it will be assumed that such contacts of the lower-terminal start relays are not employed.

As a result of the closure of the make contacts MG4 (Fig. 3) the following energizing circuit is established:

L1, MG4, L3, D6, X2, 78U2, 78P2, W, 66, L2

As a result of its energization and pickup, the up-direction relay W closes its make contacts W1 and opens its break contacts W2 without immediately affecting the operation of the system. Closures of the make contacts W3, W4, W5 and W6 of Fig. 4, W7, W8, W9, W10 and W11 of Fig. 5 have no immediate effect on the operation of the system.

Consideration now will be given to the previously mentioned energization and pickup of the door-control relay R (Fig. 6). Closure of the make contacts R2 completes with the break contacts M8 an energizing circuit for the timing relay XX. This relay closes its make contacts XX1 to establish a holding circuit around the contacts R2. The relay XX has a time delay in pickup and remains energized until the elevator car starts and opens its break contacts M8. Closure of the make contacts R3 has no immediate effect on the operation of the system. Opening of the break contacts R6 prevents energization therethrough of the door-open relay OP. Closure of the make contacts R5 completes the following energizing circuit:

L1, R5, OP1, 53A, LC, 44, L2

The door-close relay closes its make contacts LC4 to complete with the contacts ZZ2 and contacts 53A1 an energizing circuit for the buzzer 53. The make contacts ZZ2 are closed when the motor-generator set of the car A is operating substantially at rated speed. Consequently, the buzzer 53 starts signalling the closure of the door slightly before the door starts to close and continue to sound until the relay 53A picks up to open its contacts 53A1. If desired, the timing relay 53A may be adjustable over a range sufficient to permit the buzzer 53 to continue to sound over any desired portion of the door closing movement. The door-close relay LC also opens its break contacts LC1 to prevent energization therethrough of a door-opening relay OP. In addition, make contacts LC2 and LC3 close to energize the armature 41A of the motor 41 with proper polarity for closing the doors of the elevator car.

Should an obstruction be located in the reclosing path of the doors of the elevator car, the safety edge of the doors would be operated to open the switch 50—1 and the door-control relay R would be deenergized. When deenergized, the relay R opens its make contacts R2 and R3 without immediately affecting the operation of the system. Opening of the contacts R5 deenergizes the door-close relay LC, and break contacts R6 close to complete an energizing circuit for the door-open relay OP. It will be understood that as the elevator door closes, the limit switch 46 is released by its cam and recloses.

The door-close switch opens its make contacts LC2 and LC3 to interrupt the energizing circuit for the armature of the motor 41. Also, contacts LC4 open to interrupt the energizing circuit for the buzzer 53. It should be noted that the timing switch 53A resets at the same time.

The door-open relay OP now is energized and opens its break contacts OP1 to prevent energization of the door-close relay LC. Make contacts OP2 close to establish with the switch 45 a holding circuit for the door-open relay.

The extent to which the door opens depends to some extent on the position from which the door starts to reopen. For example, let it be assumed that the door starts to reopen before the cam 43 (Fig. 2) reaches the switch 45. Under such circumstances, the door reopens until the cam 43 engages the switch 46 and the door comes to rest in its fully-open position.

Let it be assumed next that the door starts to reopen when the cam 43 is intermediate the switches 44 and 45. If the safety edge is clear of any obstruction before the cam 43 reaches the switch 45, the contacts 50—1 of the safety edge (Fig. 6) reclose to permit reenergization of the door-control relay R. Consequently, when the switch 45 is opened by its associated cam, the door-open relay OP is deenergized (the break contacts R6 also are open under the assumed conditions). However, if the obstruction remains in engagement with the safety edge, the contacts 50—1 remain open and the door-control relay R remains deenergized. Under these circumstances, the break contacts R6 remain closed and the door-open relay OP remains energized to open the door fully despite the prior opening of the switch 45.

It will be recalled that at the start of the door-closing operation, the relay XX was energized. This relay closed its make contacts XX2 to energize the timing relay YY. If a door is prevented from closing for an unduly long time, the timing relay YY finally picks up to close its make contacts YY1. These contacts complete with the make contacts ZZ1 an energizing circuit for the buzzer 52. This buzzer may sound a distinctive signal, such as an intermittent buzz, to indicate that the door should be released. At the same time, the make contacts R5 are shunted by make contacts YY2 of the timing relay YY. Consequently, the next time the door starts to close, it will continue to close despite opening of the make contacts R5. Opening of the break contacts YY3 prevents energization of the door-open relay OP. Finally, closeure of the make contacts YY4 partially completes a shunting circuit for the resistor RE3.

The door now starts to reclose at its rated speed. However, if the safety edge again encounters an obstruction, the operation of the safety edge closes the switch 50—2 to complete the shunt around the resistor RE3. The resulting increase in the energization of the field winding 41F decreases the speed of the door and increases the torque acting on the door in an effort to force the door to its closed condition.

As the door reaches its fully closed condition it engages the limit switch 44 to deenergize the door-close relay LC. The operation of this relay has been discussed above.

As the door reaches its fully closed position, it also closes its safety switch 44A (Fig. 2). Assuming that all of the safety switches associated with doors of the elevator car A and of the hoistway are closed, the door-safety relay Z (Fig. 3) is energized.

When the door-safety relay Z picks up, it closes its make contacts Z1 to complete the following energizing circuit:

L1, MG4, L3, LT1, SL1, W1, F1, 63, U, M, Z1, L2

As a result of its energization, the up switch U closes its make contacts U1 to complete an energizing circuit for the coil of the brake. Consequently, the brake is released. In addition, the make contacts U2 and U3 close to complete an energizing circuit for the generator field winding 60GF with proper polarity for up travel of the elevator car. The make contacts U4 close to complete with the limit switch 61 and the break contacts E1 of the inductor slowdown relay E an energizing circuit for the speed relay V. The speed relay closes its make contacts V1 to shunt the resistor RE1 and thus increases the energization of the generator field winding 60GF. Consequently, full energization is applied to the elevator motor and the elevator car A accelerates rapidly in the up direction.

The up switch U also closes its make contacts U5 to establish a holding circuit around the contacts LT1, SL1 and W1. Finally, the up switch U opens its break contacts U6 to prevent energization of the down-direction relay.

Turning next to the running relay, it will be noted that the running relay, when energized, closes its make contacts M1 to prepare the holding relay G, the inductor slowdown relay E and the inductor stopping relay F for subsequent energization. Make contacts M2 close to establish a holding circuit around the contacts 78U2 and 78P2. Make contacts M3 close to energize the noninterference relay 70T. Closure of make contacts M4 and M5 and opening of break contacts M6 of Fig. 4 have no immediate effect on the operation of the system. Opening of break contacts M7 (Fig. 5) has no immediate effect on the operation of the system.

Opening of break contacts M8 (Fig. 6) deenergizes the relay XX. This relay, in resetting, opens its make contacts XX2 to deenergize the timing relay YY which also resets if it has previously picked up. In resetting, the relay YY opens the make contacts YY1 to silence the buzzer 52. Opening of the break contacts YY2 and YY4 and closure of the break contacts YY3 have no immediate effect on the operation of the system.

Upon closure, the make contacts M9 and M10 complete with the make contacts R3 a holding circuit for the door-control relay R. Consequently, this relay remains energized until the elevator car stops at a floor.

Referring to Fig. 8, it will be noted that the energization of the running relay M is accompanied by closure of the make contacts M11 to energize the timing relay MGT. As previously explained, the timing relay closes make contacts MGT1 to establish with the make contacts MG6 an alternate holding circuit for the motor-generator starting switch MG.

As the elevator car A leaves the lower terminal floor, the brush *zc* leaves the contact segment *z*1 (Fig. 8) to deenergize the lower-terminal relay LT. This relay opens its make contacts LT1 and closes its break contacts LT2 (Fig. 3), closes its break contacts LT3 and opens its make contacts LT4 (Fig. 6), and opens its make contacts LT5 (Fig. 8) without immediately affecting the operation of the system.

Opening of make contacts LT6 deenergizes the lower-terminal start relay SL without immediately affecting the operation of the system. Make contacts LT7 open to deenergize the transfer relay NS. This relay recloses its break contacts NS1, NS2, NS3, NS4 to permit energization therethrough of one of the next relays for the lower-terminal floor. As previously explained, it will be assumed that the lower-terminal next relay BNL is energized to select the elevator car B as the next elevator car to leave the lower terminal floor.

It will be recalled that when the make contacts M3 (Fig. 3) closed, the noninterference relay 70T was energized. The energization of this relay has no immediate effect on the operation of the system.

As the elevator car A leaves the lower terminal floor, the brush *kc* (Fig. 5) engages the contact segment *k*1. If at this time the elevator car were fully loaded, the cam-operated contacts LMS1 would be closed to complete with the contact segment *k*1 and brush *kc*, the make contacts W7 and the switch 80 an energizing circuit for the auxiliary load relay Y. However, under the assumed conditions the elevator car A is not fully loaded and the relay Y remains deenergized.

The operation of the dispatcher for the upper-terminal floor illustrated in Fig. 7 now should be considered. If the buses L1 and L2 of Fig. 7 were energized only when a call for service was registered on the system, the dispatcher shown in Fig. 7 would measure a dispatching interval only after the energization of the buses. In the present case, it will be assumed that the buses L1 and L2 are continuously energized.

When the last of the elevator cars reversed at one of the upper floors and started to return to the lower-terminal floor, the following circuit was established:

L1, 1SD3, SCT, HCM5, ST4, BST4, CST4, DST4, L2

As a result of its energization, the clutch SCT initiated rotation of the cam 89T. Upon expiration of the dispatching interval, the cam 89T closed the switch 91T to complete the following circuit:

L1, 1SD, 91T, HCM5, ST4, BST4, CST4, DST4, L2

The energized relay closed its make contacts 1SD1 (Fig. 5). Since none of the elevator cars were at the upper-terminal floor at this time, the break contacts of the upper-terminal relays TT3, etc. all were closed. Consequently, if the switch 77 was in the position illustrated in Fig. 5, the following circuit was completed:

L1, 1SD1, TT3, BTT3, CTT3, DTT3, 77, HCM, L2

The high-call-reversal relay HCM closed its make contacts HCM1 to establish a holding circuit which included the break contacts 78U3, B78U3, C78U3 and D78U3.

Under the assumed conditions, closure of the make contacts HCM2 has no effect on the operation of the system. However, the high-call reversal relay HCM also controls in part the energization of each of the high-call relays for each of the elevator cars. For example, the high-call relay 78U can be energized only if the make contacts HCM4 are closed or if the make contacts LMS5 are closed. The latter contacts are closed when the elevator car A is fully loaded.

Since the elevator car A is traveling up, the make contacts W9 of the up-direction relay W are closed. However, since the break contacts 5CR2 in the circuit 81 are open, the high-call relay 78U remains deenergized until the brush *mc* reaches the contact segment *m*5. This occurs as the elevator car nears the fifth floor. Consequently, the relay 78U is energized when no call remains to be answered by the elevator car A which requires further up travel of the elevator car.

Referring to Fig. 7, it will be noted that the energization of the high-call reversal relay HCM opened break contacts HCM5 to interrupt energization therethrough of the relay 1SD and the clutch SCT.

Upon dropout the relay 1SD opens its make contacts 1SD1 (Fig. 5), closes its break contacts 1SD2 (Fig. 7) and 1SD3 and opens its make contacts 1SD4 without immediately affecting operation of the system.

As the elevator car A nears the fifth floor, the brush *ac* (Fig. 4) engages the contact segment *a*5 which is associated with the fifth floor to complete the following circuit:

L1, 5CR1, *a*5, *ac*, DP1 or 71, W3, T, M4, L2

As a result of its energization, the car-call stopping relay T closes its make contacts T1 (Fig. 3) to complete with the closed make contacts M1 an energizing circuit for the holding relay G, the inductor slowdown relay E and the inductor stopping relay F. Had the elevator car A approached any other floor during its up trip for which an elevator car call was registered, the engagement of the brush *ac* with the appropriate contact segment would have energized the car-call stopping relay T in the same manner to initiate a stopping operation of the elevator car.

Upon energization, the holding relay G closes its make contacts G1 to establish a holding circuit around the contacts T1. The holding relay G also closes its make contacts G2 (Fig. 7) to prepare the stepping switch SS for a stepping operation as the elevator car stops. The operation of the stepping switch was set forth clearly in the discussion of Fig. 7. For Operation I, it will be assumed that the stepping switch has no effect on the operation of the system.

As the elevator car A continues to approach the fifth floor, the inductor slowdown relay E finally reaches the inductor plate UEP (Fig. 1) associated with the fifth floor and consequently opens its break contacts E1. These contacts thereafter remain open until the coil of the inductor relay E is deenergized.

The effect of energization of the inductor slowdown relay is to interrupt the energization of the speed relay V (Fig. 3). This relay opens its make contacts V1 to introduce the resistor RE1 in series with the generator field winding 69GF. As a result of the decrease in energization of the field winding, the elevator car A slows to its landing speed.

Further movement of the elevator car A towards the fifth floor brings the inductor stopping relay F into alignment with the inductor plate UFP (Fig. 1) for the fifth floor. This results in opening of the break contacts F1 which interrupts the energization of the up switch U (Fig. 3) and the running relay M.

As a result of its deenergization, the up switch U opens its make contacts U1 to deenergize the coil of the brake 15 and the brake thereupon is applied by its spring in the customary manner into engagement with its drum 14. Since the up switch also opens its make contacts U2 and U3 to deenergize the field winding 69GF, it follows that the elevator car A stops accurately at the fifth floor. Opening of the make contacts U4 and U5 has no immediate effect on the operation of the system. Closure of the break contacts U6 permits energization therethrough of the down-direction relay.

Deenergization of the running relay M results in opening of the make contacts M1 to deenergize the holding relay G, the inductor-slowdown relay E and the inductor-stopping relay F. These relays reset without immediate effect on the system operation.

It will be noted that the running relay M also opens its make contacts M2. Such opening results in deenergization of the up-direction relay W for the reason that the break contacts 78U2 also are open. It will be recalled that under the assumed conditions, no call is registered requiring travel of the elevator car above the fifth floor. Consequently, the engagement of the brush *mc* (Fig. 5) with the contact segment *m*5 as the elevator car neared the fifth floor resulted in energization of the high-call relay 78U. The high-call relay 78U closed its make contacts 78U1 (Fig. 3). However, since the make contacts T1 also closed as the elevator car A approached the fifth floor, the additional closure of the make contacts 78U1 was not required to stop the elevator car A at the fifth floor under the assumed conditions. As previously explained, the opening of the break contacts 78U2, together with the opening of the make contacts M2, deenergizes the up-direction relay W. The high-call relay 78U also opens its break contacts 78U3 (Fig. 5) to interrupt the holding circuit for the high-call reversal relay HCM, and to restore the relay HCM for control by the contacts 1SD1, TT3, BTT3, CTT3 and DTT3.

The high-called reversal relay HCM opens its make contacts HCM1, HCM2, HCM3, and HCM4 without immediately affecting the operation of the system. However, the closure of the break contacts HCM5 (Fig. 7) completes an energizing circuit for the clutch SCT and the cam 89T consequently starts to rotate for the purpose of measuring another dispatching interval.

Returning to the operation of the running relay M, it will be noted that the opening of the make contacts M3 (Fig. 3) starts a timing-out operation of the noninterference relay 70T. Opening of the make contacts M4 (Fig. 4) deenergizes the car-call stopping relay T and this relay drops out without affecting the operation of the system at this time. As previously pointed out, the brush *ac* may pass slightly beyond the contact segment *a*5 as the elevator car A stops at the fifth floor.

As the elevator car A stops at the fifth floor, the brush *cc* engages the contact segment *c*5. Consequently, when the break contacts M5 close, the following cancelling circuit is completed:

L1, 5CR1, 5CRN, *c*5, *cc*, W4, M5, L2

The energization of the cancelling coil resets the car-call registering relay 5CR. In dropping out, the relay 5CR opens its holding contacts 5CR1 and closes its break contacts 5CR2 (Fig. 5).

Under the assumed conditions, no call remains registered on the system which may be answered by the elevator car A. Consequently, all contacts in the circuit 81 (Fig. 5) are closed and the no-call relay 78 is energized. This relay closes its make contacts 78—1 to complete with the closed break contacts LT2 an energizing circuit for the car-call registering relay 1CR (Fig. 4). Opening of the break contacts 78—2 (Fig. 7) and the break contacts 78—3 and 78—4 (Fig. 8) has no immediate effect on the operation of the system.

As a result of its energization, the car-call registering relay closes its make contacts 1CR1 (Fig. 4) to establish a self-holding circuit. Break contacts 1CR2 (Fig. 5) open to deenergize and drop out the no-call relay 78 without immediate effect on the operation of the system.

Break contacts M6 (Fig. 4) close without immediately affecting the operation of the system.

Referring to Fig. 5, it will be noted that as the elevator car reaches the fifth floor, the brushes *uc* and *pc* engage, respectively, the contact segments *u*5 and *p*5. Consequently, closure of the break contacts M7 of the running relay M results in illumination of one of the floor lanterns 5UL or 5DL.

By reference to Fig. 6, it will be noted that closure of the break contacts M8 partially prepares an energizing circuit for the relay XX. Opening of the make contacts M9 and M10 deenergizes the door-control relay R.

The running relay M also opens its contracts M11 (Fig. 8). Under the assumed conditions, these are the only contacts through which the timing relay MGT is energized and this relay starts to time out. Break contacts M12 (Fig. 7) close to complete an energizing circuit for the stepping switch before the contacts X12 and G2 open.

It will be recalled that the up-direction relay W (Fig. 3) now is dropped out. In dropping out, the relay opens its make contacts W1 without immediately affecting the operation of the system. Break contacts W2 close to complete the following energizing circuit:

L1, MG4, L3, U6, W2, 67, X, 68, L2

Consequently, the down-direction relay picks up to prepare the elevator car A for down operation.

Opening of the make contacts W3, W4, W5 and W6 (Fig. 4), W7, W8, W9 and W10 (Fig. 5) has no immediate effect on the operation of the system. Opening of the make contacts W11 prevents energization therethrough of the up-floor lantern 5UL.

Since the down-direction relay X is now energized, it closes its make contacts X1, opens its break contacts X2 (Fig. 3) and closes its make contacts X3, X4, X5 and X6 (Fig. 4) to prepare the system for down operation. In addition, the relay closes its make contacts X7 (Fig. 5) to complete with the closed make contacts M7 the brush *pc* and the contact segment *p5* an energizing circuit for the down-floor lantern 5DL. Consequently, this lantern now indicates that the elevator car A will leave the fifth floor in the down direction.

The relay X also opens its break contacts X8 and closes its make contacts X9 and X10 (Fig. 6) and opens its break contacts X11 (Fig. 8) and X12 (Fig. 7) without immediately affecting the operation of the system.

Turning next to the deenergized door-control relay R, this relay opens its make contacts R2. The relay XX preferably has a slight delay in pick up. This delay is such that when the break contacts M8 close, the relay XX remains dropped out for a time sufficient to permit the contacts R2 to open.

Opening of the make contacts R3 and R5 has no immediate effect on the operation of the system. However, closure of the break contacts R6 completes the following energizing circuit:

L1, YY3, R6, LC1, OP, 46, L2

The door-open relay OP opens its break contacts OP1 to prevent energization therethrough of the relays LC and 53A. Make contacts OP2 close to complete with the switch 45 a holding circuit around the contacts R6 and YY3. The make contacts OP3 and OP4 energize the armature 41A of the motor 41 with proper polarity to open the elevator door. The door now is assumed to open until the limit switch 46 is operated to deenergize the door-open relay OP. During the opening movement of the door, the limit switch 44 recloses to partially prepare the energizing circuit for the relays LC and 53A. The resetting of the relay OP has no immediate effect on the operation of the system.

The elevator car A now is stopped at the fifth floor and the doors are open to permit departure of the passenger. Furthermore, the elevator car A is conditioned for down travel.

Upon expiration of the time delay for which the noninterference relay 70T (Fig. 3) is adjusted, this relay drops out to close its break contacts 70T1. Such closure has no immediate effect on the operation of the system.

In addition, the relay opens its make contacts 70T3 (Fig. 6) without effecting the immediate operation of the system. However, closure of the break contacts 70T2 completes the following circuit:

L1, R, 50—1, HD1 or SL3, TT4, LT3, 70T2, L2

As a result of its energization, the door-control relay R initiates a closing operation of the door for the elevator car A by a sequence which will be understood from the previous discussion of Fig. 6. When the door finally closes and the contacts at all doors associated with the elevator car A are closed, the door-safety relay Z (Fig. 3) is energized and closes its make contacts Z1 to complete the following circuit:

L1, MG4, L3, LT2, TT2, 70T1, X1, F2, 64, D, M, Z1, L2

As a result of its energization, the down switch D closes its contacts D1 to release the brake and closes its make contacts D2 and D3 to energize the generator field winding 60GF with proper polarity for down travel of the elevator car. Contacts D4 close to complete an energizing circuit for the speed relay V and this relay closes its make contacts V1 to shunt the resistor RE1. The elevator car A now is conditioned for full speed operation in the down direction and accelerates away from the fifth floor.

Closure of the make contacts D5 establishes a holding circuit around the contacts LT2, TT2, 70T1 and X1. Opening of the break contacts D6 prevents energization therethrough of the up-direction relay W.

The running relay M closes its make contacts M1 and M2 without affecting immediately the operation of the system. Closure of make contacts M3 reenergizes the noninterference relay 70T. This relay opens its break contacts 70T1, 70T2 (Fig. 6) and closes its make contacts 70T3 without immediately affecting the operation of the system.

The running relay also closes its make contacts M4 and opens its break contacts M5 and M6 (Fig. 4) without affecting the immediate operation of the system. Opening of the break contacts M7 (Fig. 5) interrupts the illumination of the floor lantern 5DL.

Opening of the break contacts M8 deenergizes the relay XX (Fig. 6) and closure of the make contacts M9 and M10 completes with the contacts R3 a holding circuit for the door control relay R. These circuits were set forth clearly in the discussion of Fig. 6.

Closure of make contacts M11 (Fig. 8) reenergizes the timing relay MGT. Such energization occurs before the timing relay MGT drops out. Opening of the break contacts M12 (Fig. 7) has no immediate effect on the system.

As the elevator car nears the lower-terminal floor, the brush *bd* engages the contact segment *b*1 (Fig. 4) to complete the following circuit:

**L1, 1CR1, *b*1, *bd*, X3, T, M4, L2**

As a result of its energization, the car-call stopping relay closes its make contacts T1 (Fig. 3) to complete with the contacts M1 an energizing circuit for the holding relay G, the inductor-slowdown relay E and the inductor-stopping relay F. The brush *bd* may be assumed to leave the contact segment *b*1 before the elevator car A reaches the first floor. The holding relay G closes its make contacts G1 (Fig. 3) and G2 (Fig. 7).

Continued movement of the elevator car A in the down direction brings the inductor-slowdown relay E adjacent the inductor plate DEP for the lower-terminal floor and the break contacts E2 open to deenergize the speed relay V (Fig. 3). Thereupon, the speed relay opens its make contacts V1 to introduce the resistor RE1 in series with the generator field winding 60GF and the elevator car A slows down to a landing speed. The contacts E2 remain open until the coil of the inductor relay is deenergized.

The elevator car A next reaches the inductor plate DFP for the lower terminal floor and the break contacts F2 open to deenergize the down switch D and the running relay M.

The deenergization of the down switch D results in opening of the make contacts D1 to apply the brake and opening of the make contacts D2 and D3 to deenergize the generator field winding 60GF. The elevator car A now stops accurately at the lower-terminal floor. Opening of the make contacts D4 and D5 has no immediate effect on the operation of the system. Closure of the contacts D6 prepares the up-direction relay W for subsequent energization.

If the elevator car A is not assigned to proceed to the basement floor, the make contacts 1DR1, *b*CR1, *b*UR1 all are open. Since the switch 67 opens as the elevator car A reaches the lower-terminal floor it follows that the down-direction relay X is deenergized. This relay closes its break contacts X2 to complete the following circuit:

L1, MG4, L3, D6, X2, 78U2, 78P2, W, 66, L2

Upon deenergization, the down-direction relay X also opens its make contacts X1 (Fig. 3), X3, X4, X5 and X6 (Fig. 4), X7 (Fig. 5), X9 and X10 (Fig. 6), closes its break contacts X11 (Fig. 8) and X12 (Fig. 7). Since the brush *zc* engages the contact *z*1, the closure of the contacts X11 is accompanied by energization of the lower-terminal relay LT.

The up-direction relay, when energized, closes its make contacts W1 and opens its break contacts W2 (Fig. 3), closes its make contacts W3, W4, W5 and W6 (Fig. 4), W7, W8, W9, W10, and W11 (Fig. 5).

Upon deenergization, the running relay M opens its make contacts M1 to deenergize and reset the relays G, E and F (Fig. 3), make contacts M2 and M3 open, the latter starting a timing-out operation of the noninterference relay 70T.

In closing, the break contacts M5 (Fig. 4) complete the following cancelling circuit:

L1, 1CR1, 1CRN, *c*1, *cc*, W4, M5, L2

Consequently, the call registered for the lower terminal floor is cancelled. Closure of break contacts M6 has no immediate effect on the operation of the system.

By reference to Fig. 5, it will be noted that closure of the break contacts M7 has no effect on the floor lantern 1UL. Unless the elevator car A is selected as the next car to leave the lower-terminal floor in the up direction, the lantern 1U1 cannot be illuminated. The effect of reclosure of the break contacts M8 and of the make contacts M9 and M10 (Fig. 6) will be understood from the discussion of the door operation presented under Figure 6.

Opening of the make contacts M11 (Fig. 8) initiates a timing-out operation of the timing relay MGT. Closure of the break contacts M12 (Fig. 7) occurs slightly before opening of the contacts X12 and G2 to move the stepping switch SS through one step.

The pick up of the lower-terminal relay LT is accompanied by closure of the make contacts LT1 and opening of the break contacts LT2 (Fig. 3) which have no immediate effect on the operation of the system. The effect on door operation of opening of the break contacts LT3 and closing of the make contacts LT4 (Fig. 6) has been set forth under the discussion of Fig. 6. Closure of the make contacts LT5 (Fig. 8) has no immediate effect on the system under the assumed conditions. Closure of the make contacts LT6 controls circuits for the lower-terminal next relay NL and the start relay SL.

The effect of the closure of the make contacts LT7 depends on the condition of the switch 98. If this switch is open, closure of the contacts LT7 has no effect. However, if the switch is closed, closure of the contacts LT7 completes with the closed make contacts MG7 an energizing circuit for the transfer relay NS. This relay opens its break contacts NS1, NS2, NS3 and NS4.

It will be recalled that the elevator car B was selected as the next elevator car to leave the lower-terminal floor and the next relay BNL consequently is energized. However, since the motor-generator set for the elevator car B is shut down, the make contacts BMG5 are open. Therefore, upon opening of the break contacts NS2, the next relay BNL is deenergized and the elevator car B loses its selection as the next elevator car to leave the lower terminal floor. Since the relay BNL is deenergized, the make contacts BNL3 are open to prevent starting of the elevator car B and the break contacts BNL6 are closed to complete a circuit for the clutch RCL. This clutch connects the cam 87L for rotation to select another elevator car as the next elevator car to leave the lower terminal floor.

Since the motor-generator set only for the elevator car A is in operation, the next relay NL can be energized through the closed make contacts MG5. Since the contacts BMG5, NS3, CMG5, NS3, DMG5 and NS4 all are open, none of the other next relays can be energized. Consequently, the cam 87L rotates until it closes the switch YL to complete an energizing circuit for the next relay NL. The effect of such selection will be clear from the foregoing discussion.

It should be noted further that the energization of the lower terminal relay LT is accompanied by opening of the break contacts LT8 (Fig. 4). The circuit controlled by the contacts LT8 for registering a parking call is effective only if the elevator car A is displaced from the lower terminal floor.

It will be recalled that after the arrival of the elevator car A at the lower-terminal floor, the timing relay MGT started to time out. Upon expiration of its time delay, this relay drops out to open its contacts in the control circuits for the motor-generator starting switches. Thus the make contacts MGT1 are open. Since the break contacts 78—4 of the no-call relay also are open, the relay MG drops out to deenergize the motor-generator set for the elevator car A.

The drop out of the motor-generator starting switch MG is accompanied by opening of the contacts MG1, MG2 and MG3 (Fig. 3) to shut down the motor-generator set for the elevator car A. In addition, make contacts MG4 open to disconnect certain circuits from the bus L1. Make contacts MG5, MG6, MG7 (Fig. 8) all open. Since the last-mentioned contacts deenergize the transfer relay NS, this relay recloses its contacts NS1, NS2, NS3 and NS4. Consequently, even though the make contacts MG5 are open, the next relay NL is energized through the break contacts NS1. The contacts MG7 preferably are designed to open before the contacts MG5 sufficiently to assure continuous energization of the next relay NL during this sequence.

A registered down-floor call or a registered up-floor call is also effective for starting an elevator car from the lower-terminal floor. For example, let it be assumed that an up-floor call is registered for the fifth floor by operation of the push button 5U (Fig. 4). Such operation connects the corridor-call-registering relay 5UR for energization and this relay closes its make contacts 5UR1 to establish a holding circuit around the push button 5U. In addition, the corridor-call-registering relay opens its break contacts 5UR2 (Fig. 5) in the circuit 81 and it opens similar contacts in similar circuits of the remaining elevator cars. Consequently, as a result of the registered corridor call, the no-call relay 78 for the elevator car A and the corresponding no-call relays for the remaining cars all are deenergized. Assuming that the elevator car A has been selected as the next car to leave the lower terminal floor in the up direction, the deenergization of the no-call relay 78 operates in the manner previously discussed to initiate the dispatch of the elevator car A from the lower-terminal floor.

As the elevator car A approaches the fifth floor, the brush *fc* (Fig. 4) engages the contact segment *f*5 to complete the following circuit:

L1, 5UR1, *f*5, *fc*, W5, DP3, S, LMS2, L2

As a result of its energization, the corridor-call stopping relay S closes its make contacts S1 (Fig. 3) to complete energizing circuits for the holding relay G, the inductor slowdown relay E, and the inductor stopping relay F. These cooperate in the manner previously discussed to initiate a stopping operation of the elevator car at the fifth floor.

Inasmuch as the break contacts 5UR2 (Fig. 5) are located between the contact segment *m*5 and L1, the high-call relay 78U remains deenergized when the brush *mc* engages the contact *m*5. Consequently, the elevator car A is not conditioned to reverse at the fifth floor.

Since the elevator car is not conditioned to reverse, the make contacts W11 (Fig. 5) of the up-direction relay W remain closed and when the break contacts M7 of the running relay M close, the following circuit is completed:

L1, M7, W11, *uc*, *u*5, 5UL, L2

The illuminated up lantern indicates to the waiting passenger that the elevator car A will proceed in the up direction from the fifth floor. The waiting passenger then may enter the elevator car and operate a car-call push button for a higher floor.

When the noninterference relay 70T (Fig. 3) times out, the reclosure of the break contacts 70T1 completes an energizing circuit for the up switch U and the running relay M. These cooperate in the manner previously discussed to initiate movement of the elevator car in the up direction. It will be recalled that such movement is accompanied by opening of the break contacts M7 (Fig. 5) which extinguishes the up lantern 5UL.

As the elevator car A approaches the sixth floor, the brush *fc* (Fig. 4) engages the contact segment *f6* to complete with the contacts DP3 and LMS2 an energizing circuit for the corridor-call stopping relay S. This relay initiates a stopping operation of the elevator car at the sixth floor by a sequence which will be clear from the preceding discussion of the stopping of the elevator car at the fifth floor. Each stopping operation of the elevator car is accompanied by closure of the contacts G2 and M12 (Fig. 7) to initiate a stepping operation of the stepping switch SS. The purpose of the stepping switch SS previously has been set forth.

As the elevator car A reaches the sixth floor, the brush *yc* (Fig. 7) engages the contact segment *y6* to complete an energizing circuit for the upper-terminal relay TT. This relay opens its break contacts TT1 and TT2 (Fig. 3) without immediately affecting the operation of the system. If the switch 77 is in the position illustrated in Fig. 5 and if the high-call reversal relay HCM is deenergized, the relay cannot be energized for the reason that the break contacts TT3 are now open.

Opening of the break contacts TT4 and closure of the make contacts TT5 (Fig. 6) modifies the control circuits for the door-control relay R in the manner previously discussed.

Referring to Fig. 7, it will be noted that closure of the make contacts TT6 completes the following circuit:

L1, TT6, RCT, NT3, BNT3, CNT3, DNT3, L2

As a result of the energization of the clutch RCT, the cam 87T rotates until it closes the switch YT to complete the following circuit:

L1, TT7, NT, ST5, YT, LT

The upper-terminal next relay NT closes its make contacts NT1 (Fig. 5) to illuminate the down floor lantern 6DL for the sixth floor. The relay also opens its break contacts NT2 (Fig. 6) to modify the door-control relay circuits in the manner previously described.

As shown in Fig. 7, opening of the break contacts NT3 results in deenergization of the clutch RCT. Closure of the make contacts NT4 controls in part the energizing circuit for the upper-terminal start relay ST. Closure of the make contacts NT5 illuminates the lamp 92T. Furthermore, if a car call is registered while the contacts NT5 are closed, the break contacts H3 of the car-call detecting relay close to complete an energizing circuit for the sign 94T which indicates that the elevator car A will start soon.

It is assumed that the cam 89T is rotating to close the switch 91T. When the switch 91T is closed, the upper-interval-holding relay 1SD is energized through the circuit:

L1, LSD, 91T, HCM5, ST4, BST4, CST4, DST4

Closure of the make contacts 1SD1 (Fig. 5) and opening of the break contacts 1SD2 (Fig. 7) have no immediate effect on the operation of the system. Opening of the break contacts 1SD3 interrupts the energizing circuit for the clutch SCT and allows the cam 89T to reset. Closure of the make contacts 1SD4 completes an energizing circuit for the start relay ST, as follows:

L1, TT7, ST, NT4, 1SD4, L2

By reference to Fig. 6, it will be noted that the start relay closes its make contacts ST2 to initiate the closing of the elevator car door by a sequence which will be clear from the preceding discussion of door operation. The start relay ST, when energized, closes its make contacts ST1 (Fig. 3). It will be understood that when the elevator car reached the upper-terminal floor, the limit switch 66 opened to deenergize the up-direction relay W and the down-direction switch X consequently was energized to prepare the elevator car for operation in the down direction. For this reason closure of the make contacts ST1 completes the following circuit:

L1, MG4, L3, TT1, ST1, X1, F2, 64, D, M, Z1, L2

The down switch D and the running relay M cooperate in the manner previously described to start the elevator car in the down direction.

Opening of the break contacts ST4 of the upper start relay ST prevents energization therethrough of the upper-interval-holding relay 1SD. Opening of make contacts ST5 deenergizes the next relay NT. Finally, closure of the make contacts ST6 completes a holding circuit for the start relay ST around the contacts NT4 and 1SD4.

Since it is now deenergized, the upper-terminal next relay NT opens its make contacts NT1 (Fig. 5) to deenergize the lantern 6DL. In addition, break contacts NT2 ( Fig. 6) close without immediately affecting the operation of the system. Break contacts NT3 (Fig. 7) close to permit selection of another elevator car to leave the upper-terminal floor, and make contacts NT4 close without affecting immediate operation of the system. Opening of the make contacts NT5 opens the energizing circuit for the lamp 92T and the sign 94T if the latter is energized.

As the elevator car A leaves the upper-terminal floor, the brush *yc* leaves the contact segment *y6* to deenergize the upper-terminal relay TT.

This relay opens its make contacts TT1 and closes its break contacts TT2 (Fig. 3) without immediately affecting the operation of the system. Closure of the break contacts TT3 (Fig. 5) has no immediate effect on the operation of the system. In Fig. 6, closure of the break contacts TT4 and opening of the make contacts TT5 have no immediate effect on the operation of the system.

Opening of the make contacts TT6 in Fig. 7 interrupts the energizing circuit for the clutch RCT. Opening of the make contacts TT7 interrupts the energizing circuit for the upper-terminal start relay ST. This relay opens its make contacts ST1 (Fig. 3) and opens its make contacts ST2 (Fig. 6) without immediately affecting the operation of the system.

In Fig. 7, closure of the break contacts ST4 completes an energizing circuit for the clutch SCT and the cam 89T, therefore, starts to rotate for the purpose of measuring a dispatching interval. Closure of the break contacts ST5 and opening of the make contacts ST6 have no immediate effect on the operation of the system.

The return of the down-traveling elevator car A to the lower-terminal floor will be understood from the foregoing discussion.

Let it be assumed next that with all of the elevator cars at the lower-terminal floor and the elevator car A selected as the next elevator car to leave the lower-terminal floor, a down floor call is registered by operation of the push button 4D for the fourth floor (Fig. 4) to connect the corridor-call registering relay 4DR for energization. The relay 4DR closes its make contacts 4DR1 to establish a holding circuit around the push button 4D. In addition, the down-corridor call registering relay opens its break contacts 4DR2 in the call circuit 81 and similar break contacts in the corresponding circuits associated with the remaining elevator cars. As a result of the opening of such contacts, the no-call relay 78 for the elevator car A and similar relays for the remaining elevator cars are deenergized. Opening of the break contacts 4DR4 has no immediate effect on the operation of the system.

In Fig. 6, closure of make contacts 4DR5 partially energizes the down-corridor-call quota relay Q but such energization is insufficient to cause pick up of the relay Q.

Inasmuch as the no-call relay 78 is deenergized, it operates in the manner previously discussed to initiate starting of the elevator car A. The movement of the elevator car A to the fourth floor and the return of the elevator car A to the lower terminal floor will be understood from the foregoing discussion.

As the elevator car A proceeds in the up direction, it will be understood that the elevator car stops at each floor approached by the elevator car for which a call is registered either by the associated car-call registering relay or by the associated up-corridor-call registering relay. In a similar manner, during the down travel of the elevator car, the elevator car stops as it approaches each of the floors for which a call is registered by the associated car-call registering relay or the associated down-corridor-call registering relay. However, if an elevator car is fully loaded, contacts LMS2 (Fig. 4) are open to prevent stopping of the elevator car in response to a corridor-call registering relay. It will be recalled that the contacts LMS2 are open when the elevator car A is fully loaded.

*Operation II*

For the next operation, it will be assumed that the elevator car A has started in response to a registered car-call and that the elevator car B has been selected as the next elevator car to leave the lower terminal floor in the manner set forth under Operation I. At this stage, it will be assumed that a passenger enters the elevator car B and registers a car call for the sixth floor. Shortly thereafter a sufficient number of passengers enter the elevator car B to load the elevator car to its rated capacity.

In response to the capacity loading of the elevator car B, the switches BLMS1, (Fig. 1), BLMS4, BLMS5, BLMS6 and BLMS7 are operated to their closed positions and the switches BLMS2 and BLMS3 are operated to their open positions. The opening of the break contacts BLMS2 (Fig. 4) prevents energization of the corridor-call stopping relay BS and the elevator car B consequently cannot answer registered corridor calls. The opening of the break contacts BLMS3 has no immediate effect on the operation of the system.

The closure of the make contacts BLMS1 (Fig. 5) has no immediate effect on the operation of the system. By reference to Fig. 5, it will be noted that closure of the make contacts BLMS5 connects the brush B*mc* through the contacts BW9 to the bus L2. This assigns the elevator car B to reverse at the furthest floor in the up direction for which a call is registered which may be answered by the elevator car B. The operation of the circuit B81 will be understood from the earlier discussion of the operation of the circuit 81 for the elevator car A.

The closure of the contacts BLMS4 (Fig. 5) results in energization of the load relay BLW. This relay closes its contacts BLW2 to complete with the contacts BW8 a holding circuit for the relay BLW. The relay also opens its break contacts BLW5 (Fig. 6). Under the assumed conditions, closing of the make contacts BLMS6 and opening of the break contacts BLW5 in Fig. 6 have no immediate effect on the operation of the system.

Referring next to Fig. 8, it should be noted that if the elevator car B were only partially loaded, the elevator car would remain at the lower-terminal floor until the make contacts 1SU3 closed to complete an energizing circuit for the start relay BSL. However, it will be assumed that the elevator car B is fully loaded before the make contacts 1SU3 close. Under these circumstances, the make contacts BLMS7 close to complete an energizing circuit for the lower-terminal start relay BSL. The start relay BSL operates to start the elevator car from the lower terminal floor by a sequence which will be clear from the earlier discussion of the operation of the start relay SL for the elevator car A.

As the elevator car B leaves the lower-terminal floor, the dispatcher for the lower-terminal floor operates to select one of the remaining elevator cars as the next elevator car to leave the terminal floor. The operation of the dispatcher for this purpose will be clear from the earlier discussion of its operation following the departure of the elevator car A and it will be assumed that the lower-terminal next relay DNL is energized to select the elevator car D as the next elevator car to leave the lower-terminal floor.

In order to start the elevator car B from the lower-terminal floor, it is necessary to start the motor-generator set for such elevator car. Such starting is effected by closure of the contacts BSL7 (not shown) for the elevator car B. Although these contacts are not shown, their operation will be understood by consideration of the operation of the corresponding contacts SL7 for the elevator car A. When the contacts SL7 close, an energizing circuit for the motor-generator starting switch MG is completed. A circuit is similarly completed for the motor-generator starting switch for the elevator car B as a result of the pickup of the start relay BSL.

As the elevator car B leaves the lower terminal floor, the brush B*kc* (Fig. 5) engages the contact segment B*k*1 to complete the following circuit:

L1, BLMS1, B*k*1, B*kc*, BW7, BY, 80, L2

It will be understood that the cam 80C is continuously rotating but at the instant here considered, the switch 80 is assumed to be in its closed position.

The energization of the auxiliary load relay BY results in closure of the make contacts BY1 to establish a holding circuit around the contacts BLMS1 and BW7, the contact segment B*k*1 and the brush B*kc*. Consequently, the relay BY remains energized until the cam 80C rotates to open the switch 80.

Energization of the auxiliary load relay BY also results in closure of the make contacts BY2 to complete an energizing circuit for the loaded-car quota relay QL (Fig. 6). However, such energization is insufficient to cause pick up of the relay QL.

Upon expiration of the interval provided by the cam 80C, the switch 80 is opened to deenergize the auxiliary load relay BY which reopens its contacts BY1 (Fig. 5) and its contacts BY2 (Fig. 6). It will be understood that as the elevator car B approaches the second floor, the brush B*kc* leaves the contact segment B*k*1 (Fig. 5).

The elevator car A operates in the manner discussed under Operation I and ultimately returns to the lower-terminal floor. The elevator car B also operates in the manner which will be understood from the earlier discussion of the operation of the elevator car A before returning to the lower-terminal floor.

*Operation III*

For the next operation, it will be assumed that the elevator cars A and B leave the lower terminal floor in the manner discussed under Operation II. However, immediately after selection of the elevator car D as the next elevator car to leave the lower terminal floor, this elevator car is fully loaded. The elevator car D is promptly started from the lower terminal floor by a sequence which will be understood from a discussion of the loaded elevator car B under Operation II. It will be understood that as the elevator car D leaves the lower terminal floor, the auxiliary load relay DY (Fig. 5) is energized and closes its make contacts DY2 (Fig. 6) to energize the loaded-car quota relay QL through the resistors RE5 and RE7 in parallel. It will be assumed that this energization is sufficient to pick up the loaded-car quota relay QL. The pickups of the relays BY and DY are assumed to take place while the switch 80 is closed.

As a result of its energization, the loaded-car quota relay QL closes its make contacts QL1 (Fig. 5). It will be assumed that the switch 77 is in its lower position. As a result, closure of the make contacts QL1 completes with the closed switch 77 an energizing circuit for the high-call reversing relay HCM. If desired, both of the circuits associated with the switch 77 may be employed in controlling the energization of the high-call reversal relay. However, for present purposes, it will be assumed that the circuits may be selected as desired by operation of the switch 77.

As a result of its energization, the high-call reversal relay HCM closes its make contacts HCM1 without affecting the operation of the system. In addition, the make contacts HCM2 close. It will be assumed that the switch 79 also is closed and that the closure of the make contacts HCM2 completes with the switch 79 a holding circuit for the high-call reversal relay HCM which remains intact until the switch 79 is opened by its cam 79C. It will be recalled that the switch 79 is periodically opened by rotation of the cam 79C.

The energization of the high-call reversal relay HCM results in closure of the make contacts HCM4 which is associated with the high-call relay 78U and the closure of similar contacts associated with the corresponding high-call relays for the remaining elevator cars. Consequently, as long as the high-call reversal relay HCM is energized, each of the elevator cars in the entire system is conditioned to reverse when traveling in the up direction at the highest floor for which a call is registered which may be answered by such elevator car. A typical operation for the high-call relay 78U has been discussed above.

The occurrence of a condition wherein two loaded elevator cars leave the lower terminal floor in rapid succession in the up direction indicates the presence of a heavy demand for travel in the up direction from the lower terminal floor or an up peak. Under these circumstances, the entire system provides a high-call reversal operation which expedites the return of the elevator cars to the lower terminal floor for the purpose of improving service in the up direction from the lower terminal floor.

Upon the expiration of the interval provided by the motor 79M, the switch 79 opens to interrupt the holding circuit for the high-call reversal HCM. However, if the make contacts QL1 are still closed, the high-call reversal relay remains energized and upon reclosure of the switch 79, the high-call reversal HCM remains energized for at least one more interval provided by the motor 79M. During this additional interval, rotation of the cam 80C opens the switch 80 to deenergize the auxiliary load relays BY and DY and these relays open their holding contacts, such as the contacts BY1 for the relay BY. The switch 80 opens shortly after the opening of the switch 79. In addition, the relays open their contacts BY2 and DY2 (Fig. 6) to deenergize the loaded-car quota relay QL. This relay opens its make contacts QL1 (Fig. 5) without affecting the operation of the system.

If two more loaded elevator cars leave the lower terminal floor in the up direction before the switch 79 reopens, the make contacts QL1 reclose to maintain the energization of the high-call reversal relay HCM. However, if two loaded elevator cars do not leave the lower terminal floor during such interval, the make contacts QL1 remain open and upon opening of the switch 79, the high-call reversal relay 79 is deenergized.

When deenergized, the high-call reversal relay HCM opens its holding contacts HCM1 and HCM2. In addition, this relay opens its make contacts HCM4 associated with the circuit 81 and similar contacts associated with corresponding circuits for the remaining elevator cars. The elevator cars A, B and D ultimately return to the lower terminal floor by a sequence which will be understood from the foregoing discussion of the operation of the elevator cars A and B.

*Operation IV*

For the next operation, it will be assumed that the elevator system receives a heavy demand for elevator service in the down direction. Immediately prior to the occurrence of this heavy demand, it will be assumed that all of the elevator cars are in operation and that they are being dispatched from the upper and lower terminal floors by the dispatchers for such floors.

At the instant under consideration, it will be assumed that the elevator car A is set for travel in the down direction and that it has stopped at the fifth floor and received a capacity load. Under such circumstances, the switch LMS2 (Fig. 4) opens to prevent response of the elevator car to registered corridor calls. In addition, the switch LMS3 (Fig. 6) is closed but has no immediate effect on the operation of the system.

Closure of the contacts LMS4 (Fig. 5) energizes the load relay LW which closes its make contacts LW2 without immediate effect on the system. The relay LW also opens its break contacts LW5 (Fig. 6).

Closure of contacts LMS5 has no immediate effect on the system.

By reference to Fig. 6, it will be noted that the make contacts LMS6 and the make contacts X9 of the down-direction relay are closed. It will be assumed that down floor calls are registered for the second, third and fourth floors. As the result of such registration, the make contacts 2DR4, 3DR5, and 4DR5 are closed to energize the down-corridor-call quota relay Q through the resistors 2RE, 3RE and 4RE in parallel. It will be assumed that such energization is sufficient to pick up the relay Q. This relay closes its make contacts Q1 without immediate effect on the operation of the system. Closure of the make contacts Q2 partially completes an energizing circuit for the down-peak relay DP.

At the same time, it will be assumed that the rate at which counted stops are being made by the elevator cars of the system is insufficient to open the break contacts HT1.

If the switch 90 is closed, the following energizing circuit for the down-peak relay is now completed:

L1, LMS6, X9, Q2, DP, HT1, 90, L2

However, if the switch is opened, certain additional requirements must be met before the down-peak relay can be energized.

Assuming that the switch 90 is open, it will be noted that the break contacts LW5 of the load relay LW are open. However, since the elevator car A is traveling in the down direction, the make contacts X10 are closed. Consequently, the condition of the elevator car A still permits energization of the down-peak relay DP.

Turning next to the elevator car B, if the elevator car B is traveling in the down direction, the make contacts BX10 will be closed and the elevator car B permits energization of the down-peak relay DP.

If the elevator car C is traveling in the up direction, the contacts CX10 are open. If the elevator car C were loaded to the extent that cam-operated contacts CLMS4 were closed, the break contacts CLW5 would be opened. (Contacts CLMS4 and relay CLW are not illustrated for the elevator car C but they correspond to the contacts LMS4 and the relay LW for the car A). Under these circumstances, if the switch 90 were open, the down-peak relay DP could not be energized. Similar comments apply to the contacts DX10 and DLW5 for the elevator car D.

For present purposes, it will be assumed that the conditions are such that the down-peak relay DP is energized. As a result of its energization, the down-peak relay DP closes its make contacts DP10 and DP11 to complete with certain other contacts a holding circuit for itself.

The down-peak relay DP opens its break contacts DP1 (Fig. 4) to prevent energization of the car-call stopping relay T during up travel of the elevator car A if the associated switch 71 is open. If the switch 71 is closed, the opening of the contacts DP1 has no effect on the operation of the system. By preventing the elevator cars from responding to car calls in the up direction, service in the down direction may be expedited. It will be understood that similar contacts such as the contacts DP2 for the elevator car B may control the energization of the car-call stopping relays during up travel of the remaining elevator cars. The opening of the contacts DP3 prevents the elevator car A, which is assigned for low-zone operation, from responding to registered up corridor calls. This again expedites service available from the elevator cars in the down direction.

It will be noted that similar contacts DP4 are illustrated for the elevator car B. By closing the switch 74, the contacts DP4 may be shunted and rendered ineffective for modifying the operation of the elevator car B.

If the switch 75 is closed, the closure of the make contacts DP5 of the down-peak relay DP connects the signs 76 for energization from the buses. These signs indicate that one or more of the elevator cars is incapable of providing up service.

By reference to Fig. 5, it will be noted that closure of the make contacts DP6 renders effective the circuit 82. Consequently, assuming the contacts remain closed during the next up trip of the elevator car A, the elevator car will stop and reverse at the highest floor in the low zone for which a down floor call is registered and will not travel above the low zone. For example, with down floor calls registered at the second, third and fourth floors, the break contacts 4DR4 and 3DR4 of the down-corridor call registering relays for the third and fourth floors will be open and the low-zone high-call relay 78P will remain deenergized until the brush *nc* engages the contact segment *n*4. At this time, the relay 78P picks up and closes its make contacts 78P1 (Fig. 3) to complete an energizing circuit for the holding relay G, the inductor slowdown relay E and the inductor stopping relay F. The inductor relays stop the car at the fourth floor by a sequence which will be clear from the preceding discussion.

In addition, the break contacts 78P2 open. Consequently, as the elevator car stops at the fourth floor, the contacts M2 open to deenergize the up-direction relay W. Since the up-direction relay W is deenergized, it closes its contacts W2 to complete an energizing circuit for the down-direction relay and the elevator car A now is set for down travel. During its down trip, the elevator car A would stop for the registered down floor calls at the fourth, third and second floors.

Turning again to Fig. 5, it will be noted that the down-peak relay opens break contacts DP7 and similar contacts associated with the remaining elevator cars. If the elevator car A is to accept no passengers for up travel from the lower terminal floor, the switch 83 may be opened. Under these circumstances, when the break contacts DP7 open, the up lantern 1UL cannot be illuminated for the duration of the down peak, and the extinguished lantern discourages passengers from entering the car A at the lower terminal floor.

It will be noted that if switch 101 associated with the elevator car B is closed, the closure of make contacts DP9 shunts the make contacts BNL1 of the lower-terminal next relay for the elevator car B. If the switch B83 also is closed, it follows that the floor lantern B1UL is illuminated for the duration of the down peak. Such illumination may be desirable if the elevator car B is the only elevator car assigned to carry passengers up from the lower-terminal floor during the existence of the down peak.

Let it be assumed that following the energization of the down-peak relay DP, the loaded elevator car A continues toward the lower-terminal floor without stopping for corridor calls. The elevator car A may, under such circumstances, answer car calls which are registered by passengers within the elevator car. During the movement of the elevator car, part of the passengers may be discharged at an intermediate floor. Under such circumstances, the switch LMS2 (Fig. 4) would close to permit the elevator car A to answer down-corridor calls. Since the make contacts LMS6 are shunted by the contacts Q1 and DP10, the down-peak relay DP may remain energized under such circumstances. However, it will be assumed that the elevator car A proceeds to the lower-terminal floor without substantial discharge of passengers.

It will be assumed that as the elevator car B moves in the down direction, it answers the registered corridor calls for the third and second floors. As a result of such operation of the elevator car B, the make contacts 3DR5 and 2DR4 of the down-corridor call-registering relays for the third and second floors open, and the down-corridor-call quota relay Q remains energized only through the resistor 4RE. It will be assumed that such energization is insufficient to maintain the relay Q picked up and this relay thereupon drops out to open its make contacts Q1 and Q2. Inasmuch as the elevator car A has discharged its passengers at the lower-terminal floor, contacts LMS6 and X9 are open, and the opening of the contacts Q1, LMS6 and X9 deenergizes the down-peak relay DP.

It should be noted further that had the traffic on the system become heavy enough to operate the heavy-traffic relay HT, this relay would have opened its break contacts HT1 to interrupt the energizing circuit for the relay DP. In a preferred operation, the switches 150 (Fig. 7) are open and the heavy-traffic relay HT responds to the rate at which stops are made by up-traveling elevator cars.

Furthermore, if the switch 90 had been open during the down-peak operation and if any of the elevator cars set for travel in the up direction had been loaded sufficiently to cause its relay LW, BLW, CLW or DLW to pick up, the down-peak relay again would have been deenergized. For example, if the elevator car C were set for up travel, the make contact CX10 would be open and if the car were loaded to a predetermined value, the break contact CLW5 would be open to deenergize the down-peak relay DP.

When the down-peak relay DP is deenergized, it closes its break contacts DP1, DP2, DP3, and DP4 (Fig. 4) to permit the cars to respond to all registered calls. In addition, the make contacts DP5 open to deenergize the signs 76.

The down-peak relay also opens its make contacts DP6 to render ineffective the circuit 82. Break contacts DP7 and DP8 close and make contacts DP9 close to put all lanterns for the up floor under the control of their associated lower-terminal next relays. Opening of the make contacts DP10 and DP11 (Fig. 6) has no effect on the immediate operation of the system.

In a preferred system, the down-peak relay may be arranged to maintain the system on down-peak operation for a predetermined time after the conditions which place the bank of elevator cars on down-peak operation no longer exist. For example, the down-peak relay DP may have a time-delay in drop-out sufficient to provide such predetermined time.

Certain subject matter herein disclosed is disclosed in the Santini et al. patent application Serial No. 342,821 filed concurrently herewith.

Although the invention has been described with reference to certain specific embodiments thereof, numerous modifications falling within the spirit and scope of the invention are possible.

We claim as our invention:

1. In an elevator system for a structure having a plurality of floors, a plurality of elevator cars, means mounting the elevator cars for movement relative to the structure, motive means operable for moving each of the elevator cars, control means having a plurality of modes of operation for controlling operation of said elevator cars, and transfer means responsive to the demand for elevator service for selecting the one of said modes of operation best suited for each demand for elevator service, said control means when conditioned for a first one of said modes of operation cooperating with the motive means to park said elevator cars at stations in response to termination of demand for elevator service and to condition a first one of said elevator cars to move in response to occurrence of a demand for elevator service, said control means when conditioned for a second one of said modes of operation cooperating with the motive means to start all of said elevator cars from predetermined stations in accordance with a predetermined plan, said control means when conditioned for a third one of said modes of operation cooperating with the motive means to assign certain of said elevator cars to provide preferential service for certain of said floors.

2. In an elevator system for a structure having a plurality of floors, a plurality of elevator cars, means mounting the elevator cars for movement relative to the structure, motive means operable for moving each of the elevator cars, control means having a plurality of modes of operation for controlling operation of said elevator cars, and transfer means responsive to the demand for elevator service for selecting the one of said modes of operation best suited for each demand for elevator service, said control means when conditioned for a first one of said modes of operation cooperating with the motive means to park said elevator cars at stations in response to termination of demand for elevator service and to condition a first one of said elevator cars to move in response to occurrence of a demand for elevator service, said control means when conditioned for a second one of said modes of operation cooperating with the motive means to start all of said elevator cars from predetermined stations in accordance with a predetermined plan, said control means when conditioned for a third one of said modes of operation cooperating with the motive means to assign certain of said elevator cars to provide service in only one predetermined direction of travel from at least certain of said floors.

3. In an elevator system for a structure having a plurality of floors including a first terminal floor, a second terminal floor, and a plurality of intermediate floors located between the terminal floors, a plurality of elevator cars, door means for each of the elevator cars, door-operating means for each of the elevator cars, means mounting the elevator cars for movement relative to the structure to serve said floors, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising call means operable for registering calls for the floors at which one of the elevator cars is desired to stop, dispatching means for successively selecting cars to be dispatched from the first terminal floor, said dispatching means cooperating with the door-operating means for maintaining open the door means of each selected elevator car for a time, means responsive to absence of a call registered by said call means for parking said elevator cars at the first terminal floor with the source of power in nonoperating condition, one of said parked elevator cars being selected as the first selected car to leave the terminal floor, means responsive to call registration by the call means requiring travel of an elevator car towards the second terminal floor for placing the source of power of the selected one of the elevator cars in operating condition and initiating movement of the selected elevator car away from the first terminal floor in a direction for serving said call registration, and means responsive to arrival of one of the elevator cars at the first terminal floor before the source for a subsequently selected elevator car has been placed in operating condition for cancelling the selection of the subsequently selected elevator car and transferring the selection to the arriving elevator car.

4. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising call means operable for registering calls for the floors at which one of the elevator cars is desired to stop, dispatching means for successively selecting cars to be dispatched from the first terminal floor, means responsive to absence of a call registered by said call means for parking said elevator cars at parking stations with the sources of power in nonoperating condition, one of said parked elevator cars being selected as the first selected car to leave a parking station, means responsive to call registration by the call means requiring travel of an elevator car from its parking station for placing the source of power of the selected one of the elevator cars in operating condition and initiating movement of the selected elevator car away from its parking station in a direction for serving said call registration, and means responsive to the load in an elevator car which has been selected as the next car to leave a parking station for expediting the departure of such selected elevator car.

5. In an elevator system for a structure having a plurality of floors including a first terminal floor, a second terminal floor, a plurality of intermediate floors located between the terminal floors, a plurality of elevator cars, means mounting the elevator cars for movement relative to the structure to serve said floors, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising call means operable for registering calls for the floors at which one of the elevator cars is desired to stop, dispatching means for successively selecting cars to be dispatched from the first terminal floor, means responsive to absence of a call registered by said call means for parking said elevator cars at parking stations with the sources of power in nonoperating condition, one of said parked elevator cars being selected as the first car to leave a parking station, means responsive to call registration by the call means required travel of an elevator car from its parking station for placing the source of power of the selected one of the elevator cars in operating condition and initiating movement of the selected elevator car away from its parking station in a direction for serving said call registration, and means responsive to the loading of each of the elevator cars at its parking station for assigning a loaded one of the elevator cars to stop and reverse at the farthest floor in the first direction for which a call is registered by the call means which may be answered by such loaded elevator car.

6. In an elevator system for a structure having a plurality of floors including a first terminal floor, a second terminal floor, and a plurality of intermediate floors located between the terminal floors, a plurality of elevator cars, door means for each of the elevator cars, door-operating means for each of the elevator cars, means mounting the elevator cars for movement relative to the structure to serve said floors, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising call means operable for registering calls for the floors at which one of the elevator cars is desired to stop, dispatching means for successively selecting cars to be dispatched from the first terminal floor, said dispatching means cooperating with the door operating means for maintaining open the door means of each selected elevator car for a time, means responsive to absence of a call registered by said call means for parking said elevator cars at parking stations with the sources of power in nonoperatiing condition, one of said parked elevator cars being selected as the first selected car to leave a parking station, means responsive to call registration by the call means requiring travel of an elevator car away from a parking station for placing the source of power of the selected one of the elevator cars in operating condition and initiating movement of the selected elevator car away from its parking station in a direction for serving said call registration, said dispatching means being effective if one of the elevator cars is away from its parking station and if a demand for elevator service is registered by the call means at a time subsequent to the minimum time the dispatching means normally retains open the door means of a subsequently selected elevator car for starting the subsequently selected elevator car to assist in answering the demand for elevator service, and expediting means responsive to the service demand of traffic seeking to travel from the first terminal floor in the first direction for expediting the return of the elevator cars leaving the first terminal floor to the first terminal floor.

7. In an elevator system for a structure having a plurality of floors including a first terminal floor, a second terminal floor, and a plurality of intermediate floors located between the terminal floors, a plurality of elevator cars, door means for each of the elevator cars, door-operating means for each of the elevator cars, means mounting the elevator cars for movement relative to the structure to serve said floors, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising call means operable for registering calls for the floors at which one of the elevator cars is desired to stop, dispatching means for successively selecting cars to be dispatched from the first terminal floor, said dispatching means cooperating with the door-operating means for maintaining open the door means of each selected elevator car for at least a minimum time, means responsive to absence of a call registered by said call means for parking said elevator cars at parking stations with the sources of power in nonoperating condition, one of said parked elevator cars being selected as the first selected car to leave a parking station, means responsive to call registration by the call means requiring travel of an elevator car away from a parking station for placing the source of power of the selected one of the elevator cars in operating condition and initiating movement of the selected elevator car away from its parking station in a direction for serving said call registration, said dispatching means being effective if one of the elevator cars is away from its parking station and if a demand for elevator service is registered by the call means at a time subsequent to the minimum time the dispatching means normally retains open the door means of a subsequently selected elevator car for starting the subsequently selected elevator car to assist in answering the demand for elevator service, expediting means responsive to the service demand of traffic seeking to travel from the first terminal floor in the first direction for expediting the return of the elevator cars leaving the first terminal floor to the first terminal floor, and auxiliary means responsive to operation of the expediting means for expediting departure from the second terminal floor of the elevator cars.

8. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising call means operable for registering calls for the floors at which one of the elevator cars is desired to stop, dispatching means for successively selecting cars to be dispatched from the first terminal floor, means responsive to absence of a call registered by said call means for parking said elevator cars at parking stations with the sources of power in nonoperating condition, one of said parked elevator cars being selected as the first selected car to leave a parking station, means responsive to call registration by the call means requiring travel of an elevator car from a parking station for placing the source of power of the selected one of the elevator cars in operating condition and initiating movement of the selected elevator car away from its parking station in a direction for serving said call registration, and zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors.

9. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising call means operable for registering calls for the floors at which one of the elevator cars is desired to stop, dispatching means for successively selecting cars to be dispatched from the first terminal floor, means responsive to absence of a call registered by said call means for parking said elevator cars at parking stations with the sources of power in nonoperating condition, one of said parked elevator cars being selected as the first selected car to leave a parking station, means responsive to call registration by the call means requiring travel of an elevator car away from its parking station for placing the source of power of the selected one of the elevator cars in operating condition and initiating movement of the selected elevator car away from its parking station in a direction for serving said call registration, and zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors, said zoning means operating to discourage loading of said certain of the elevator cars at the first terminal floor.

10. In an elevator system for a structure having a plurality of floors including a first terminal floor, a second terminal floor, and a plurality of intermediate floors located between the terminal floors, a plurality of elevator cars, door means for each of the elevator cars, door-operating means for each of the elevator cars, means mounting the elevator cars for movement relative to the structure to serve said floors, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising call means operable for registering calls for the floors at which one of the elevator cars is desired to stop, dispatching means for successively selecting cars to be dispatched from parking stations, said dispatching means cooperating with the door-operating means for maintaining open the door means of each selected elevator car for at least a minimum time, means responsive to absence of a call registered by said call means for parking said elevator cars at parking stations with the sources of power in nonoperating condition, one of said parked elevator cars being selected as the first selected car to leave a parking station, means responsive to call registration by the call means requiring travel of an elevator car from a parking station for placing the source of power of the selected one of the elevator cars in operating condition and initiating movement of the selected elevator car away from its parking station in a direction for serving said call registration, said dispatching means being effective if one of the elevator cars is away from its parking station and if a predetermined demand for elevator service is registered by the call means at a time subsequent to the minimum time the dispatching means normally retains open the door means of a subsequently selected elevator car for starting the subsequently selected elevator car to assist in answering the demand for elevator service, and zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors.

11. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third call-registering means for each of the elevator cars operable for registering a call for each of the floors desired for the load within the associated elevator car, means responsive to a stopping operation of each of the elevator cars at any of the intermediate floors for controlling the door-operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with at least a plurality of the cars at the first terminal floor, one of said parked elevator cars being selected as the first selected car to leave the first terminal floor, and terminal door-control means responsive to arrival of each of the elevator cars at one of the terminal floors from the intermediate floors with a load to be discharged at such terminal floor for controlling the door operating means to open the door means of the associated elevator car and subsequently to reclose such door means, said terminal door control means being ineffective upon arrival of any one of the elevator cars at one of the terminal floors from the intermediate floors with no load to be discharged for opening the door means of the arriving elevator car unless the arriving elevator car is selected to leave such terminal floor.

12. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third call-registering means for each of the elevator cars operable for registering a call for each of the floors desired for the load within the associated elevator car, means responsive to a stopping operation of each of the elevator cars at any of the intermediate floors for controlling the door-operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at the first terminal floor with the sources of power in nonoperating condition, one of said elevator cars being selected as the first selected car to leave the terminal floor, means responsive to call registration by the call means requiring travel of an elevator car towards the second terminal floor for placing the source of power of the selected one of the elevator cars in operating condition and initiating movement of the selected elevator car away from the first terminal floor in a direction for serving said call registration, and means responsive to arrival of one of the elevator cars at the first terminal floor before the source for a subsequently selected elevator car has been placed in operating condition for cancelling the selection of the subsequently-selected elevator car and transferring the selection to the arriving elevator car.

13. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third call-registering means for each of the elevator cars operable for registering a call for each of the floors desired for the load within the associated elevator car, means responsive to a stopping operation of each of the elevator cars at any of the intermediate floors for controlling the door operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said parked elevator cars being selected as the first selected parked car to leave a parking station, means responsive to call registration by the call means while all of the elevator cars are parked which may be answered by travel of the first selected parked elevator car from its parking station for placing the source of power of the selected one of the parked elevator cars in operating condition and initiating movement of the first selected parked elevator car from its parking station in a direction for serving said call registration, said control means being effective with the first selected elevator car in service and part of the elevator cars parked and if a predetermined demand for elevator service is registered by the call means a substantial time after the first selected elevator car was started in service for starting a parked elevator car to assist in answering the demand for elevator service, and expediting means responsive to the service demand of traffic seeking to travel from the first terminal floor in the first direction for expediting the return of the elevator cars leaving the first terminal floor to the first terminal floor.

14. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third call-registering means for each of the elevator cars operable for registering a call for each of the floors desired for the load within the associated elevator car, means responsive to a stopping operation of each of the elevator cars at any of the intermediate floors for controlling the door-operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said parked elevator cars being selected as the first selected parked car to leave a parking station, means responsive to call registration by the call means while all of the elevator cars are parked which may be answered by travel of the first selected parked elevator car from its parking station for placing the source of power of the first selected one of the parked elevator cars in operating condition and initiating movement of the first selected parked elevator car away from its parking station in a direction for serving said call registration, said control means being effective with the first selected elevator car in service and part of the elevator cars parked and if a predetermined demand for elevator service is registered by the call means a substantial time after the first selected elevator car was started in service for starting a parked elevator car to assist in answering the demand for elevator service, and zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors.

15. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third call-registering means for each of the elevator cars operable for registering a call for each of the floors desired for the load within the associated elevator car, means responsive to a stopping operation of each of the elevator cars at any of the intermediate floors for controlling the door-operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said parked elevator cars being selected as the first selected parked car to leave a parking station, means responsive to call registration by the call means while all of the elevator cars are parked which may be answered by travel of the first selected parked elevator car from its parking station for placing the source of power of the first selected one of the parked elevator cars in operating condition and initiating movement of the first selected parked elevator car away from its parking station in a direction for serving said call registration, said control means being effective with the first selected parked elevator car in service and part of the elevator cars parked and if a predetermined demand for elevator service is registered by the call means a substantial time after the first selected elevator car was started in service for starting a parked elevator car to assist in answering the demand for elevator service, zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors, signal means for expediting loading of the elevator cars, and means responsive to operation of the zoning means for controlling the signal means to discourage loading of said certain of elevator cars at the first terminal floor.

16. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third call-registering means for each of the elevator cars operable for registering a call for each of the floors desired for the load within the associated elevator car, means responsive to a stopping operation of each of the elevator cars at any of the intermediate floors for controlling the door-operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at the parking stations with the sources of power in nonoperating condition, one of said parked elevator cars being selected as the first selected parked car to leave a parking station, means responsive to call registration by the call means while all of the elevator cars are parked which may be answered by travel of the first selected elevator car from its parking station for placing the source of power of the first selected one of the parked elevator cars in operating condition and initiating movement of the first selected parked elevator car away from its parking station in a direction for serving said call registration, said control means being effective with the first selected elevator car in service and if a predetermined demand for elevator service is registered by the call means a substantial time after the first selected car was started in service for starting a parked elevator car to assist in answering the demand for elevator service, and zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors, one of the elevator cars when subject to said assignment to provide preferred service in the second direction for certain of said intermediate floors being conditioned in either direction of travel to answer calls registered by the third call registering means for floors ahead of such assigned elevator car.

17. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third-call registering means for each of the elevator cars operable for registering a call for each of the floors desired for the load within the associated elevator car, means responsive to a stopping operation of each of the elevator cars at any of the intermediate floors for controlling the door-operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said parked elevator cars being selected as the first selected car to leave a parking station, means responsive to call registration by the call means while all of the elevator cars are parked which may be answered by travel of the first selected elevator car from its parking station for placing the source of power of the first selected one of the parked elevator cars in operating condition and initiating movement of the first selected parked elevator car away from its parking station in a direction for serving said call registration, said control means being effective with the first selected elevator car in service and if a predetermined demand for elevator service is registered by the call means a substantial time after the first selected elevator car was started in service for starting a parked elevator car to assist in answering the demand for elevator service, zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors, said floors including an additional floor, said first terminal floor being located between the additional floor and the second terminal floor, and means responsive to any registration of a call by the first and third call registering means for the additional floor for conditioning one of the elevator cars when set for travel in the second direction to answer said call for the additional floor.

18. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third call-registering means for each of the elevator cars operable for registering a call for each of the floors desired for the load within the associated elevator car, means responsive to a stopping operation of each of the elevator cars at any of the intermediate floors for controlling the door-operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of such elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said parked elevator cars being selected as the first selected parked car to leave a parking station, means responsive to call registration by the call means while all of the elevator cars are parked which may be answered by travel of the first selected parked elevator car from its parking station for placing the source of power of the first selected one of the parked elevator cars in operating condition and initiating movement of the first selected parked elevator car away from its parking station in a direction for serving said call registration, said control means being effective with the first selected elevator car in service and part of the elevator cars parked and if a predetermined demand for elevator service is registered by the call means a substantial time after the first selected elevator car was started in service for starting a parked elevator car to assist in answering the demand for elevator service, zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors, said floors including an additional floor, said first terminal floor being located between the additional floor and the second terminal floor, means responsive to any registration of a call by the first and third call registering means for the additional floor for conditioning one of the elevator cars when set for travel in the second direction to answer said call for the additional floor, a separate first direction-indicating signal device for each of the elevator cars positioned at each of the floors intermediate the extreme end floors to indicate when operated the direction in which the associated elevator car will move from the associated floor, a separate second direction-indicating signal device for each of the elevator cars positioned at each of the floors intermediate the extreme end floors and at the second terminal floor to indicate when operated the direction in which the associated elevator car will move from the associated floors, and means effective when any of the elevator cars is conditioned to stop at any of said floors for operating the associated signal device for the direction in which said elevator car is to leave the floor at which its stops, said last-named means being effective for travel of an elevator car away from one of the terminal floors towards the other terminal floor for operating the signal device for such terminal floor only if the elevator car has been selected to leave the terminal floor.

19. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third call-registering means for each of the elevator cars operable for registering a call for each of the floors desired for the load within the associated elevator car, means responsive to a stopping operation of each of the elevator cars at any of the intermediate floors for controlling the door-operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said parked elevator cars being selected as the first selected parked car to leave a parking station, means responsive to call registration by the call means while all of the elevator cars are parked which may be answered by travel of the first selected parked elevator car from its parking station for placing the source of power of the first selected one of the parked elevator cars in operating condition and initiating movement of the first selected parked elevator car away from its parking station in a direction for serving said call registration, said control means being effective with the first selected elevator car in service and part of the elevator cars parked and if a predetermined demand for elevator service is registered by the call means a substantial time after the first selected parked elevator car was started in service for starting a parked elevator car to assist in answering the demand for elevator service, and expediting means responsive to the service demand of traffic seeking to travel from the first terminal floor in the first direction for conditioning each of the elevator cars set for travel in the first direction to stop and reverse substantially at the farthest call for service in the first direction which can be served by such conditioned elevator car.

20. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third call-registering means for each of the elevator cars operable for registering a call for each of the floors desired for the load within the associated elevator car, means responsive to a stopping operation of each of the elevator cars at any of the intermediate floors for controlling the door-operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of such elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said parked elevator cars being selected as the first selected parked car to leave a parking station, means responsive to call registration by the call means while all of the elevator cars are parked which may be answered by travel of the first selected parked elevator car from its parking station for placing the source of power of the first selected one of the parked elevator cars in operating condition and initiating movement of the first selected elevator car away from the first terminal floor in a direction for serving said call registration, said control means being effective with the first selected parked elevator car in service and part of the elevator cars parked and if a predetermined demand for elevator service is registered by the call means a substantial time after the first selected parked elevator car was started in service for starting a parked elevator car to assist in answering the demand for elevator service, expediting means responsive to the service demand of traffic seeking to travel from the first terminal floor in the first direction for conditioning each of the elevator cars set for travel in the first direction to stop and reverse substantially at the farthest call for service in the first direction which can be served by such conditioned elevator car, and zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors.

21. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third call-registering means for each of the elevator cars operable for registering a call for each of the floors desired for the load within the associated elevator car, means responsive to a stopping operation of each of the elevator cars at any of the intermediate floors for controlling the door-operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of such elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said parked elevator cars being selected as the first selected car to leave a parking station, means responsive to call registration by the call means while all of the elevator cars are parked which may be answered by travel of the first selected parked elevator car from its parking station for placing the source of power of the selected one of the parked elevator cars in operating condition and initiating movement of the selected elevator car from its parking station in a direction for serving said call registration, said control means being effective with the first parked elevator car in service and if a predetermined demand for elevator service is registered by the call means a substantial time after the first selected parked elevator car was started in service for starting a parked elevator car to assist in answering the demand for elevator service, and expediting means responsive to the service demand of traffic seeking to travel from the first terminal floor in the first direction for conditioning each of the elevator cars set for travel in the first direction to stop and reverse substantially at the farthest call for service in the first direction which can be served by such conditioned elevator car, and zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors, one of the elevator cars when subject to said assignment to provide preferred service being conditioned when traveling in the first direction to stop and reverse at one of said intermediate floors despite the presence of a call registered by one of the first and second call registering means for a floor displaced in the first direction from the floor at which such assigned elevator car reverses.

22. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, a separate source of power for each of the motive means having an operating condition wherein it may be controlled to supply power to the associated motive means and a non-operating condition, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second-call registering means operable for registering a call from each of a plurality of the floors from which elevator service in a second direction towards the first terminal floor is desired, third-call registering means for each of the elevator cars operable for registering a call for each of the floors desired for the load within the associated elevator car, means responsive to a stopping operation of each of the elevator cars at any of the intermediate floors for controlling the door-operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of such elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said elevator cars being selected as the first selected parked elevator car to leave a parking station, means responsive to call registration by the call means while all of the elevator cars are parked which may be answered by travel of the first selected parked elevator car from its parking station for placing the source of power of the first selected one of the parked elevator cars in operating condition and initiating movement of the first selected parked elevator car away from its parking station in a direction for serving said call registration, said control means being effective with the first selected parked elevator car in service and if a predetermined demand for elevator service is registered by the call means a substantial time after the first selected parked elevator car was started in service for starting a parked elevator car to assist in answering the demand for elevator service, expediting means responsive to the service demand of traffic seeking to travel from the first terminal floor in the first direction for conditioning each of the elevator cars set for travel in the first direction to stop and reverse substantially at the farthest call for service in the first direction which can be served by such conditioned elevator car, zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors, one of the elevator cars when subject to said assignment to provide preferred service being conditioned when traveling in the first direction to stop and reverse at one of said intermediate floors despite the presence of a call registered by one of the first and second call registering means for a floor displaced in the first direction from the floor at which such assigned elevator car reverses, said last-named elevator car when subject to said assignment being conditioned while traveling in the first direction to respond to all calls registered by the third call registering means for such last-named elevator car.

23. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third call-registering means for each of the elevator cars operable for registering a call for each of the floors desired for the load within the associated elevator car, means responsive to a stopping operation of each of the elevator cars at any of the intermediate floors for controlling the door-operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of such elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said parked elevator cars being selected as the first selected parked elevator car to leave a parking station, means responsive to call registration by the call means while all of the elevator cars are parked which may be answered by travel of the first selected parked elevator car from its parking station for placing the source of power of the first selected one of the parked elevator cars in operating condition and initiating movement of the first selected parked elevator car away from its parking station in a direction for serving said call registration, said control means being effective with the first selected parked elevator car in service and if a predetermined demand for elevator service is registered by the call means a substantial time after the first selected parked elevator car was started in service for starting a parked elevator car to assist in answering the demand for elevator service, and expediting means responsive to the service demand of traffic seeking to travel from the first terminal floor in the first direction for conditioning each of the elevator cars set for travel in the first direction to stop and reverse substantially at the farthest call for service in the first direction which can be served by such conditioned elevator car, zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors, one of the elevator cars when subject to said assignment to provide preferred service being conditioned when traveling in the first direction to stop and reverse at one of said intermediate floors despite the presence of a call registered by one of the first and second call registering means for a floor displaced in the first direction from the floor at which such assigned elevator car reverses, said last-named elevator car when subject to said assignment being conditioned while traveling in the first direction to respond to all calls registered by the third call registering means for such last-named elevator car, said floors including an additional floor, said first terminal floor being located between the additional floor and the second terminal floor, and means responsive to any registration of a call by the first and third call registering means for the additional floor for conditioning one of the elevator cars when set for travel in the second direction to answer said call for the additional floor.

24. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third call-registering means for each of the elevator cars operable for registering a call for each of the floors desired for the load within the associated elevator car, means responsive to a stopping operation of each of the elevator cars at any of the intermediate floors for controlling the door-operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of such elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said elevator cars being selected as the first selected parked elevator car to leave a parking station, means responsive to call registration by the call means while all of the elevator cars are parked which may be answered by travel of the first selected parked elevator car from its parking station for placing the source of power of the first selected one of the parked elevator cars in operating condition and initiating movement of the first selected parked elevator car away from its parking station in a direction for serving said call registration, said control means being effective with the first selected parked elevator car in service and if a predetermined demand for elevator service is registered by the call means a substantial time after the first selected parked elevator car was started in service for starting a parked elevator car to assist in answering the demand for elevator service, and expediting means responsive to the service demand of traffic seeking to travel from the first terminal floor in the first direction for conditioning each of the elevator cars set for travel in the first direction to stop and reverse substantially at the farthest call for service in the first direction which can be served by such conditioned elevator car, zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors, one of the elevator cars when subject to said assignment to provide preferred service being conditioned when traveling in the first direction to stop and reverse at one of said intermediate floors despite the presence of a call registered by one of the first and second call registering means for a floor displaced in the first direction from the floor at which such assigned elevator car reverses, said last-named elevator car when subject to said assignment being conditioned while traveling in the first direction to respond to all calls registered by the third call registering means for such last-named elevator car, said floors including an additional floor, said first terminal floor being located between the additional floor and the second terminal floor, and means responsive to any registration of a call by the first and third call registering means for the additional floor for conditioning one of the elevator cars when set for travel in the second direction to answer said call for the additional floor, a separate first direction-indicating signal device for each of the elevator cars positioned at each of the floors intermediate the extreme end floors to indicate when operated the direction in which the associated elevator car will move from the associated floor, a separate second direction-indicating signal device for each of the elevator cars positioned at each of the intermediate floors and at the second terminal floor to indicate when operated the direction in which the associated elevator car will move from the associated floor, and means effective when any of the elevator cars is conditioned to stop at any of said floors for operating the associated signal device for the direction in which said elevator car is to leave the floor at which it stops, said last-named means being effective for travel of an elevator car away from one of the terminal floors towards the other terminal floor for operating the signal device for such terminal floor only if the elevator car has been selected to leave the terminal floor.

25. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, motive means for moving each of the elevator cars relative to the structure, and control means for controlling the movement of the elevator cars by the motive means and the stopping of the elevator cars at predetermined floors, first safety means responsive to presence of an obstruction in a first part of the reclosing path of the door means of each of the elevator cars for cooperating with the door operating means to reopen to an extent and thereafter reclose such door means, second safety means responsive to presence of an obstruction in a second part of the reclosing path of the door means of each of the elevator cars for cooperating with the first safety means and the door operating means to reopen to an extent differing from said first-named extent and thereafter reclose such door means.

26. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, motive means for moving each of the elevator cars relative to the structure, and control means for controlling the movement of the elevator cars by the motive means and the stopping of the elevator cars at predetermined floors, means responsive to a stopping operation of each of the elevator cars at any of the intermediate floors for controlling the door-operating means to open the door means of the associated elevator car and subsequently to reclose such door means, first safety means responsive to presence of an obstruction in a first part of the reclosing path of the door means of each of the elevator cars for cooperating with the door operating means to reopen to an extent and thereafter reclose such door means, second safety means responsive to presence of an obstruction in a second part of the reclosing path of the door means of each of the elevator cars for cooperating with the first safety means and the door operating means to reopen to an extent differing from said first-named extent and thereafter reclose such door means.

27. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, motive means for moving each of the elevator cars relative to the structure, and control means for controlling the movement of the elevator cars by the motive means and the stopping of the elevator cars at predetermined floors, means responsive to a stopping operation of each of the elevator cars at any of the intermediate floors for controlling the door-operating means to open the door means of the associated elevator car and subsequently to reclose such door means, terminal door-control means responsive to arrival of each of the elevator cars at one of the terminal floors from the intermediate floors with a load to be discharged at such terminal floor for controlling the door-operating means to open the door means of the associated elevator car and subsequently to reclose such door means, said terminal door control means being ineffective upon arrival of any one of the elevator cars at one of the terminal floors from the intermediate floors with no load to be discharged for opening the door means of the arriving elevator car unless the arriving elevator car is selected to leave such terminal floor, means for selecting one of the elevator cars to leave the last-named terminal floor, first safety means responsive to presence of an obstruction in a first part of the reclosing path of the door means of each of the elevator cars for cooperating with the door operating means to reopen to an extent and thereafter reclose such door means, second safety means responsive to presence of an obstruction in a second part of the reclosing path of the door means of each of the elevator cars for cooperating with the first safety means and the door operating means to reopen to an extent differing from said first-named extent and thereafter reclose such door means.

28. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, motive means for moving each of the elevator cars relative to the structure, and control means for controlling the movement of the elevator cars by the motive means and the stopping of the elevator cars at predetermined floors, means responsive to a stopping operation of each of the elevator cars at any of the intermediate floors for controlling the door operating means to open the door means of the associated elevator car and subsequently to reclose such door means, terminal door-controlled means responsive to arrival of each of the elevator cars at one of the terminal floors from the intermediate floors with a load to be discharged at such terminal floor for controlling the door-operating means to open the door means of the associated elevator car and subsequently to reclose such door means, said terminal door-control means being ineffective upon arrival of any one of the elevator cars at one of the terminal floors from the intermediate floors with no load to be discharged for opening the door means of the arriving elevator car unless the arriving elevator car is selected to leave such terminal floor, first safety means responsive to presence of an obstruction in a first part of the reclosing path of the door means of each of the elevator cars for cooperating with the door operating means to reopen to an extent and thereafter reclose such door means, second safety means responsive to presence of an obstruction in a second part of the reclosing path of the door means of each of the elevator cars for cooperating with the first safety means and the door operating means to reopen to an extent differing from said first-named extent and thereafter reclose such door means, nonrotational dispatching means for successively selecting cars to be dispatched from each of the terminal floors, means responsive to selection by the dispatching means of one of the elevator cars to be dispatched from one of the terminal floors in cooperation with the door-operating means for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped.

29. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, motive means for moving each of the elevator cars relative to the structure, and control means for controlling the movement of the elevator cars by the motive means and the stopping of the elevator cars at predetermined floors, means responsive to a stopping operation of each of the elevator cars at any of the intermediate floors for controlling the door-operating means to open the door means of the associated elevator car and subsequently to reclose such door means, terminal door control means responsive to arrival of each of the elevator cars at one of the terminal floors from the intermediate floors with a load to be discharged at such terminal floor, for controlling the door-operating means to open the door means of the associated elevator car and subsequently to reclose such door means, said terminal door control means being ineffective upon arrival of any one of the elevator cars at one of the terminal floors from the intermediate floors with no load to be discharged for opening the door means of the arriving elevator car unless the arriving elevator car is selected to leave such terminal floor, first safety means responsive to presence of an obstruction in a first part of the reclosing path of the door means of each of the elevator cars for cooperating with the door-operating means to reopen to an extent and thereafter reclose such door means, second safety means responsive to presence of an obstruction in a second part of the reclosing path of the door means of each of the elevator cars for cooperating with the first safety means and the door-operating means to reopen to an extent differing from said first-named extent and thereafter reclose such door means, nonrotational dispatching means for successively selecting cars to be dispatched from each of the terminal floors, means responsive to selection by the dispatching means of one of the elevator cars to be dispatched from one of the terminal floors in cooperation with the door-operating means for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, and means including a member operable from a predetermined station for delaying closure of the door means of any of the elevator cars selected to leave the first terminal floors.

30. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door-operating means for opening and closing the door means associated with each of the cars, motive means for moving each of the elevator cars relative to the structure, and control means for controlling the movement of the elevator cars by the motive means and the stopping of the elevator cars at predetermined floors, means responsive to a stopping operation of each of the elevator cars at any of the intermediate floors for controlling the door-operating means to open the door means of the associated elevator car and subsequently to reclose such door means, terminal door control means responsive to arrival of each of the elevator cars at one of the terminal floors from the intermediate floors with a load to be discharged at such terminal floor for controlling the door-operating means to open the door means of the associated elevator car and subsequently to reclose such door means, said terminal door control means being ineffective upon arrival of any one of the elevator cars at one of the terminal floors from the intermediate floors with no load to be discharged for opening the door means of the arriving elevator car unless the arriving elevator car is selected to leave such terminal floor, first safety means responsive to presence of an obstruction in a first part of the reclosing path of the door means of each of the elevator cars for cooperating with the door operating means to reopen to an extent and thereafter reclose such door means, second safety means responsive to presence of an obstruction in a second part of the reclosing path of the door means of each of the elevator cars for cooperating with the first safety means and the door-operating means to reopen to an extent differing from said first-named extent and thereafter reclose such door means, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, call-registering means for each of the elevator cars operable for registering a call for each of the floors desired for the load within the associated elevator car, means responsive to registration of a call by the call-registering means for an elevator car at one of the terminal floors which is not selected to leave such terminal floor for maintaining the door means of the last-named elevator car open until the last-named elevator car is to leave the associated terminal floor, and means responsive to registration of a call by the call-registering means for an elevator car at one of the terminal floors which has been selected to leave such terminal floor for informing the load that such selected elevator car will leave soon.

31. In an elevator system for a structure having a plurality of floors, an elevator car, means mounting the elevator car for movement relative to the structure to serve the floors, door means for controlling the passage between the elevator car and any of the floors at which the elevator car is stopped, door-operating means for opening and closing the door means, first safety means responsive to presence of an obstruction in a first part of the reclosing path of the door means of each of the elevator cars for cooperating with the door-operating means to reopen to an extent and thereafter reclose such door means, second safety means responsive to presence of an obstruction in a second part of the reclosing path of the door means of each of the elevator cars for cooperating with the first safety means and the door-operating means to reopen to an extent differing from said first-named extent and thereafter reclose such door means.

32. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structures, and control means for controlling the movement of the elevator cars by the motive means and the stopping of the elevator cars at predetermined floors, said control means including call registering means operable for registering calls for elevator service, dispatching means cooperating with the control means for successively selecting and starting elevator cars to be dispatched from each of said terminal floors, transfer means cooperating with the control means in response to absence of a call registered by said call registering means for parking said elevator cars, said transfer means being responsive to the presence of call registration by the call registering means for cooperating with the control means to start successively a plurality of the parked elevator cars and to place the started elevator cars under the control of the dispatching means, and means responsive to a predetermined demand for service from the first terminal floor for expediting the return of the elevator cars leaving said terminal floor.

33. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structures, and control means for controlling the movement of the elevator cars by the motive means and the stopping of the elevator cars at predetermined floors, said control means including call registering means operable for registering calls for elevator service, dispatching means cooperating with the control means for successively selecting and starting elevator cars to be dispatched from each of said terminal floors, transfer means cooperating with the control means in response to absence of a call registered by said call registering means for parking said elevator cars, said transfer means being responsive to the presence of call registration by the call registering means for cooperating with the control means to start successively a plurality of the parked elevator cars and to place the started elevator cars under the control of the dispatching means, and means responsive to the rate of demand for service from the first terminal floor for conditioning the elevator cars leaving the first terminal floor to stop and reverse substantially at the farthest floor reached by each of the elevator cars for which a call is registered by the call registering means which can be answered by such elevator car.

34. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structures, and control means for controlling the movement of the elevator cars by the motive means and the stopping of the elevator cars at predetermined floors, said control means including call registering means operable for registering calls for elevator service, dispatching means cooperating with the control means for successively selecting and starting elevator cars to be dispatched from each of said terminal floors, transfer means cooperating with the control means in response to absence of a call registered by said call registering means for parking said elevator cars, said transfer means being responsive to the presence of call registration by the call registering means for cooperating with the control means to start successively a plurality of the parked elevator cars and to place the started elevator cars under the control of the dispatching means, and means responsive to the rate of departure of the elevator cars which carry predetermined loads from the first terminal floor for conditioning the elevator cars leaving the first terminal floor to stop and reverse substantially at the farthest floor reached by each of the elevator cars for which a call is registered by the call registering means which can be answered by such elevator car.

35. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structure, and control means for controlling the movement of the elevator cars by the motive means and the stopping of the elevator cars at predetermined floors, said control means comprising first call-registering means operable for registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, and third call-registering means for each of the elevator cars operable for registering a call for each of the floors desired for the load within the associated elevator car, dispatching means cooperating with the control means for selecting and dispatching elevator cars from one of said floors in accordance with a predetermined plan, transfer means cooperating with the control means in response to absence of a call registered by said call-registering means for parking said elevator cars, said transfer means being responsive to the presence of call registration by the call registering means for cooperating with the control means to start successively a plurality of the parked elevator cars and to place the started elevator cars under the control of the dispatching means, and means responsive to the rate of demand for travel away from the first terminal floor for conditioning each of the elevator cars set for travel towards the second terminal floor to stop and reverse at the farthest floor away from the first terminal floor for which a call is registered when such elevator car is set for travel towards the second terminal floor by the call-registering means provided that such call is not registered by the first call-registering means.

36. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structure, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, and third call-registering means for each of the elevator cars operable for registering a call for each of the floors desired for the load within the associated elevator car, dispatching means cooperating with the control means for selecting and dispatching elevator cars from one of said floors in accordance with a predetermined plan, transfer means cooperating with the control means in response to absence of a call registered by said call-registering means for parking said elevator cars, said transfer means being responsive to the presence of call registration by the call registering means for cooperating with the control means to start successively a plurality of the parked elevator cars and to place the started elevator cars under the control of the dispatching means, and zoning means responsive to a demand for travel towards the first terminal floor for assigning certain of the elevator cars when traveling away from the first terminal floor in a zone of floors spaced from the second terminal floor to stop and reverse at the farthest floor of the zone of floors for which a call is registered by the second call registering means even though a call is registered by one of the first and second call registering means for a floor between the zone and the second terminal floor.

37. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structure, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, and third call-registering means for each of the elevator cars operable for registering a call for each of the floors desired for the load within the associated elevator car, dispatching means cooperating with the control means for selecting and dispatching elevator cars from one of said floors in accordance with a predetermined plan, transfer means cooperating with the control means in response to absence of a call registered by said call-registering means for parking said elevator cars, said transfer means being responsive to the presence of call registration by the call registering means for cooperating with the control means to start successively a plurality of the parked elevator cars and to place the started elevator cars under the control of the dispatching means, means responsive to the rate of demand for travel away from the first terminal floor for conditioning each of the elevator cars set for travel towards the second terminal floor to stop and reverse at the farthest floor away from the first terminal floor for which a call is registered when such elevator car is set for travel toward the second terminal floor by the call-registering means provided that such call is not registered by the first call-registering means, and zoning means responsive to a demand for travel towards the first terminal floor for assigning certain of the elevator cars when traveling away from the first terminal floor in a zone of floors spaced from the second terminal floor to stop and reverse at the farthest floor of the zone of floors for which a call is registered by the second call registering means even though a call is registered by one of the first and second call registering means for a floor between the zone and the second terminal floor.

38. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structure, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, and third call-registering means for each of the elevator cars operable for registering a call for each of the floors desired for the load within the associated elevator car, dispatching means cooperating with the control means for selecting and dispatching elevator cars from one of said floors in accordance with a predetermined plan, transfer means cooperating with the control means in response to absence of a call registered by said call-registering means for parking said elevator cars, said transfer means being responsive to the presence of call registration by the call registering means for cooperating with the control means to start successively a plurality of the parked elevator cars and to place the started elevator cars under the control of the dispatching means, and zoning means responsive to a demand for travel towards the first terminal floor for assigning certain of the elevator cars when traveling away from the first terminal floor in a zone of floors spaced from the second terminal floor to stop and reverse at the farthest floor of the zone of floors for which a call is registered by the second call registering means even though a call is registered by one of the first and second call registering means for a floor between the zone and the second terminal floor, said certain of the elevator cars being conditioned to answer all calls registered by the third call registering means including calls for floors between the zone and the second terminal floor.

39. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structure, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, and third call-registering means for each of the elevator cars operable for registering a call for each of the floors desired for the load within the associated elevator car, dispatching means cooperating with the control means for selecting and dispatching elevator cars from one of said floors in accordance with a predetermined plan, transfer means cooperating with the control means in response to absence of a call registered by said call-registering means for parking said elevator cars, said transfer means being responsive to the presence of call registration by the call-registering means for cooperating with the control means to start successively a plurality of the parked elevator cars and to place the started elevator cars under the control of the dispatching means, means responsive to the rate of demand for travel away from the first terminal floor for conditioning each of the elevator cars set for travel towards the second terminal floor to stop and reverse at the farthest floor away from the first terminal floor for which a call is registered when such elevator car is set for travel toward the second terminal floor by the call registering means provided that such call is not registered by the first call-registering means, and zoning means responsive to a demand for travel towards the first terminal floor for assigning certain of the elevator cars when traveling away from the first terminal floor in a zone of floors spaced from the second terminal floor to stop and reverse at the farthest floor of the zone of floors for which a call is registered by the second call-registering means even though a call is registered by one of the first and second call-registering means for a floor between the zone and the second terminal floor, said certain of the elevator cars being conditioned to answer all calls registered by the third call-registering means including calls for floors between the zone and the second terminal floor.

40. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structure, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, and third call-registering means for each of the elevator cars operable for registering a call for each of the floors desired for the load within the associated elevator car, dispatching means cooperating with the control means for selecting and dispatching elevator cars from one of said floors in accordance with a predetermined plan, transfer means cooperating with the control means in response to absence of a call registered by said call-registering means for parking said elevator cars, said transfer means being responsive to the presence of call registration by the call-registering means for cooperating with the control means to start successively a plurality of the parked elevator cars and to place the started elevator cars under the control of the dispatching means, said control means conditioning each of the elevator cars to stop at any of the floors approached by such elevator car for which a call for service is registered which may be served by movement of such elevator car in the direction of such approach, and means responsive to the rate of demand for travel away from the first terminal floor for conditioning each of the elevator cars set for travel towards the second terminal floor to stop and reverse at the farthest floor away from the first terminal floor for which a call is registered when such elevator car is set for travel towards the second terminal floor by the call-registering means provided that such call is not registered by the first call-registering means.

41. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structure, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, and third call-registering means for each of the elevator cars operable for registering a call for each of the floors desired for the load within the associated elevator car, dispatching means cooperating with the control means for selecting and dispatching elevator cars from one of said floors in accordance with a predetermined plan, transfer means cooperating with the control means in response to absence of a call registered by said call-registering means for parking said elevator cars, said transfer means being responsive to the presence of call registration by the call-registering means for cooperating with the control means to start successively a plurality of the parked elevator cars and to place the started elevator cars under the control of the dispatching means, said control means conditioning each of the elevator cars to stop at any of the floors approached by such elevator car for which a call for service is registered which may be served by movement of such elevator car in the direction of such approach, and means responsive to the rate of demand for travel away from the first terminal floor for conditioning each of the elevator cars set for travel towards the second terminal floor to stop and reverse at the farthest floor away from the first terminal floor for which a call is registered when such elevator car is set for travel towards the second terminal floor by the call registering means provided that such call is not registered by the first call-registering means, and zoning means responsive to a demand for travel towards the first terminal floor for assigning certain of the elevator cars when traveling away from the first terminal floor in a zone of floors spaced from the second terminal floor to stop and reverse at the farthest floor of the zone of floors for which a call is registered by the second call registering means even though a call is registered by one of the first and second call registering means for a floor between the zone and the second terminal floor.

42. In an elevator system for a structure having a plurality of floors including a first terminal floor, a second terminal floor, a plurality of intermediate floors located between the terminal floors, a plurality of elevator cars, means mounting the elevator cars for movement relative to the structure to serve said floors, motive means for moving each of the elevator cars relative to the structure, and control means for controlling the movement of the elevator cars by the motive means and the stopping of the elevator cars at predetermined floors, expediting means responsive to the service demand of traffic seeking to travel from the first terminal floor in the first direction for expediting the return of the elevator cars leaving the first terminal floor to the first terminal floor, auxiliary means responsive to operation of the expediting means for expediting departure from the second terminal floor of the elevator cars.

43. In an elevator system for a structure having a plurality of floors including a first terminal floor, a second terminal floor, a plurality of intermediate floors located between the terminal floors, a plurality of elevator cars, means mounting the elevator cars for movement relative to the structure to serve said floors, motive means for moving each of the elevator cars relative to the structure, dispatching means for dispatching available elevator cars from each of the terminal floors in accordance with a plan, and control means for controlling the movement of the elevator cars by the motive means and the stopping of the elevator cars at predetermined floors, expediting means responsive to the service demand of traffic seeking to travel from the first terminal floor in the first direction for expediting the return of the elevator cars leaving the first terminal floor to the first terminal floor, and auxiliary means responsive to operation of the expediting means for expediting departure from the second terminal floor of the elevator cars.

44. In an elevator system for a structure having a plurality of floors including a first terminal floor, a second terminal floor, and a plurality of intermediate floors located between the terminal floor, a plurality of elevator cars, means mounting the elevator cars for movement relative to the structure to serve said floors, motive means for moving each of the elevator cars relative to the structure, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of floors from which elevator service in a second direction towards the first terminal floor is desired, and third call-registering means for each of the elevator cars operable for registering a call for each of the floors desired for the load within the associated elevator car, and zoning means responsive to the demand of traffic seeking to travel in the second direction towards the first terminal floor for assigning certain of the elevator cars for a predetermined traffic demand to provide preferred service in the second direction for certain of said intermediate floors, one of the elevator cars when subject to said assignment to provide preferred service in the second direction for certain of said intermediate floors being conditioned in either direction of travel to answer calls registered by the third call registering means for floors ahead of such assigned elevator car.

45. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, motive means for moving each of the elevator cars relative to the structure, and control means for controlling the movement of the elevator cars by the motive means and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of floors from which elevator service in a second direction towards the first terminal floor is desired, and third call-registering means for each of the elevator cars operable for registering a call for each of the floors desired for the load within the associated elevator car, and zoning means responsive to the demand of traffic seeking to travel in the second direction towards the first terminal floor for assigning certain of the elevator cars for a predetermined traffic demand to provide preferred service in the second direction for certain of said intermediate floors, one of the elevator cars when subject to said assignment to provide preferred service in the second direction for certain of said intermediate floors being conditioned in either direction of travel to answer calls registered by the third call registering means for floors ahead of such assigned elevator car, said last-named elevator car when subject to said assignment being effective when traveling away from the first terminal floor and in the absence of any call registered by the third call-registering means to stop and reverse at the farthest floor away from the first terminal floor in a zone of floors adjacent the first terminal floor for which a call is registered by the second call-registering means even though call registration for a floor farther ahead of the last-named car is registered by the first and second call-registering means.

46. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means provided that the sources of power are in operating condition and the stopping of the elevator cars at predetermined floors, said control means comprising first call-registering means operable for registering a call from each of a plurality of said floors from which elevator service in a first direction towards the second terminal floor is desired, second call-registering means operable for registering a call from each of a plurality of the floors from which elevator service in a second direction towards the first terminal floor is desired, third call-registering means for each of the elevator cars operable for registering a call for each of the floors desired for the load within the associated elevator car, means responsive to a stopping operation of each of the elevator cars at any of the intermediate floors for controlling the door operating means to open the door means of the associated elevator car and subsequently to reclose such door means, terminal door-control means responsive to arrival of each of the elevator cars at one of the terminal floors from the intermediate floors with a load to be discharged at such terminal floor for controlling the door operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means for the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said elevator cars being selected as the first selected parked elevator car to leave a parking station, means responsive to call registration by the call means while all of the elevator cars are parked which may be answered by travel of the first selected parked elevator car from its parking station for placing the source of power of the first selected one of the parked elevator cars in operating condition and initiating movement of the first selected parked elevator car away from its parking station in a direction for serving said call registration, and expediting means responsive to a predetermined service demand of traffic seeking to travel from the first terminal floor in the first direction for expediting the return of the elevator cars leaving the first terminal floor to the first terminal floor.

47. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means provided that the sources of power are in operating condition and the stopping of the elevator cars at predetermined floors, said control means comprising first call registering means operable for registering a call from each of a plurality of said floors from which elevator service in a first direction towards the second terminal floor is desired, second call registering means operable for registering a call from each of a plurality of the floors from which elevator service in a second direction towards the first terminal floor is desired, third call registering means for each of the elevator cars operable for registering a call for each of the floors desired for the load within the associated elevator car, means responsive to a stopping operation of each of the elevator cars at any of the intermediate floors for controlling the door operating means to open the door means of the associated elevator car and subsequently to reclose such door means, terminal door control means responsive to arrival of each of the elevator cars at one of the terminal floors from the intermediate floors with a load to be discharged at such terminal floor for controlling the door operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said parked elevator cars being selected as the first selected car to leave a parking station, means responsive to call registration by the call means while all of the elevator cars are parked which may be answered by travel of the first selected parked elevator car from its parking station for placing the source of power of the first selected one of the parked elevator cars in operating condition and initiating movement of the first selected parked elevator car away from its parking station in a direction for serving said call registration, and zoning means responsive to the demand of traffic seeking to travel in the second direction towards the first terminal floor for assigning certain of the elevator cars for a predetermined traffic demand to provide preferred service in the second direction for certain of said intermediate floors.

48. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means provided that the sources of power are in operating condition and the stopping of the elevator cars at predetermined floors, said control means comprising first call registering means operable for registering a call from each of a plurality of said floors from which elevator service in a first direction towards the second terminal floor is desired, second call registering means operable for registering a call from each of a plurality of the floors from which elevator service in a second direction towards the first terminal floor is desired, third call registering means for each of the elevator cars operable for registering a call for each of the floors desired for the load within the associated elevator car, means responsive to a stopping operation of each of the elevator cars at any of the intermediate floors for controlling the door operating means to open the door means of the associated elevator car and subsequently to reclose such door means, terminal door control means responsive to arrival of each of the elevator cars at one of the terminal floors from the intermediate floors with a load to be discharged at such terminal floor for controlling the door operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, nonrotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said elevator cars being selected as the first selected parked elevator car to leave a parking station, means responsive to call registration by the call means while all of the elevator cars are parked which may be answered by travel of the first selected parked elevator car from its parking station for placing the source of power of the first selected one of the parked elevator cars in operating condition and initiating movement of the first selected parked elevator car away from its parking station in a direction for serving said call registration, expediting means responsive to a predetermined service demand of traffic seeking to travel from the first terminal floor in the first direction for expediting the return of the elevator cars leaving the first terminal floor to the first terminal floor, and zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors.

49. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, separate motive means for moving each of the elevator cars relative to the structure, a separate source of power for each of the motive means having an operating condition wherein it may be controlled to supply power to the associated motive means and a nonoperating condition, stopping means for each of the elevator cars, and control means for controlling the movement of the elevator cars by the motive means provided that the sources of power are in operating condition and the stopping of the elevator cars at predetermined floors, said control means comprising first call registering means operable for registering a call from each of a plurality of said floors from which elevator service in a first direction towards the second terminal floor is desired, second call registering means operable for registering a call from each of a plurality of the floors from which elevator service in a second direction towards the first terminal floor is desired, third call registering means for each of the elevator cars operable for registering a call for each of the floors desired for the load within the associated elevator car, means responsive to a stopping operation of each of the elevator cars at any of the intermediate floors for controlling the door operating means to open the door means of the associated elevator car and subsequently to reclose such door means, terminal door control means responsive to arrival of each of the elevator cars at one of the terminal floors from the intermediate floors with a load to be discharged at such terminal floor for controlling the door operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, non-rotational dispatching means for successively selecting cars to be dispatched from each of the terminal floors, means responsive to selection by the dispatching means of one of the elevator cars to be dispatched from one of the terminal floors for maintaining open the door means of the selected car for a time and thereafter initiating a closing operation of the door means of the selected car, means responsive to closure of the door means of each of the elevator cars at any of the intermediate floors and of a selected one of the elevator cars at each of the terminal floors for initiating movement of each of the elevator cars having closed doors away from the floor at which it is stopped, said dispatching means being effective upon said departure of a selected car from the first terminal floor for selecting another of the elevator cars as the second selected elevator car, means responsive to absence of a call registered by said call means for parking said elevator cars at parking stations with the sources of power in nonoperating condition, one of said parked elevator cars being selected as the first selected parked elevator car to leave a parking station, means responsive to call registration by the call means while all of the elevator cars are parked which may be answered by travel of the first selected parked elevator car from its parking station for placing the source of power of the selected one of the parked elevator cars in operating condition and initiating movement of the selected parked elevator car away from its parking station in a direction for serving said call registration, expediting means responsive to a predetermined service demand of traffic seeking to travel from the first terminal floor in the first direction for expediting the return of the elevator cars leaving the first terminal floor to the first terminal floor, zoning means responsive to the demand of traffic seeking to travel in the second direction towards the first terminal floor and the rarity of traffic seeking to travel from the first floor in the first direction for assigning certain of the elevator cars for a predetermined traffic demand to provide preferred service in the second direction for certain of said intermediate floors, a separate first direction-indicating signal device for each of the elevator cars positioned at each of the floors to indicate when operated the direction in which the associated elevator car will move from the associated floor, a separate second direction-indicating signal device for each of the elevator cars positioned at each of the floors to indicate when operated the direction in which the associated elevator car will move from the associated floors, and means effective when any of the elevator cars is conditioned to stop at any of said floors for operating the associated signal device for the direction in which said elevator car is to leave the floor at which it stops, said last-named means being effective for travel of an elevator car away from one of the terminal floors towards the other terminal floor for operating the signal device for such terminal floor only if the elevator car has been selected to leave the terminal floor.

50. In an elevator system for a structure having a plurality of floors, a plurality of elevator cars, means mounting the elevator cars for movement relative to the structure to serve the floors, separate door means for each of the elevator cars for controlling the passage between each of the elevator cars and any of the floors at which the associated elevator car is stopped, door operating means operable for closing the door means of each of the elevator cars, means for initiating a closing operation of the door means by the associated door operating means of any of the elevator cars positioned at a predetermined one of the floors, a common operating member, and hold means responsive to operation of the common operating member for interrupting the closure of the door means of any of the elevator cars at said predetermined one of the floors.

51. In an elevator system for a structure having a plurality of floors, a plurality of elevator cars, means mounting the elevator cars for movement relative to the structure to serve the floors, separate door means for each of the elevator cars for controlling the passage between each of the elevator cars and any of the floors at which the associated elevator car is stopped, door operating means operable for opening and closing the door means of each of the elevator cars, means for initiating a closing operation of the door means by the associated door operating means of any of the elevator cars positioned at a predetermined one of the floors, means for selecting any one of the elevator cars positioned at said predetermined floor to leave said predetermined floor, means responsive to closure of the door means of any of the elevator cars selected to leave the predetermined floor for starting such elevator car, a common operating member, and hold means responsive to operation of the common operating member for interrupting the closure of the door means of any of the elevator cars selected to leave said predetermined one of the floors, said hold means being effective for initiating a reopening operation of the last-named door means if such door means has started to close.

52. In an elevator system for a structure having a plurality of floors, a plurality of elevator cars, means mounting the elevator cars for movement relative to the structure to serve the floors, separate door means for each of the elevator cars for controlling the passage between each of the elevator cars and any of the floors at which the associated elevator car is stopped, door operating means operable for opening and closing the door means of each of the elevator cars, separate call-registering means operable from within each of the elevator cars for registering calls for floors at which the respective elevator cars should stop, and means responsive to operation of the call-registering means of any of the elevator cars which is positioned at one of the floors with its door means closed and which is not in condition to serve a call registered by said call registering means for controlling the door operating means to open the last-named door means.

53. In an elevator system for a structure having a plurality of floors, a plurality of elevator cars, means mounting the elevator cars for movement relative to the structure to serve the floors, separate door means for each of the elevator cars for controlling the passage between each of the elevator cars and any of the floors at which the associated elevator car is stopped, door operating means operable for opening and closing the door means of each of the elevator cars, separate call-registering means operable from within each of the elevator cars for registering calls for floors at which the respective elevator cars should stop, means for selecting elevator cars successively to leave a predetermined one of the floors, and means responsive to operation of the call-registering means of any of the elevator cars which is positioned at the predetermined one of the floors with its door means closed and which is not selected as the next elevator car to leave said predetermined floor for controlling the door operating means to open the last-named door means.

54. In an elevator system for a structure having a plurality of floors, an elevator car, means mounting the elevator car for movement relative to the structure to serve said floors, door means for controlling the passage between the elevator car and any of the floors at which the elevator car is stopped, door operating means operable for opening the door means, means responsive to closure of said door means while the elevator car is stopped at a floor for starting the elevator car, means effective under predetermined conditions for preventing starting of the elevator car from part only of said floors even though the door means are closed, a control device operable from within the elevator car, and means responsive to operation of the control device and effective only when the elevator car is positioned at said part only of said floors and only when the elevator car is not conditioned to leave the floor at which it is stopped for controlling the door operating means to open the doors.

55. In an elevator system for a structure having a plurality of floors, an elevator car, means mounting the elevator car for movement relative to the structure to serve said floors, door means for controlling the passage between the elevator car and any of the floors at which the elevator car is stopped, door operating means operable for opening the door means, means responsive to closure of said door means while the elevator car is stopped at a floor for starting the elevator car, means effective under predetermined conditions for preventing starting of the elevator car from part only of said floors even though the door means are closed, a car-call registering means operable from within the elevator car for registering calls for floors at which the elevator car should stop, and means responsive to operation of the car-call registering means to register a call for a floor spaced from the position of the elevator car when the elevator car is at a predetermined floor with the door means closed and is not conditioned to leave such predetermined floor, to control the door operating means to open the door means.

56. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, separate motive means for moving each of the elevator cars relative to the structure, stopping means for each of the elevator cars, and control means for controlling the movement of the elevator cars by the motive means and the stopping of the elevator cars at predetermined floors, said control means comprising call-registering means operable for registering a call for each of a plurality of said floors for which elevator service is desired, door-controlling means responsive to a stopping operation of each of the elevator cars in response to a call registered by the call-registering means at one of the intermediate floors for controlling the door operating means to open the door means of the associated elevator car and subsequently to reclose such door means, said door-controlling means comprising means responsive to arrival of each of the elevator cars at one of the terminal floors from the intermediate floors with a load to be discharged at such terminal floor for controlling the door operating means to open the door means of the associated elevator car and subsequently to reclose such door means, said control means in at least one condition conditioning each of the elevator cars to stop at any of the floors approached by such elevator car for which a call for service is registered which may be served by movement of such elevator car in the direction of such approach, dispatching means effective in at least one condition of the control means for successively selecting cars to be dispatched from one of the floors termed a dispatching floor, means responsive to selection by the dispatching means of one of the elevator cars to be dispatched from the dispatching floor for maintaining open the door means of the selected car for a time, means responsive to closure of the door means of each of the elevator cars at any of the intermediate floors and of a selected one of the elevator cars at the dispatching floor for initiating movement of each of the elevator cars having closed doors away from the floor at which it is stopped, the control means being operable into a first condition wherein the elevator cars are parked at parking stations in the absence of a call for elevator service and wherein registration of a call for elevator service conditions only part of the parked elevator cars to move for providing elevator service, the control means being operable into a second condition wherein all of the elevator cars provide a first service for all of the floors, and the control means being operable into a third condition wherein all of the elevator cars provide a second service for all of the floors, and selecting means automatically responsive to a first predetermined condition automatically occurring during the operation of the elevator system for operating the control means into the second condition, said selecting means including means automatically responsive to a second predetermined condition automatically occurring during the operation of the elevator system for operating the control means into the third condition.

57. A system as claimed in claim 56 wherein at least one of said predetermined conditions is a predetermined demand for elevator service.

58. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, separate motive means for moving each of the elevator cars relative to the structure, a separate source of power for each of the motive means having an energy-consuming operating condition wherein it does not supply power to the associated motive means and wherein it may be controlled to supply power to the associated motive means and a non-energy-consuming nonoperating condition, stopping means for each of the elevator cars, and control means for controlling the movement of the elevator cars by the motive means provided that the sources of power are in operating condition and the stopping of the elevator cars at predetermined floors, said control means comprising call-registering means operable for registering a call for each of a plurality of said floors for which elevator service is desired, door-controlling means responsive to a stopping operation of each of the elevator cars in response to a call registered by the call-registering means at one of the intermediate floors for controlling the door operating means to open the door means of the associated elevator car and subsequently to reclose such door means, said door controlling means comprising means responsive to arrival of each of the elevator cars at one of the terminal floors from the intermediate floors with a load to be discharged at such terminal floor for controlling the door operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, dispatching means effective for at least one condition of the control means for successively selecting cars to be dispatched from one of the floors termed a dispatching floor means responsive to selection by the dispatching means of one of the elevator cars to be dispatched from the dispatching floor for maintaining open the door means of the selected car for a time, means responsive to closure of the door means of each of the elevator cars at any of the intermediate floors and of a selected one of the elevator cars at the dispatching floor for initiating movement of each of the elevator cars having closed doors away from the floor at which it is stopped, the control means being operable into a first condition wherein the elevator cars are parked at parking stations in the absence of a call for elevator service with the sources of power in nonoperating condition and wherein registration of a call for elevator service places only part of the sources of power in operating condition and conditions only part of the parked elevator cars to move for providing elevator service, the control means being operable into a second condition wherein all of the power sources are in operating condition and all of the elevator cars provide a first service for all of the floors, and the control means being operable into a third condition wherein all of the power sources are in operating condition and all of the elevator cars provide a second service for all of the floors, and selecting means automatically responsive to a first predetermined condition automatically occurring during the operation of the elevator system for operating the control means into the second condition, said selecting means including means automatically responsive to a second predetermined condition automatically occurring during the operation of the elevator system for operating the control means into the third condition.

59. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, separate motive means for moving each of the elevator cars relative to the structure, stopping means for each of the elevator cars, and control means for controlling the movement of the elevator cars by the motive means and the stopping of the elevator cars at predetermined floors, said control means comprising call-registering means operable for registering a call for each of a plurality of said floors for which elevator service is desired, door-controlling means responsive to a stopping operation of each of the elevator cars in response to a call registered by the call-registering means at one of the intermediate floors for controlling the door operating means to open the door means of the associated elevator car and subsequently to reclose such door means, said door-controlling means comprising means responsive to arrival of each of the elevator cars at one of the terminal floors from the intermediate floors with a load to be discharged at such terminal floor for controlling the door operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, dispatching means for successively selecting cars to be dispatched from one of the floors termed a dispatching floor, means responsive to selection by the dispatching means of one of the elevator cars to be dispatched from the dispatching floor for maintaining open the door means of the selected car for a time, means responsive to closure of the door means of each of the elevator cars at any of the intermediate floors and of a selected one of the elevator cars at the dispatching floor for initiating movement of each of the elevator cars having closed doors away from the floor at which it is stopped, the control means being operable into a first condition wherein the elevator cars are parked at parking stations in the absence of a call for elevator service and wherein registration of a call for elevator service conditions only part of the parked elevator cars to move for providing elevator service, the control means being operable into a second condition wherein all of the elevator cars operate between the terminal floors under the control of the dispatching means to provide a first service for all of the floors, and the control means being operable into a third condition wherein all of the elevator cars provide a second service for all of the floors, and selecting means automatically responsive to a first predetermined condition automatically occurring during the operation of the elevator system for operating the control means into the second condition, said selecting means including means automatically responsive to a second predetermined condition automatically occurring during the operation of the elevator system for operating the control means into the third condition.

60. In the elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, separate motive means for moving each of the elevator cars relative to the structure, stopping means for each of the elevator cars, and control means for controlling the movement of the elevator cars by the motive means and the stopping of the elevator cars at predetermined floors, said control means comprising call-registering means operable for registering a call for each of a plurality of said floors for which elevator service is desired, door-controlling means responsive to a stopping operation of each of the elevator cars at one of the intermediate floors in response to a call registered by the call-registering means for controlling the door operating means to open the door means of the associated elevator car and subsequently to reclose such door means, said door-controlling means comprising means responsive to arrival of each of the elevator cars at one of the terminal floors from the intermediate floors with a load to be discharged at such terminal floor for controlling the door operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, dispatching means effective in at least one condition of the control means for successively selecting cars to be dispatched from one of the floors termed a dispatching floor, means responsive to selection by the dispatching means of one of the elevator cars to be dispatched from the dispatching floor for maintaining open the door means of the selected car for a time, means responsive to closure of the door means of each of the elevator cars at any of the intermediate floors and of a selected one of the elevator cars at the dispatching floor for initiating movement of each of the elevator cars having closed doors away from the floor at which it is stopped, the control means being operable into a first condition wherein the elevator cars are parked at parking stations in the absence of a call for elevator service and wherein registration of a call for elevator service conditions only part of the parked elevator cars to move for providing elevator service, the control means being operable into a second condition wherein all of the elevator cars provide a first service for all of the floors, and the control means being operable into a third condition wherein each of the elevator cars is conditioned to move from the first terminal floor towards the second terminal floor and to reverse at an intermediate one of the floors provided that no call is registered by the call means requiring movement of the elevator-car-to-be-reversed beyond such intermediate floor to provide a second service for all of the floors, and selecting means automatically responsive to a first predetermined condition automatically occurring during the operation of the system for operating the control means into the second condition, said selecting means including means automatically responsive to a second predetermined condition automatically occurring during the operation of the system for operating the control means into the third condition.

61. A system as claimed in claim 60 wherein at least one of the predetermined conditions is a predetermined demand for elevator service.

62. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, separate motive means for moving each of the elevator cars relative to the structure, stopping means for each of the elevator cars, and control means for controlling the movement of the elevator cars by the motive means and the stopping of the elevator cars at predetermined floors, said control means comprising call-registering means operable for registering a call for each of a plurality of said floors for which elevator service is desired, door-controlling means responsive to a stopping operation of each of the elevator cars in response to a call registered by the call-registering means at one of the intermediate floors for controlling the door operating means to open the door means of the associated elevator car and subsequently to reclose such door means, said door-controlling means comprising means responsive to arrival of each of the elevator cars at one of the terminal floors from the intermediate floors with a load to be discharged at such terminal floor for controlling the door operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, dispatching means effective in at least one condition of the control means for successively selecting cars to be dispatched from one of the floors termed a dispatching floor, means responsive to selection by the dispatching means of one of the elevator cars to be dispatched from the dispatching floor for maintaining open the door means of the selected car for a time, means responsive to closure of the door means of each of the elevator cars at any of the intermediate floors and of a selected one of the elevator cars at the dispatching floor for initiating movement of each of the elevator cars having closed doors away from the floor at which it is stopped, the control means being operable into a first condition wherein the elevator cars are parked at parking stations in the absence of a call for elevator service and wherein registration of a call for elevator service conditions only part of the parked elevator cars to move for providing elevator service, the control means being operable into a second condition wherein all of the elevator cars operate between the terminal floors under the control of the dispatching means to provide a first service for all of the floors, and the control means being operable into a third condition wherein each of the elevator cars is conditioned to move from the first terminal floor towards the second terminal floor and to reverse at an intermediate one of the floors provided that no call is registered by the call means requiring movement of the elevator-car-to-be-reversed beyond such intermediate floor to provide a second service for all of the floors, and selecting means automatically responsive to a first predetermined condition automatically occurring during the operation of the system for operating the control means into the second condition, said selecting means including means automatically responsive to a second predetermined condition automatically occurring during the operation of the system for operating the control means into the third condition.

63. A system as claimed in claim 62 wherein at least one of the predetermined conditions is a predetermined demand for elevator service.

64. A system as claimed in claim 62 wherein all of said predetermined conditions represent different demands for elevator service.

65. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, separate motive means for moving each of the elevator cars relative to the structure, stopping means for each of the elevator cars, and control means for controlling the movement of the elevator cars by the motive means and the stopping of the elevator cars at predetermined floors, said control means comprising call-registering means operable for registering a call for each of a plurality of said floors for which elevator service is desired, door-controlling means responsive to a stopping operation of each of the elevator cars in response to a call registered by the call-registering means at one of the intermediate floors for controlling the door operating means to open the door means of the associated elevator car and subsequently to reclose such door means, said door-controlling means comprising means responsive to arrival of each of the elevator cars at one of the terminal floors from the intermediate floors with a load to be discharged at such terminal floor for controlling the door operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, dispatching means effective in at least one condition of the control means for successively selecting cars to be dispatched from one of the floors termed a dispatching floor, means responsive to selection by the dispatching means of one of the elevator cars to be dispatched from the dispatching floor for maintaining open the door means of the selected car for a time, means responsive to closure of the door means of each of the elevator cars at any of the intermediate floors and of a selected one of the elevator cars at the dispatching floor for initiating movement of each of the elevator cars having closed doors away from the floor at which it is stopped, the control means being operable into a first condition wherein the elevator cars are parked at parking stations in the absence of a call for elevator service and wherein registration of a call for elevator service conditions only part of the parked elevator cars to move for providing elevator service, the control means being operable into a second condition wherein all of the elevator cars operate between the terminal floors under the control of the dispatching means to provide a first service for all of the floors, and the control means being operable into a third condition wherein each of the elevator cars is conditioned to move from the first terminal floor towards the second terminal floor and to reverse at an intermediate one of the floors provided that no call is registered by the call means requiring movement of the elevator-car-to-be-reversed beyond such intermediate floor to provide a second service for all of the floors, said control means being operable into a fourth condition wherein service is provided by certain of said elevator cars for a first group of said floors and service is provided by other of said elevator cars for a second group of said floors differing from the first group, selecting means automatically responsive to a first predetermined condition automatically occurring during the operation of the system for operating the control means into the second condition, said selecting means including means automatically responsive to a second predetermined condition automatically occurring during the operation of the system for operating the control means into the third condition, and said selecting means including means responsive to a third predetermined condition automatically occurring during the operation of the system for operating the control means into the fourth condition.

66. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, separate motive means for moving each of the elevator cars relative to the structure, stopping means for each of the elevator cars, and control means for controlling the movement of the elevator cars by the motive means and the stopping of the elevator cars at predetermined floors, said control means comprising call-registering means operable for registering a call for each of a plurality of said floors for which elevator service is desired, door-controlling means responsive to a stopping operation of each of the elevator cars to serve a call registered by the call-registering means at one of the intermediate floors for controlling the door operating means to open the door means of the associated elevator car and subsequently to reclose such door means, said door-controlling means comprising means responsive to arrival of each of the elevator cars at one of the terminal floors from the intermediate floors with a load to be discharged at such terminal floor for controlling the door operating means to open the door means of the associated elevator car and subsequently to reclose such door means, said control means conditioning each of the elevator cars to stop at any of the floors approached by such elevator car for which a call for service is registered which may be served by movement of such elevator car in the direction of such approach, dispatching means effective in at least one condition of the system for successively selecting cars to be dispatched from one of the floors termed a dispatching floor, means responsive to selection by the dispatching means of one of the elevator cars to be dispatched from the dispatching floor for maintaining open the door means of the selected car for a time, means responsive to closure of the door means of each of the elevator cars at any of the intermediate floors and of a selected one of the elevator cars at the dispatching floor for initiating movement of each of the elevator cars having closed doors away from the floor at which it is stopped, selecting means for automatically selecting a first period wherein a first value of elevator service is to be provided and a second period wherein a value of elevator service greater than the first value is to be provided and transfer means automatically controlled by said selecting means for conditioning the system during said first period to park said elevator cars at predetermined parking stations in the absence of a call registered by the call-registering means and to initiate movement of part only of the elevator cars in response to a predetermined call registration by the call means to serve the call registration, said transfer means automatically conditioning the system during the second period to assign certain of the elevator cars to serve a first group of said floors and to assign other of said elevator cars to serve only a second group of said floors differing from the first group.

67. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, motive means for moving each of the elevator cars relative to the structure, and control means for controlling the movement of the elevator cars by the motive means and the stopping of the elevator cars at predetermined floors, door-opening means for each of the elevator cars effective when operated during a door-closing movement for cooperating with the door operating means to open the door means of the associated elevator car to an extent dependent on the position of said last-named door means at the time the associated door-opening means is operated.

68. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, door means for each of the elevator cars for controlling the passage between the associated elevator car and any of the floors at which the associated elevator car is stopped, door operating means for opening and closing the door means associated with each of the cars, motive means for moving each of the elevator cars relative to the structure, and control means for controlling the movement of the elevator cars by the motive means and the stopping of the elevator cars at predetermined floors, door-opening means for each of the elevator cars effective when operated during a door-closing movement for cooperating with the door operating means to open the door means of the associated elevator car to a predetermined partially-open extent, said door-opening means for each of the elevator cars being effective when operated after the associated door means has reached said partially-open extent for continuing the door-opening movement of the partially-open door means.

69. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structures, and control means for controlling the movement of the elevator cars by the motive means and the stopping of the elevator cars at predetermined floors, said control means including call-registering means operable for registering calls for elevator service from each of the intermediate floors in each of two directions, dispatching means cooperating with the control means for successively selecting and starting elevator cars to be dispatched from each of said terminal floors, and transfer means cooperating with the control means in response to absence of a call registered by said call registering means for parking said elevator cars, said transfer means including first means responsive to a first traffic condition comprising call registration by the call-registering means for cooperating with the control means to start part only of the parked elevator cars to answer the call registration, second means responsive to a second traffic condition for cooperating with the control means to start all of the elevator cars and to operate the started elevator cars between the terminal floors under the control of the dispatching means, and third means responsive to a third traffic condition for cooperating with the control means to condition all of the elevator cars for operation and to stop and reverse each of a plurality of the elevator cars during a trip towards the second terminal floor at the farthest floor for which a call is registered by the call-registering means, provided that no call is registered for such farthest floor which calls for further travel of the elevator-car-to-be-reversed towards the second terminal floor.

70. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structures, and control means for controlling the movement of the elevator cars by the motive means and the stopping of the elevator cars at predetermined floors, said control means including call-registering means operable for registering calls for elevator service from each of the intermediate floors in each of two directions, dispatching means cooperating with the control means for successively selecting and starting elevator cars to be dispatched from each of said terminal floors, and transfer means cooperating with the control means in response to absence of a call registered by said call-registering means for parking said elevator cars, said transfer means including first means responsive to a first traffic condition comprising call registration by the call-registering means for cooperating with the control means to start part only of the parked elevator cars to answer the call registration, second means responsive to a second traffic condition for cooperating with the control means to start all of the elevator cars and to control the elevator cars to provide elevator service which is substantially balanced in the two directions, and third means responsive to a third traffic condition for cooperating with the control means to condition all of the elevator cars for operation with the elevator cars providing elevator service which is substantially unbalanced in the two directions.

71. In an elevator system for a structure having a plurality of floors including a first terminal floor, a second terminal floor, and a plurality of intermediate floors located between the terminal floors, a plurality of elevator cars, means mounting the elevator cars for movement relative to the structure to serve said floors, separate motive means for moving each of the elevator cars relative to the structures, and control means for controlling the movement of the elevator cars by the motive means and the stopping of the elevator cars at predetermined floors, said control means including call-registering means operable for registering calls for elevator service from each of the intermediate floors in each of two directions, dispatching means cooperating with the control means for successively selecting and starting elevator cars to be dispatched from each of said terminal floors, and transfer means cooperating with the control means in response to absence of a call registered by said call-registering means for parking said elevator cars, said transfer means including first means responsive to a first traffic condition comprising call registration by the call-registering means for cooperating with the control means to start part only of the parked elevator cars to answer the call registration, second means responsive to a second traffic condition for cooperating with the control means to start all of the elevator cars and to control the elevator cars to provide elevator service which is substantially balanced in the two directions, third means responsive to a third traffic condition representative of a substantial demand for elevator service in a first one of said two direction for cooperating with the control means to condition all of the elevator cars for operation with the elevator cars providing elevator service which is preponderantly in a first one of said two directions, and fourth means responsive to a fourth traffic condition representative of a substantial demand for elevator service in a second one of said two directions for cooperating with the control means to condition all of the elevator cars for operation with the elevator cars providing elevator service which is preponderantly in the second one of said two directions.

References Cited in the file of this patent

UNITED STATES PATENTS

| | | |
|---|---|---|
| 1,904,647 | Lindquist et al. | Apr. 18, 1933 |
| 2,057,480 | Eames | Oct. 13, 1936 |
| 2,172,187 | Carney et al. | Sept. 5, 1939 |
| 2,376,113 | Bouton et al. | May 15, 1945 |
| 2,468,317 | Watson | Apr. 26, 1949 |
| 2,589,242 | Glaser et al. | Mar. 18, 1952 |
| 2,619,197 | Glaser et al. | Nov. 25, 1952 |
| 2,652,903 | Borden et al. | Sept. 22, 1953 |